(12) United States Patent
Hosomura et al.

(10) Patent No.: US 12,495,550 B2
(45) Date of Patent: Dec. 9, 2025

(54) SEMICONDUCTOR STORAGE DEVICE

(71) Applicant: KIOXIA CORPORATION, Tokyo (JP)

(72) Inventors: Yoshikazu Hosomura, Kamakura Kanagawa (JP); Hideyuki Kataoka, Yokohama Kanagawa (JP); Yoshinao Suzuki, Yokohama Kanagawa (JP); Mai Shimizu, Kamakura Kanagawa (JP); Kazuyoshi Muraoka, Yokohama Kanagawa (JP); Masami Masuda, Chigasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 736 days.

(21) Appl. No.: 17/680,144

(22) Filed: Feb. 24, 2022

(65) Prior Publication Data

US 2023/0083392 A1    Mar. 16, 2023

(30) Foreign Application Priority Data

Sep. 16, 2021   (JP) ................................ 2021-150834

(51) Int. Cl.
*H01L 27/11582* (2017.01)
*G11C 5/06* (2006.01)
(Continued)

(52) U.S. Cl.
CPC ............... *H10B 41/35* (2023.02); *G11C 5/06* (2013.01); *G11C 16/0483* (2013.01);
(Continued)

(58) Field of Classification Search
CPC ........ H10B 43/50; H10B 43/40; H10B 41/40; H10B 43/10; H10B 43/35; H10B 41/35;
(Continued)

(56) References Cited

U.S. PATENT DOCUMENTS 8,933,502 B2 *   1/2015   Higashitani ........ G11C 16/0483
                                                        257/326
10,504,918 B2 *  12/2019  Shimojo .................. G11C 8/14
(Continued)

FOREIGN PATENT DOCUMENTS

CN           110838493 A      2/2020
CN           111755451 A     10/2020
(Continued)

*Primary Examiner* — Ajay Ojha
*Assistant Examiner* — Tsz K Chiu
(74) *Attorney, Agent, or Firm* — Kim & Stewart LLP

(57) ABSTRACT

A semiconductor storage device includes a memory cell array having a plurality of first conductive layers stacked in a first direction and a plurality of memory cells connected to the plurality of first conductive layers, a wiring layer, and an insulating layer between the memory cell array and the wiring layer and separating the memory cell array and the wiring layer in a second direction intersecting the first direction. The wiring layer includes a plurality of second conductive layers stacked in the first direction, each of the second conductive layers having a corresponding first conductive layer at a same layer, and a contact connected to at least a part of the plurality of second conductive layers and extending in the first direction.

18 Claims, 45 Drawing Sheets

(51) Int. Cl.
*G11C 16/04* (2006.01)
*H01L 27/11565* (2017.01)
*H10B 41/10* (2023.01)
*H10B 41/20* (2023.01)
*H10B 41/35* (2023.01)
*H10B 43/10* (2023.01)
*H10B 43/20* (2023.01)
*H10B 43/35* (2023.01)

(52) U.S. Cl.
CPC ............. *H10B 41/10* (2023.02); *H10B 41/20* (2023.02); *H10B 43/10* (2023.02); *H10B 43/20* (2023.02); *H10B 43/35* (2023.02)

(58) Field of Classification Search
CPC ........ H10B 43/27; H10B 41/10; H10B 41/27; H10B 43/20; H10B 69/00; H10B 43/30; H10B 41/41; H10B 43/00; H10B 41/20; H10B 41/30; H10B 41/50; H01L 23/5283
See application file for complete search history.

(56) References Cited

U.S. PATENT DOCUMENTS

| | | | |
|---|---|---|---|
| 10,665,607 B1* | 5/2020 | Sugiura | H10B 43/10 |
| 11,955,470 B2* | 4/2024 | Kim | H01L 25/18 |
| 2011/0147818 A1* | 6/2011 | Katsumata | H10B 43/20 |
| | | | 257/314 |
| 2014/0056080 A1* | 2/2014 | Lee | H10B 43/27 |
| | | | 257/314 |
| 2015/0054046 A1* | 2/2015 | Higashitani | H10B 41/27 |
| | | | 257/314 |
| 2020/0058671 A1 | 2/2020 | Kim | |
| 2020/0312861 A1 | 10/2020 | Kim | |
| 2021/0020648 A1 | 1/2021 | Lim | |
| 2021/0091092 A1 | 3/2021 | Noda | |
| 2021/0143162 A1 | 5/2021 | Yun | |
| 2021/0265388 A1 | 8/2021 | Baek | |
| 2022/0052069 A1* | 2/2022 | Kim | H10B 43/27 |

FOREIGN PATENT DOCUMENTS

| | | |
|---|---|---|
| CN | 112864165 A | 5/2021 |
| CN | 113380817 A | 9/2021 |
| JP | 2021048304 A | 3/2021 |

* cited by examiner

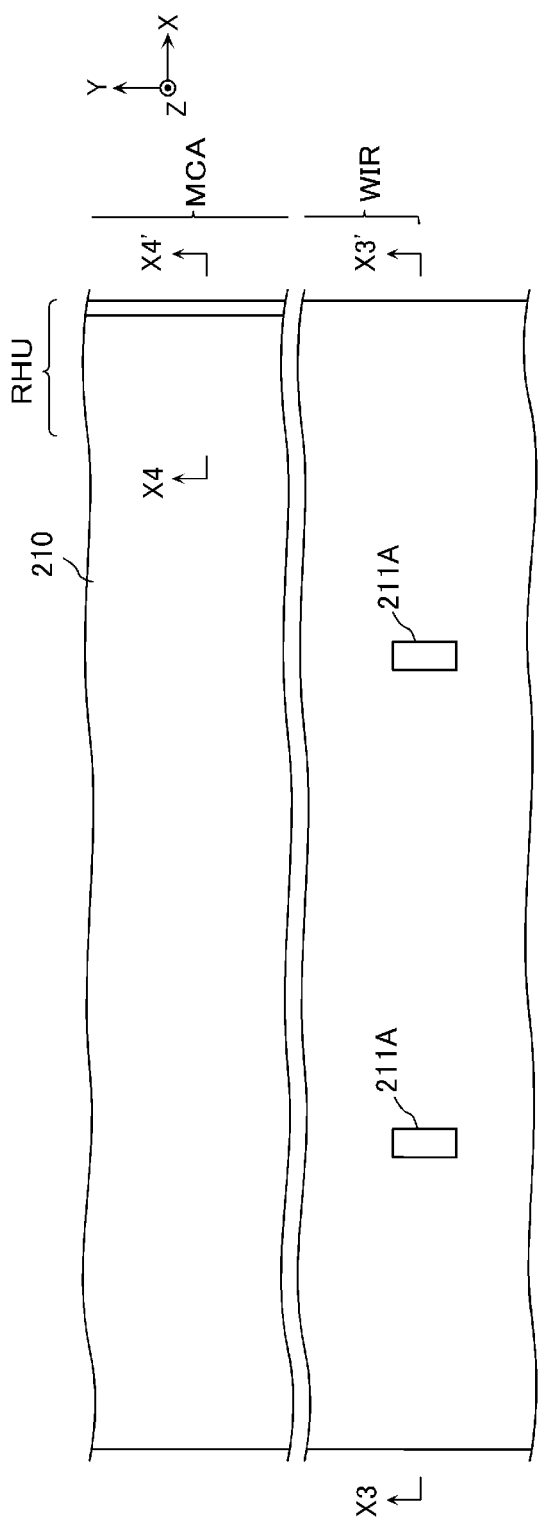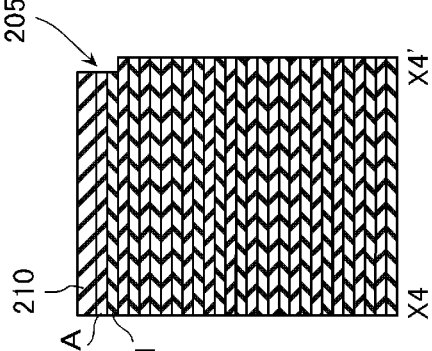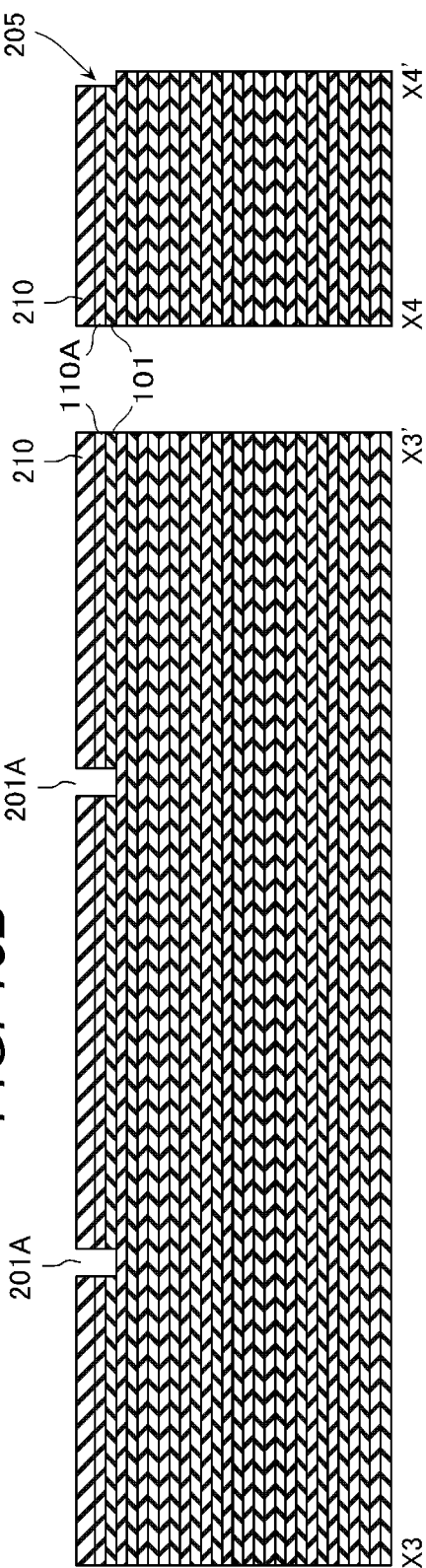

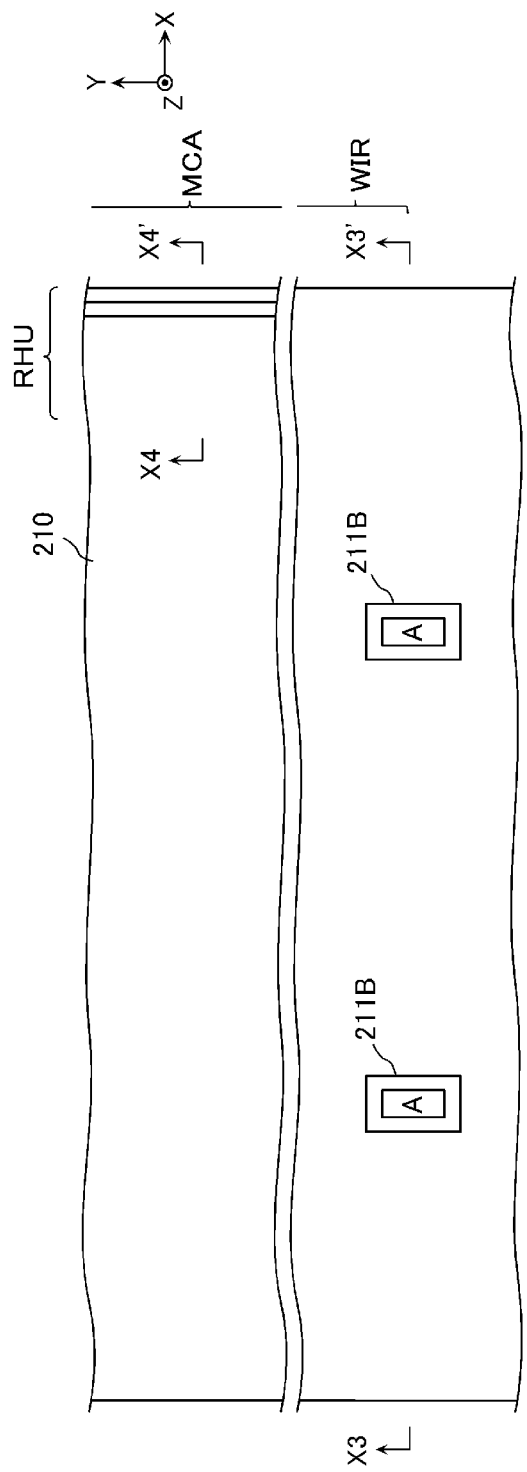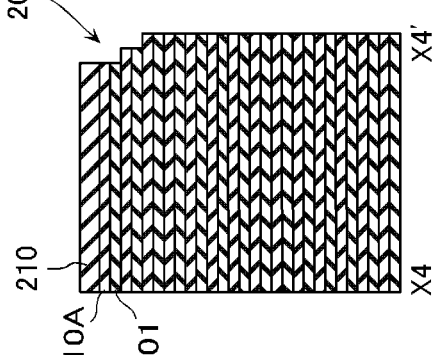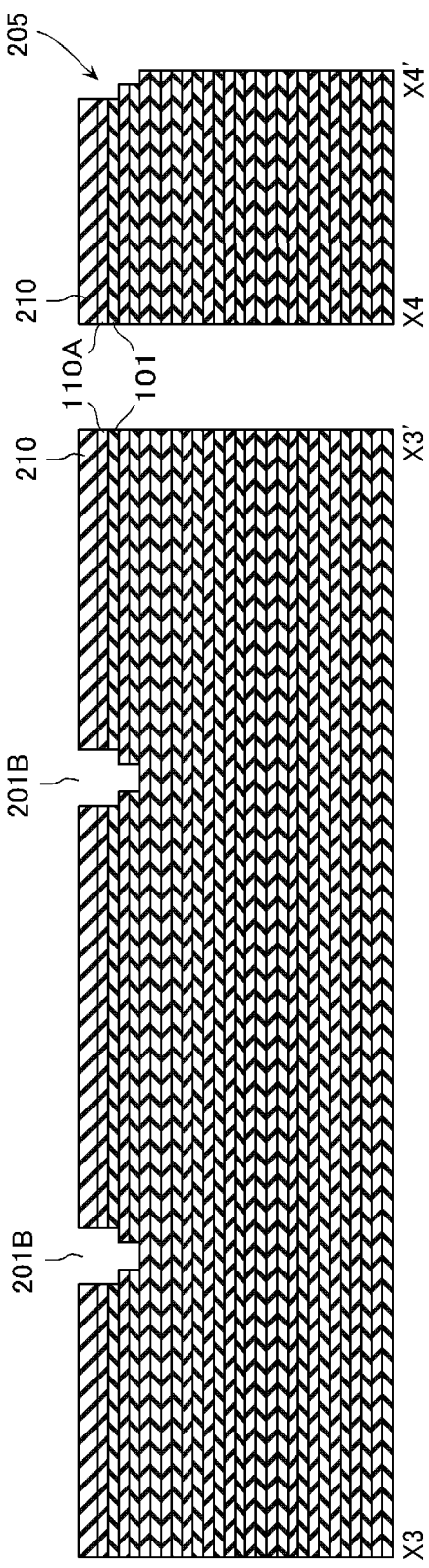

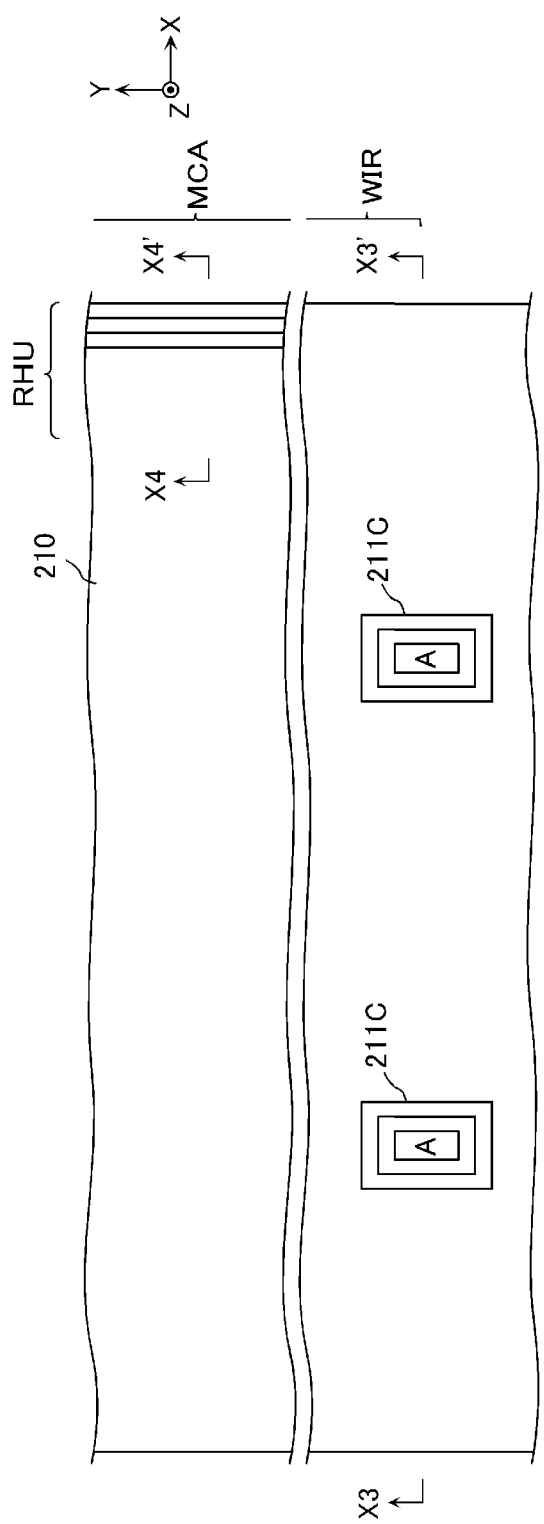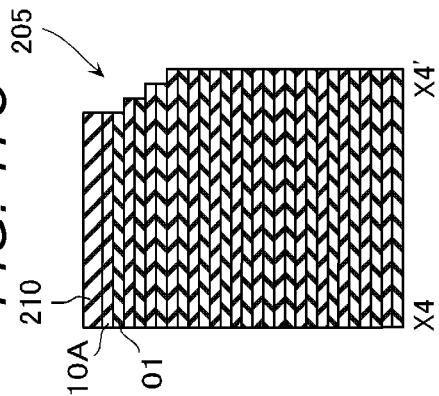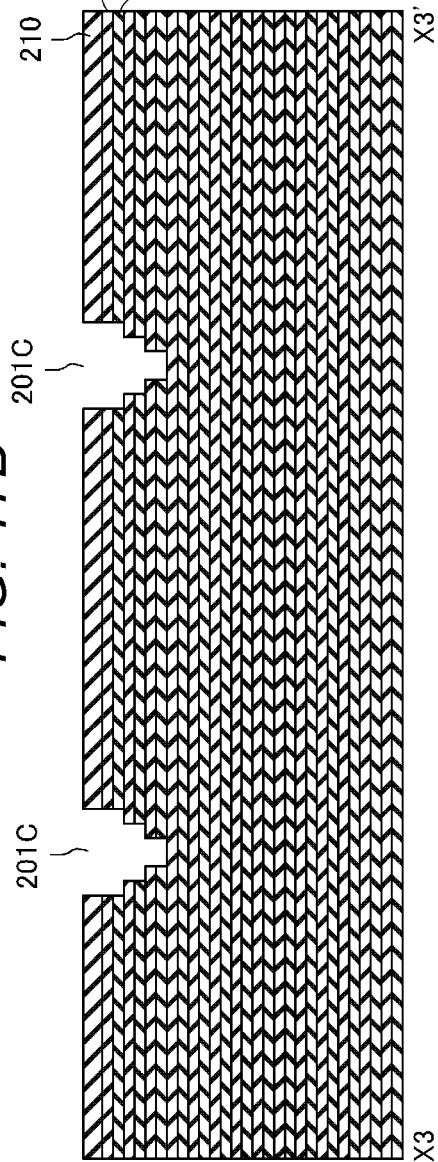

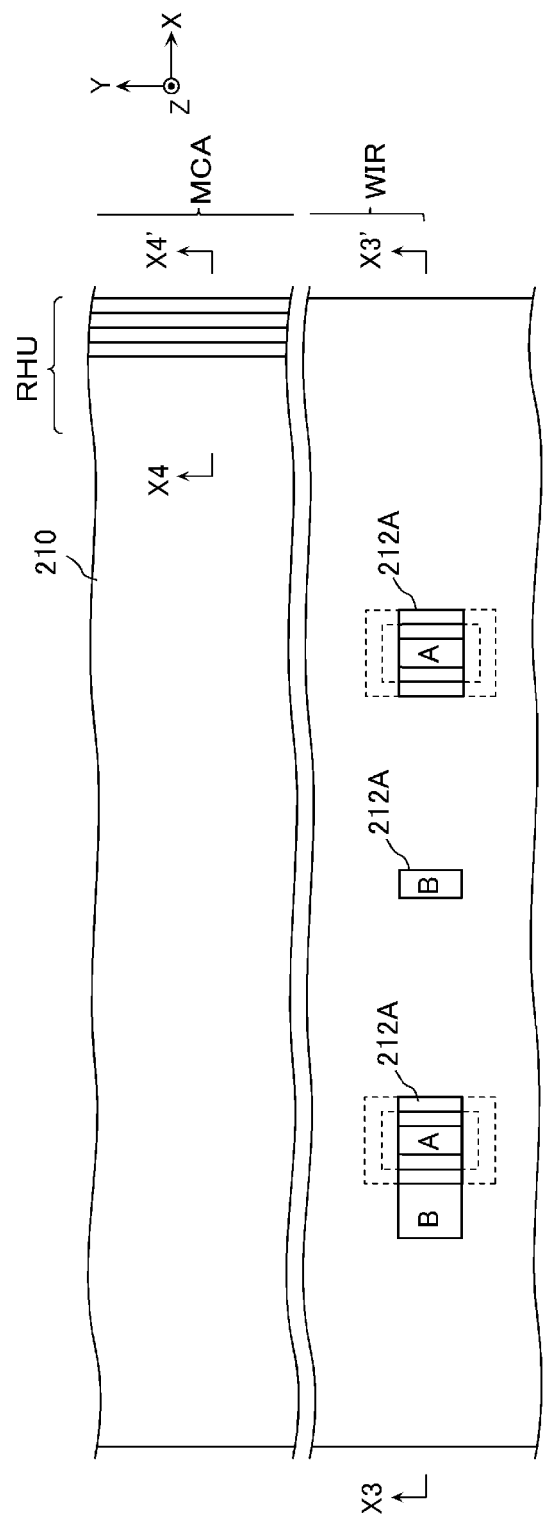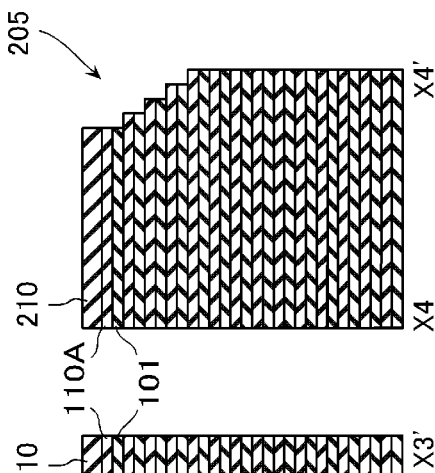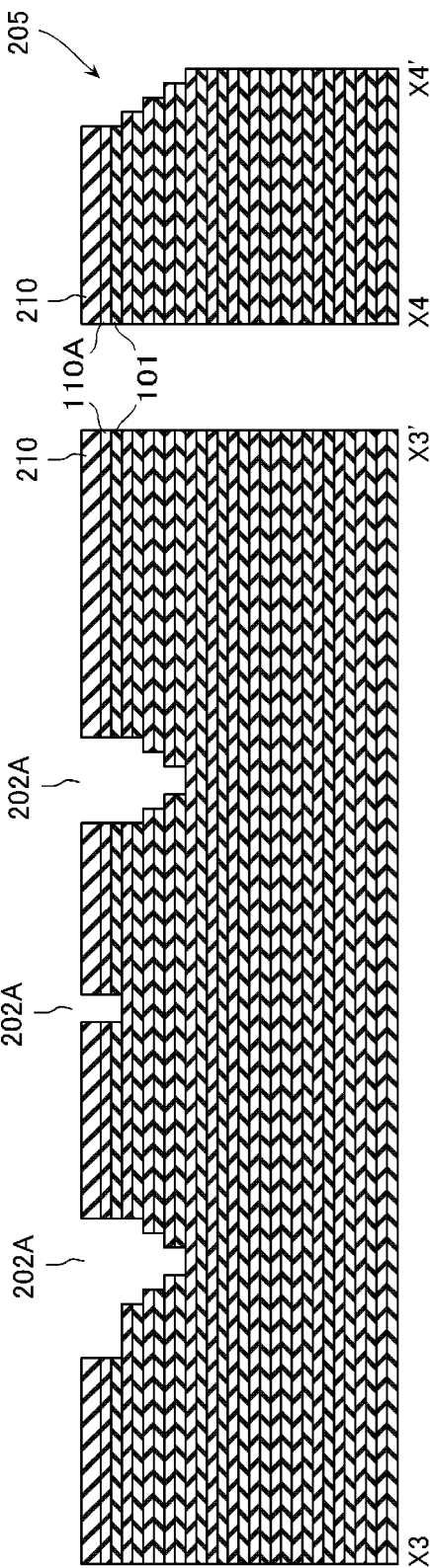

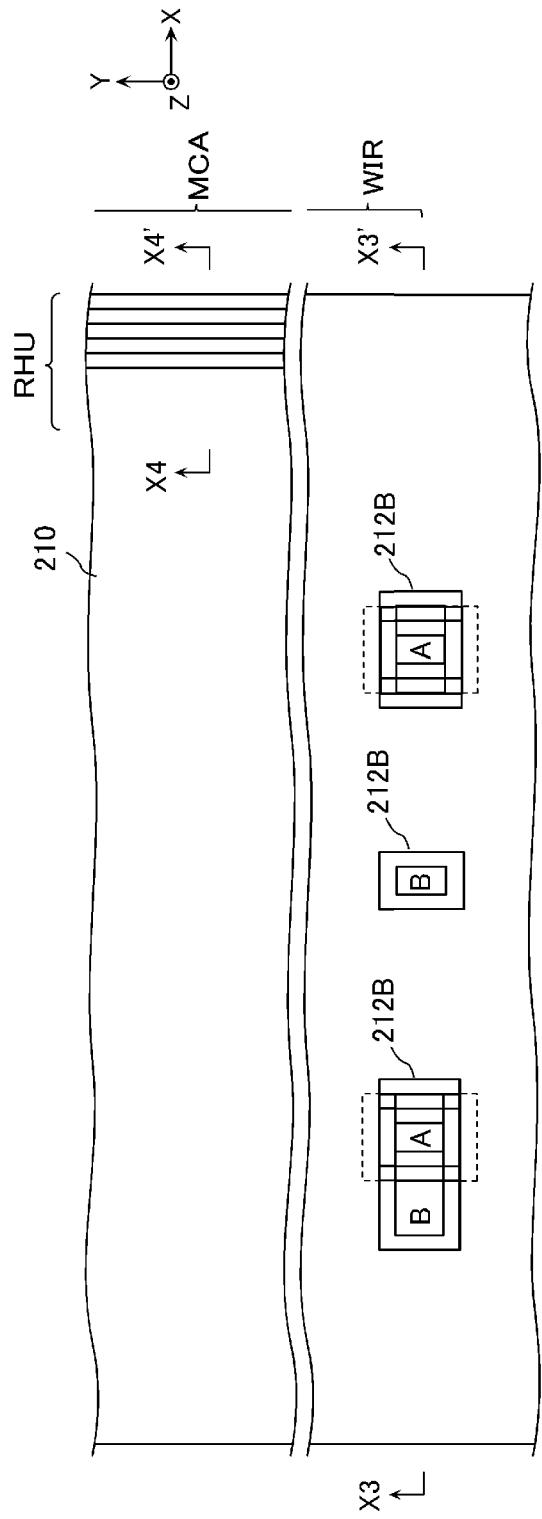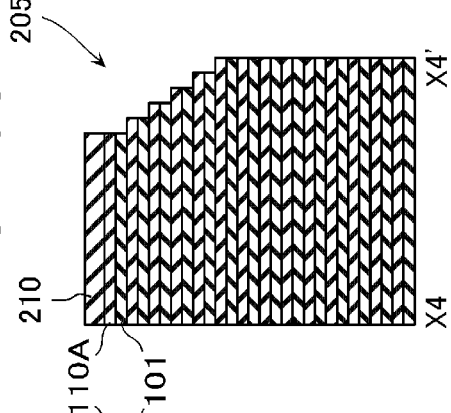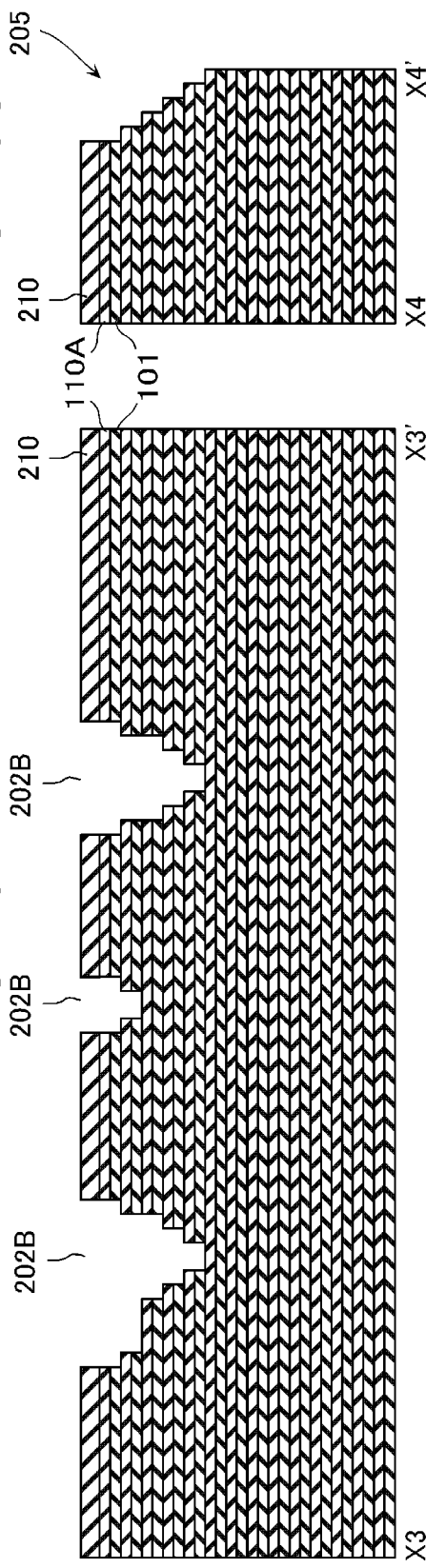

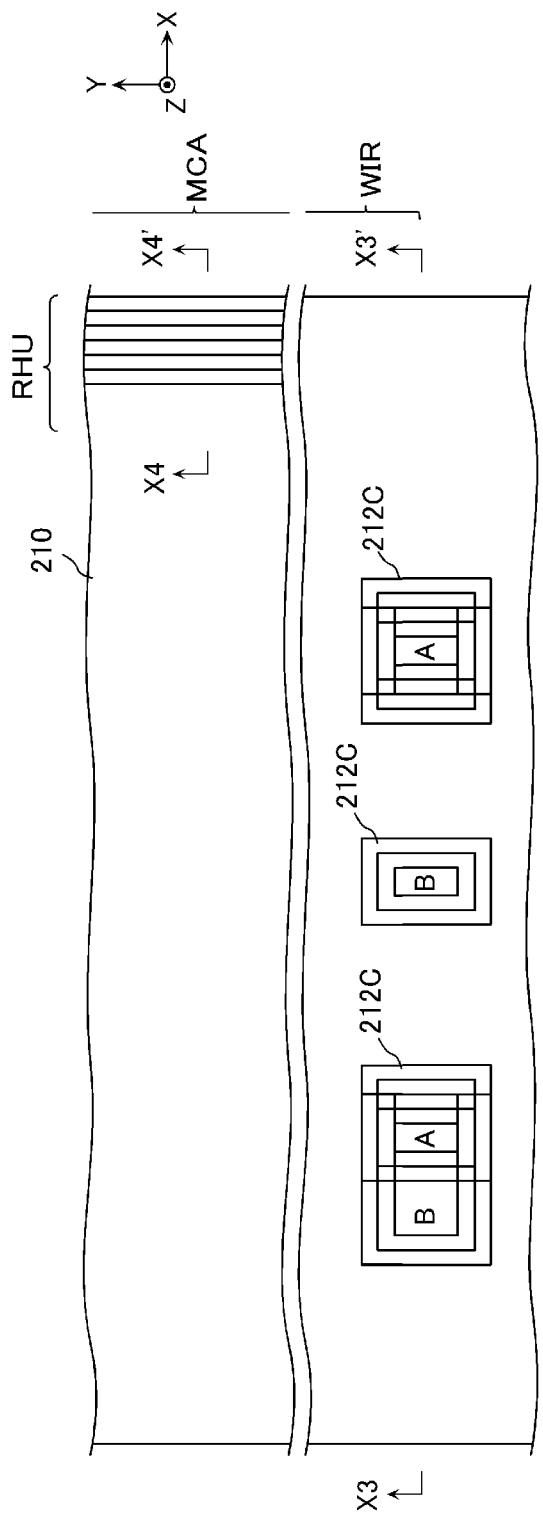
FIG. 20A
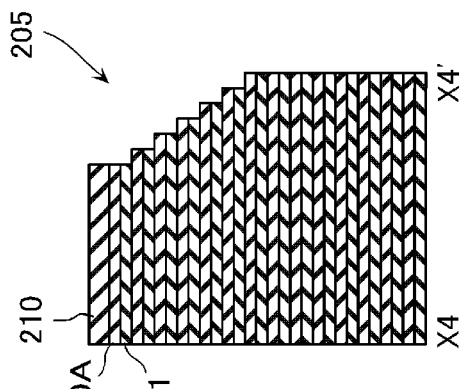
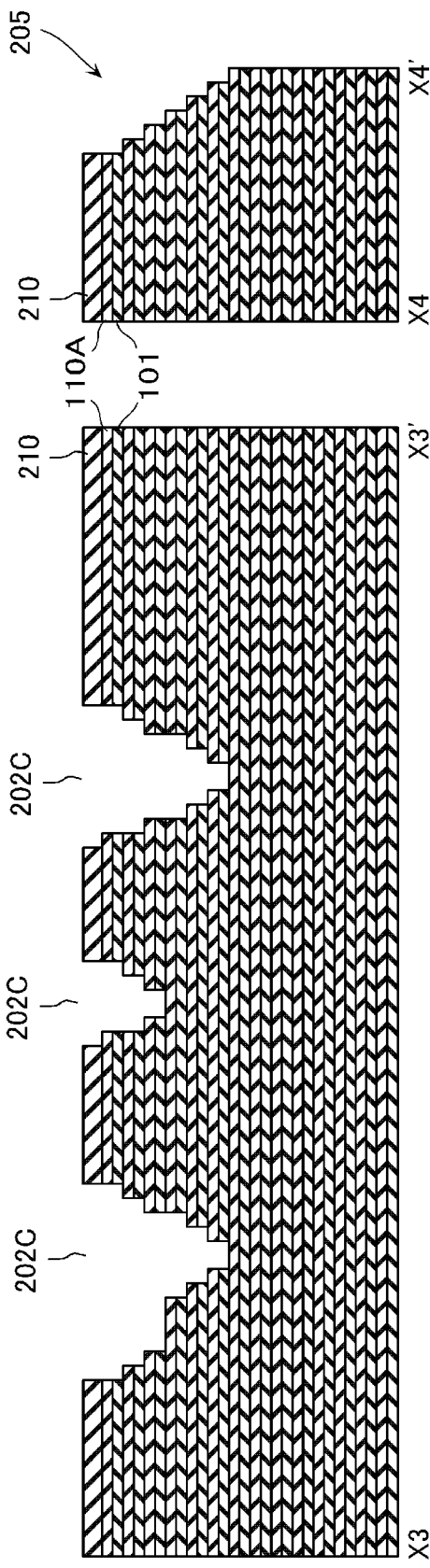
FIG. 20B
FIG. 20C

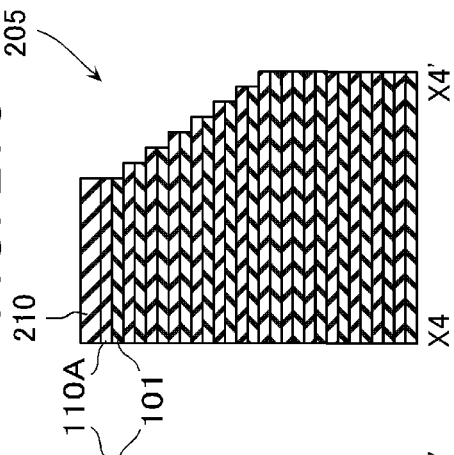
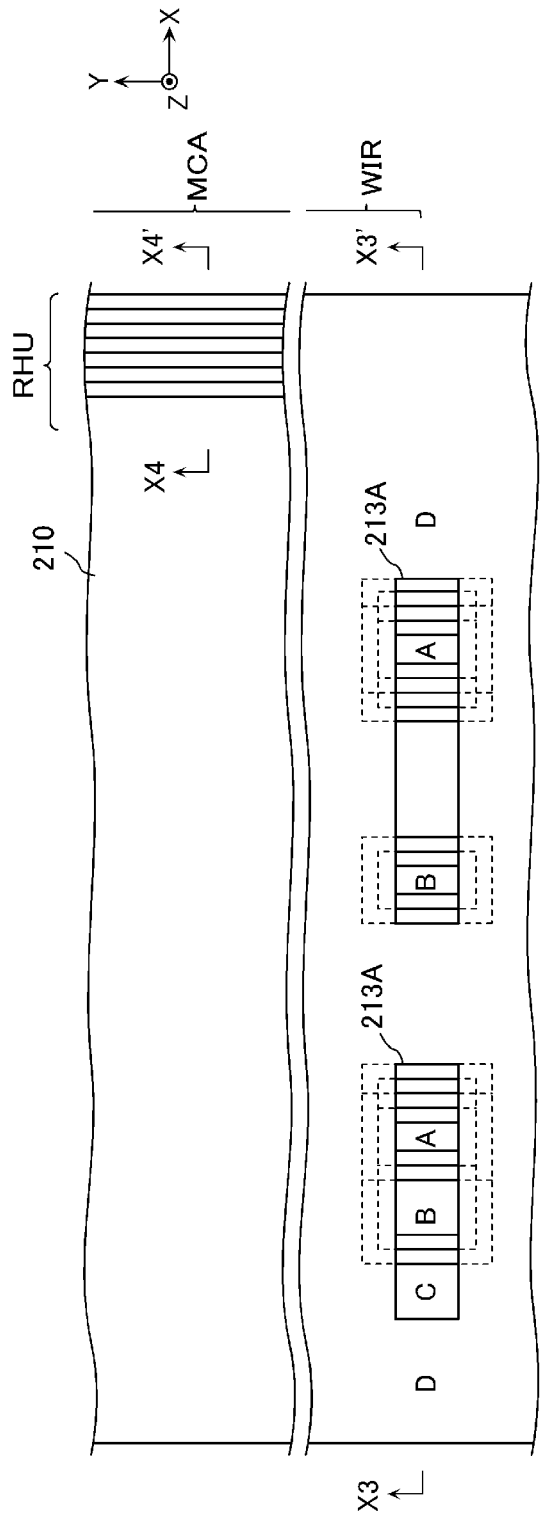
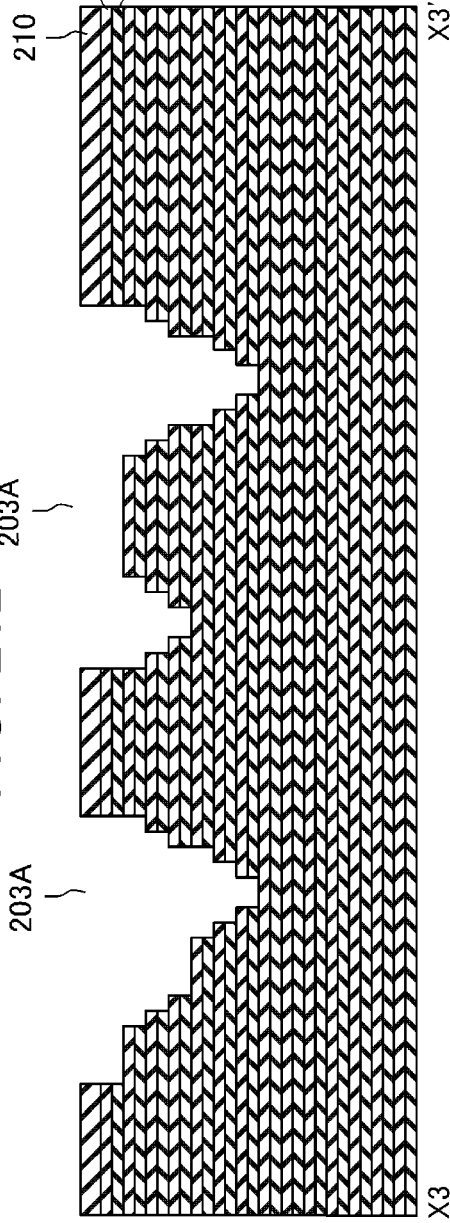

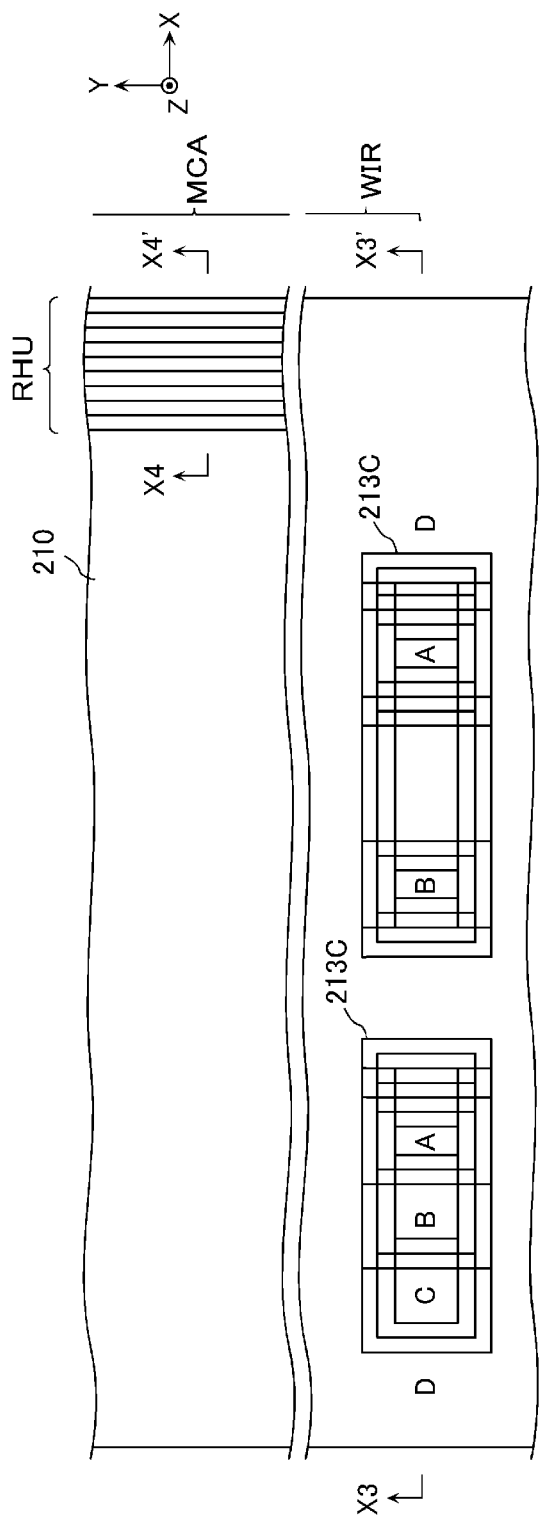
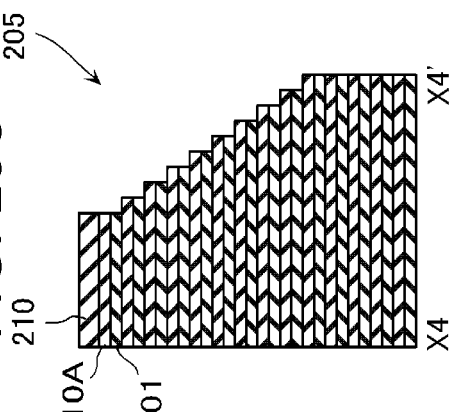
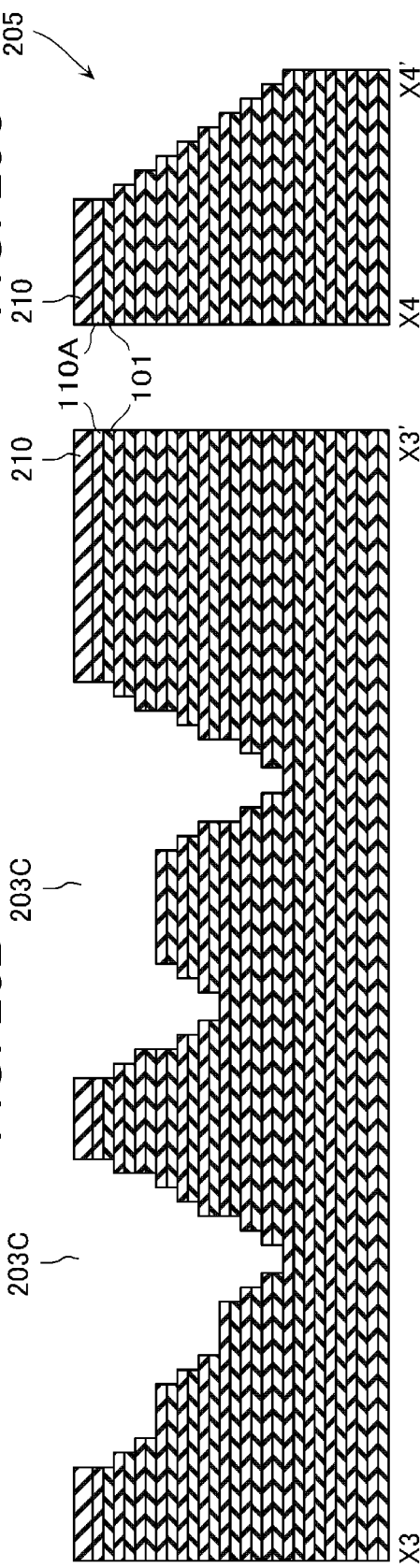

SEMICONDUCTOR STORAGE DEVICE

CROSS-REFERENCE TO RELATED APPLICATION(S)

This application is based upon and claims the benefit of priority from Japanese Patent Application No. 2021-150834 filed Sep. 16, 2021, the entire contents of which are incorporated herein by reference.

FIELD

Embodiments described herein relate generally to a semiconductor storage device.

BACKGROUND

A semiconductor storage device including a substrate and a stacked body in which conductive layers and insulating layers are alternately stacked on the substrate, is known.

DESCRIPTION OF THE DRAWINGS

FIGS. 15A to 15C are a schematic plan view and cross-sectional views illustrating a manufacturing process of the semiconductor storage device.

FIGS. 16A to 16C are a schematic plan view and cross-sectional views illustrating a manufacturing process of the semiconductor storage device.

FIGS. 17A to 17C are a schematic plan view and cross-sectional views illustrating a manufacturing process of the semiconductor storage device.

FIGS. 18A to 18C are a schematic plan view and cross-sectional views illustrating a manufacturing process of the semiconductor storage device.

FIGS. 19A to 19C are a schematic plan view and cross-sectional views illustrating a manufacturing process of the semiconductor storage device.

FIGS. 20A to 20C are a schematic plan view and cross-sectional views illustrating a manufacturing process of the semiconductor storage device.

FIGS. 21A to 21C are a schematic plan view and cross-sectional views illustrating a manufacturing process of the semiconductor storage device.

FIGS. 23A to 23C are a schematic plan view and cross-sectional views illustrating a manufacturing process of the semiconductor storage device.

DETAILED DESCRIPTION

Figure 1:
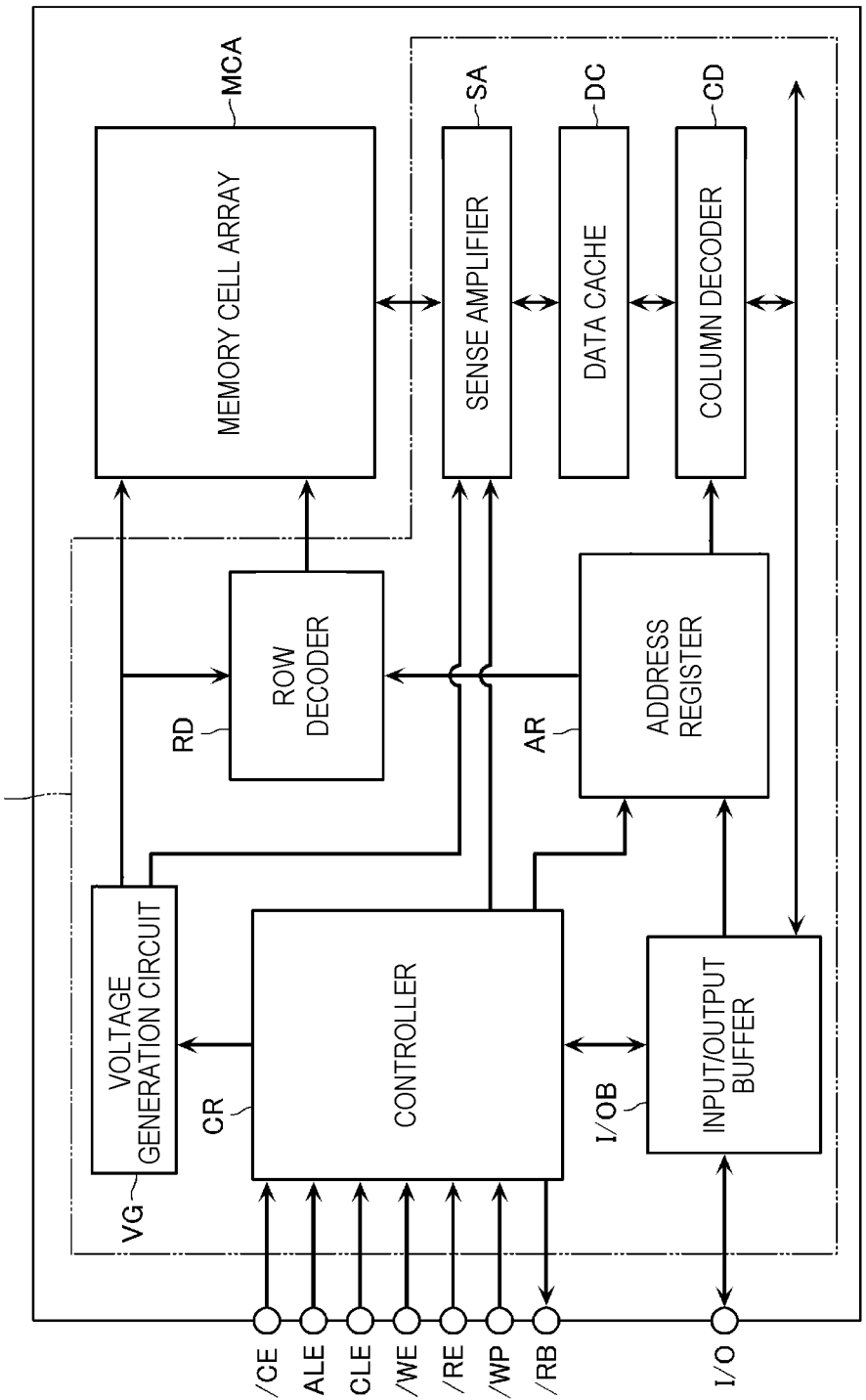
FIG. 1 is a block diagram illustrating the configuration of a semiconductor storage device according to a first embodiment.

Embodiments provide a semiconductor storage device having many wiring paths.

In general, according to one embodiment, a semiconductor storage device includes a memory cell array having a plurality of first conductive layers stacked in a first direction and a plurality of memory cells connected to the plurality of first conductive layers, a wiring layer, and an insulating layer between the memory cell array and the wiring layer and separating the memory cell array and the wiring layer in a second direction intersecting the first direction. The wiring layer includes a plurality of second conductive layers stacked in the first direction, each of the second conductive layers having a corresponding first conductive layer at a same layer, and a first contact connected to at least a part of the plurality of second conductive layers and extending in the first direction.

Next, a semiconductor storage device according to embodiments will be described in detail with reference to the accompanying drawings. The following embodiments are merely examples, and are not intended to limit the present disclosure. In addition, the following drawings are schematic, and certain configurations may be omitted for convenience of explanation. The same reference numerals may be given to common parts of the embodiments, and descriptions thereof may be omitted.

In the present specification, a direction intersecting the surface of a substrate is referred to as a first direction, a direction intersecting the first direction is referred to as a second direction, and a direction intersecting the first direction and the second direction is referred to as a third direction. Further, a predetermined direction parallel to the surface of the substrate is referred to as the X direction, a direction parallel to the surface of the substrate and perpendicular to the X direction is referred to as the Y direction, and a direction perpendicular to the surface of the substrate is referred to as the Z direction. In the following description, a case will be illustrated where the X direction, the Y direction, and the Z direction correspond to the third direction, the second direction, and the first direction, respectively. However, the first direction, the second direction, and the third direction are not limited to the X direction, the Y direction, and the Z direction, respectively.

Further, in the present specification, expressions such as "upward" and "downward" are defined with respect to the substrate. For example, the direction away from the substrate along the first direction is referred to as "upward", and the direction closer to the substrate along the first direction is referred to as "downward". When the lower surface or lower end of a configuration is referred to, it means the surface or end of the substrate of the configuration, and when the upper surface or upper end of a configuration is referred to, it means the surface or end on the opposite side of the substrate of the configuration. Further, the surface intersecting the second direction or the third direction is referred to as a side surface.

Further, in the present specification, the expression "semiconductor storage device" has various meanings such as a memory system including a memory die, a memory chip, a memory card, and a control die such as an SSD, and a configuration including a host computer such as a smartphone, a tablet terminal, and a personal computer.

Further, in the present specification, when a first configuration is "electrically connected" to a second configuration, it means that the first configuration is connected to the second configuration directly or via a circuit such as a wiring, a semiconductor member, or a transistor. For example, when three transistors are connected in series, even when the second transistor is in the OFF state, the first transistor is "electrically connected" to the third transistor.

First Embodiment

[Configuration]

Hereinafter, the configuration of a semiconductor storage device according to a first embodiment will be described with reference to the accompanying drawings.

FIG. 1 is a block diagram illustrating the configuration of the semiconductor storage device according to the first embodiment.

The semiconductor storage device according to the present embodiment includes a memory cell array MCA and a peripheral circuit PC that controls the memory cell array MCA.

Figure 2:
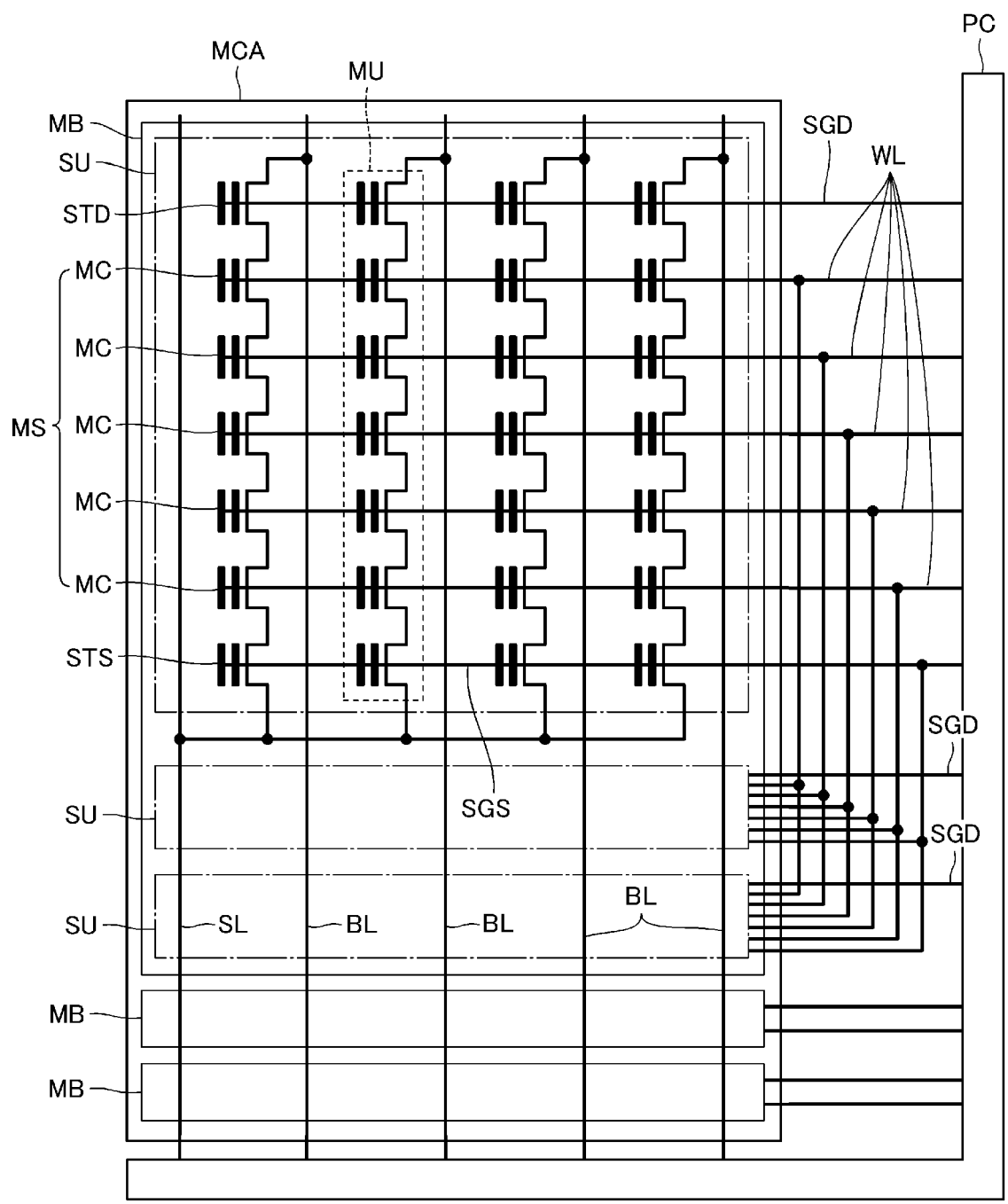
FIG. 2 is an equivalent circuit diagram schematically illustrating the configuration of a memory cell array in the semiconductor storage device.

FIG. 2 is an equivalent circuit diagram schematically illustrating the configuration of the memory cell array MCA. The memory cell array MCA has, for example, a plurality of NAND-connected memory cells MCs.

The memory cell array MCA includes a plurality of memory blocks MBs. Each of the plurality of memory blocks MBs includes a plurality of string units SUs. Each of the plurality of string units SU includes a plurality of memory units MUs. One ends of the plurality of memory units MUs are each connected to the peripheral circuit PC via a bit line BL. Further, the other ends of the plurality of memory units MUs are each connected to the peripheral circuit PC via a common source line SL.

The memory unit MU includes a drain select transistor STD, a plurality of memory cells MCs (memory string MS), and a source select transistor STS, which are connected in series between the bit line BL and the source line SL. Hereinafter, the drain select transistor STD and the source select transistor STS may be simply referred to as a select transistor (STD, STS).

The memory cell MC is a field effect transistor (memory transistor) including a semiconductor layer, a gate insulating film, and a gate electrode. The semiconductor layer functions as a channel region. The gate insulating film includes a memory film capable of storing data. The memory film is a charge storage film such as, for example, a silicon nitride film (SiN) or a floating gate. The threshold voltage of the memory cell MC changes according to the amount of charges in the charge storage film. A word line WL is connected to each of the gate electrodes of a plurality of memory cells MCs corresponding to one memory string MS. Each of the word lines WLs is commonly connected to all memory strings MSs in one memory block MB.

The select transistor (STD, STS) is a field effect transistor including a semiconductor layer that functions as a channel region, a gate insulating film, and a gate electrode. In this example, one memory unit MU is illustrated to include only one drain select transistor STD and one source select transistor STS. However, each of the select transistors STD and STS in one memory unit MU may include one or plural select transistors. Select gate lines (SGD, SGS) are connected to the gate electrodes of the select transistors (STD, STS), respectively. One drain select gate line SGD is provided for each string unit SU and is commonly connected to all the memory units MUs in one string unit SU. The source select gate line SGS is commonly connected to all memory units MUs in a plurality of string units SUs in one memory block MB.

As illustrated in FIG. 1, the peripheral circuit PC includes a voltage generation circuit VG that generates an operating voltage, an input/output buffer I/OB that inputs/outputs data, addresses, commands, and status information, an address register AR that stores address data, a row decoder RD and a column decoder CD that decode the address, a data cache DC that stores data to be written to the memory cell array MCA and data read from the memory cell array MCA, a sense amplifier SA connected to the bit line BL of the memory cell array MCA, and a controller CR that controls these elements.

The voltage generation circuit VG generates a plurality of operating voltages applied to the bit line BL, the source line SL, the word line WL, and the select gate line (SGD, SGS) during the read operation, write operation, and erase operation for the memory cell array MCA according to the control signal from the controller CR and outputs the generated operating voltages to the memory cell array MCA, the row decoder RD, and the sense amplifier SA. The voltage generation circuit VG includes, for example, a plurality of charge pump circuits and a plurality of regulator circuits.

The input/output buffer I/OB receives addresses, data, and commands from the outside via the I/O terminal, and transmits data and status information to the outside via the I/O terminal.

The row decoder RD refers to the row address in the address register AR according to the control signal from the controller CR, decodes this row address, and applies a voltage to the word line WL and the source select gate line SGS connected to the memory block MB corresponding to the row address, and the drain select gate line SGD connected to the string unit SU corresponding to the row address, to activate these lines.

The column decoder CD refers to the column address in the address register AR according to the control signal from the controller CR, decodes this column address, and applies a voltage to the bit line BL corresponding to the column address.

The data cache DC temporarily stores data transferred between the input/output buffer I/OB and the sense amplifier SA.

The sense amplifier SA is connected to a plurality of bit lines BL. The sense amplifier SA includes, for example, a plurality of sense amplifier units, each corresponding to one of the bit lines BL. The sense amplifier unit includes a clamp transistor that charges the bit line BL based on the voltage generated by the voltage generation circuit VG, a sensing circuit that senses the voltage or current of the bit line BL, a plurality of latches that stores the output signal and write data of the sensing circuit and the verify path flag FLG, and a logic circuit. The logic circuit determines the data stored in the memory cell MC by referring to the data stored in the lower page in the latch, for example, during the read operation. Further, for example, in the write operation, the voltage of the bit line BL is controlled by referring to the data stored in the lower page in the latch.

The controller CR supplies a chip enable signal/CE, an address latch enable signal ALE, a command latch enable signal CLE, a write enable signal/WE, a read enable signal/RE, and a write protect signal/WP, through corresponding input terminals, and controls each part that latches addresses and commands, and reads/writes data based on these control signals. The controller CR has a command register, refers to the command data stored in the command register, decodes this command data, controls each part, and outputs a ready/busy signal/RB to the outside via a/RB terminal.

Figure 3:
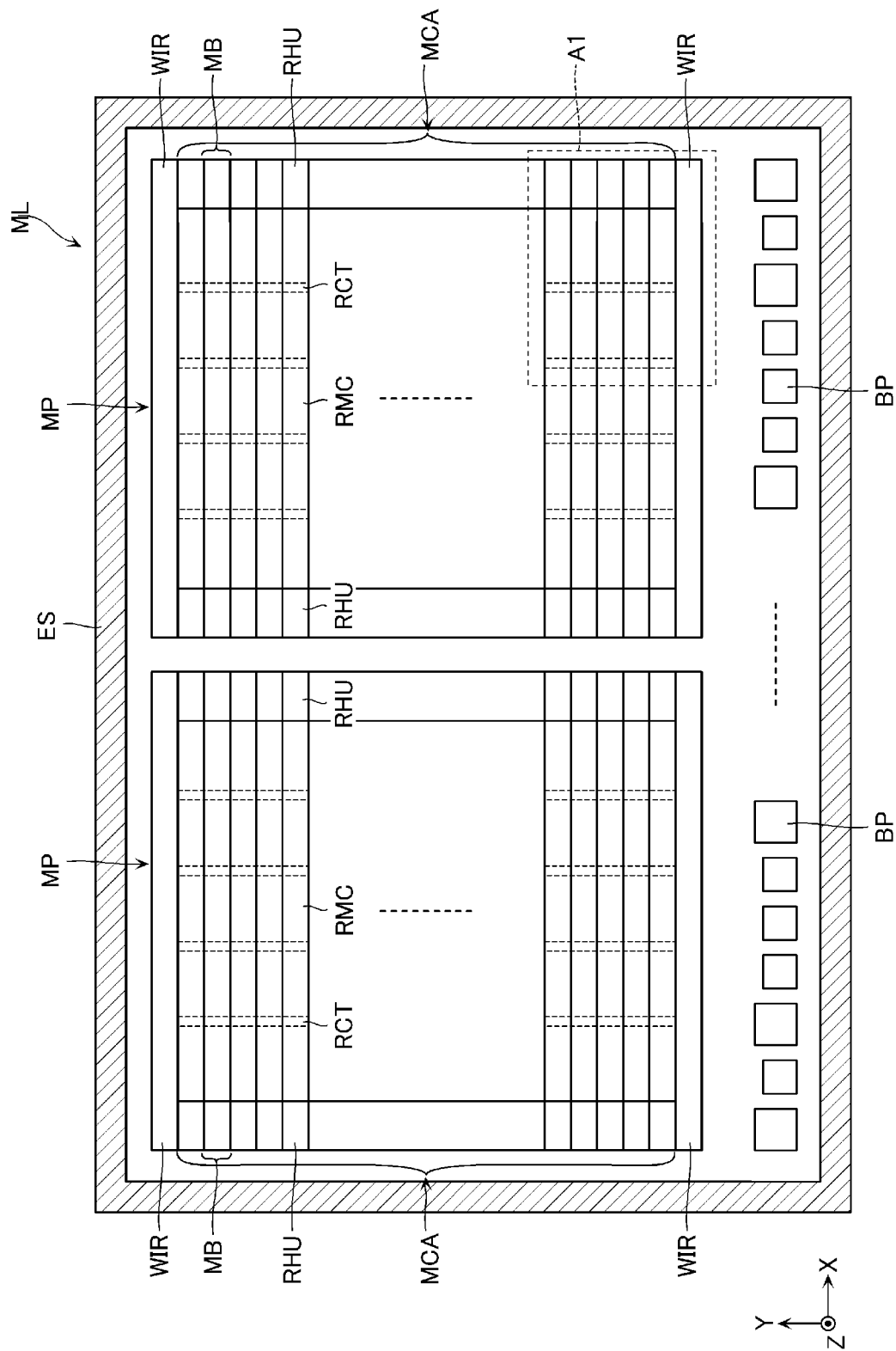
FIG. 3 is a plan view of a memory layer of the semiconductor storage device as viewed from above in the Z direction.
Figure 4:
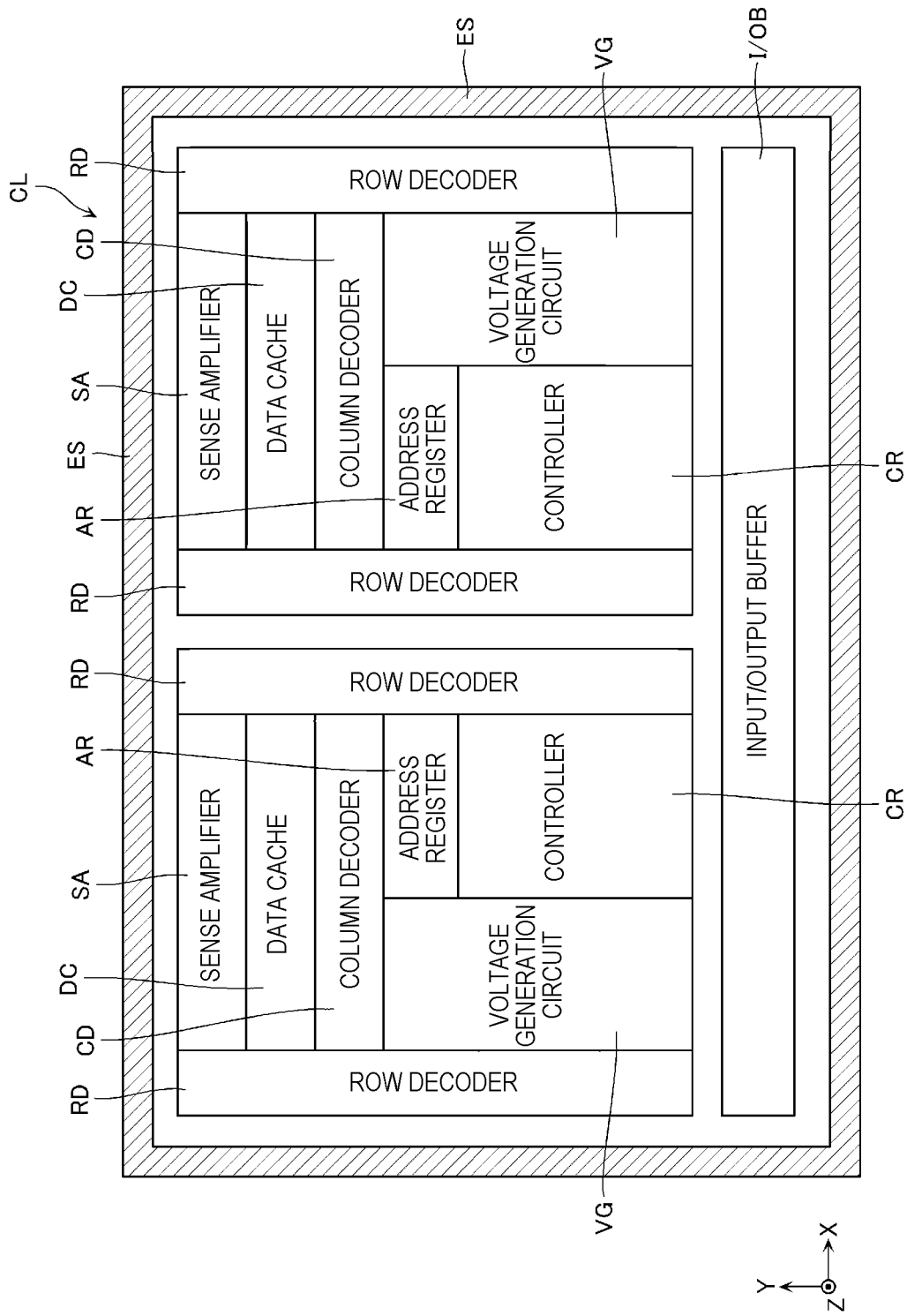
FIG. 4 is a plan view of a circuit layer of the semiconductor storage device as viewed from above in the Z direction.

FIG. 3 is a plan view of a memory layer ML of the semiconductor storage device according to the present embodiment as viewed from above in the Z direction. FIG. 4 is a plan view of a circuit layer CL of the semiconductor storage device as viewed from above in the Z direction.

In the semiconductor storage device of the present embodiment, the memory layer ML illustrated in FIG. 3 is provided on the circuit layer CL illustrated in FIG. 4. The memory layer ML is stacked on the circuit layer CL.

As illustrated in FIG. 3, the memory layer ML has two memory planes MPs arranged in the X direction and a plurality of bonding pads BPs arranged on one side of the memory planes MPs in the Y direction and arranged in the X direction. The memory plane MP has a memory cell array MCA and wiring layers WIRs provided on both sides of the memory cell array MCA in the Y direction and extending in the X direction. The memory cell array MCA has a plurality of memory blocks MB. The plurality of memory block MBs extend in the X direction and are arranged in the Y direction. Each memory block MB includes a plurality of memory cell regions RMCs arranged in the X direction, a contact connection region RCT arranged between the memory cell regions RMCs, and hookup regions RHU arranged at both ends in the X direction. The memory plane MP and the bonding pad BP are surrounded by an edge seal ES. The edge seal ES has a crack growth preventing function of stopping cracks generated in a chip during dicing, a filth invasion prevention function of preventing impurity ions from entering from the outside, and a function of providing a route for releasing electric charges generated in the manufacturing process.

Each circuit block of the circuit layer CL corresponds to the circuit block of the peripheral circuit PC of FIG. 1, and is disposed as illustrated in, for example, FIG. 4. A row decoder RD is disposed below the hookup region RHU located at both ends of each memory plane MP of the memory layer ML in the X direction. A sense amplifier SA, a data cache DC, a column decoder CD, an address register AR, a controller CR, and a voltage generation circuit VG are arranged in a region that is between the row decoders RDs on the lower side of each memory plane MP. An input/output buffer I/OB is disposed below the bonding pads BP. These circuit elements are surrounded by the edge seal ES.

Figure 5:
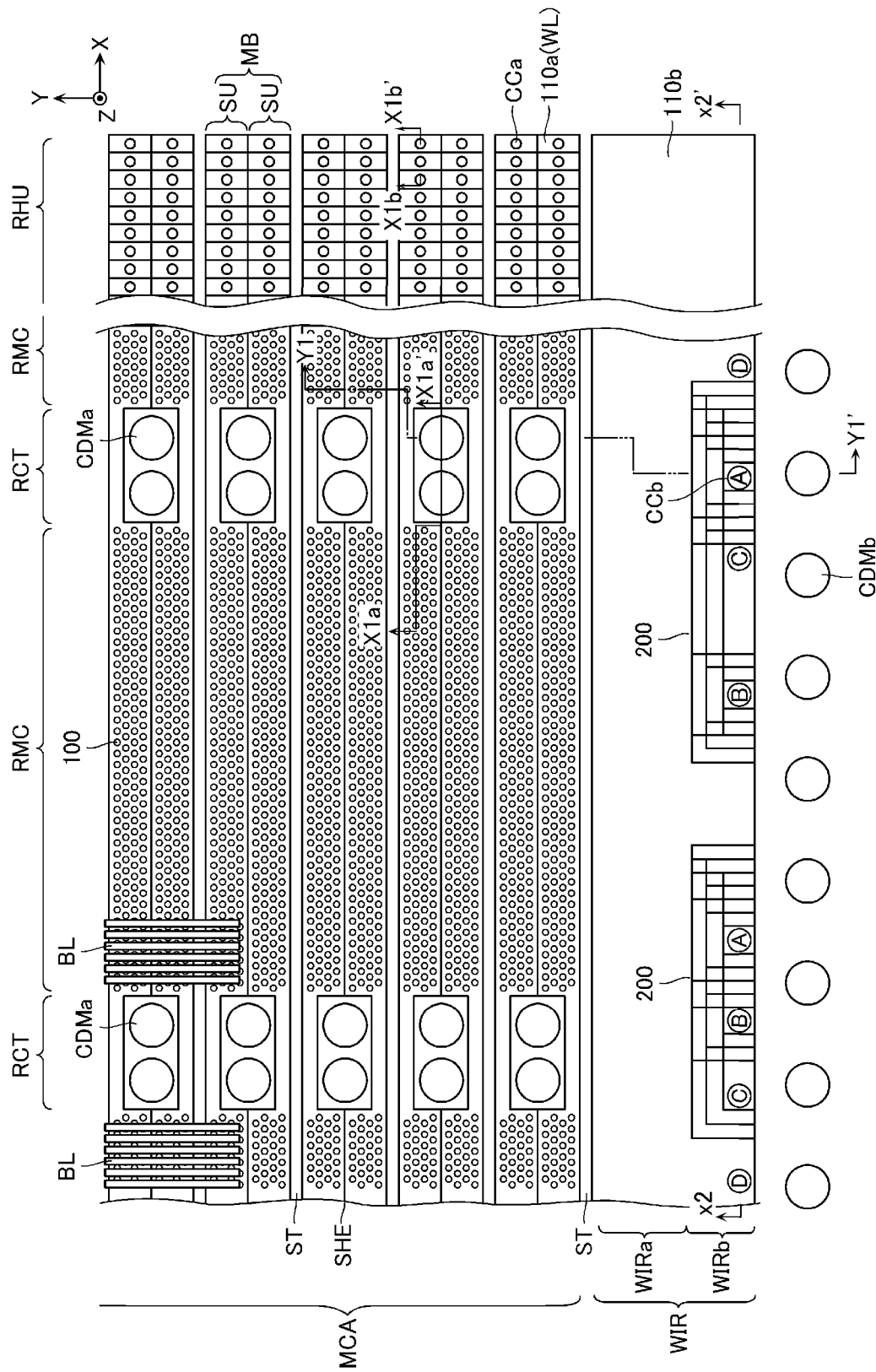
FIG. 5 is a plan view schematically illustrating an enlarged portion A1 of FIG. 3.

FIG. 5 is a plan view schematically illustrating an enlarged portion A1 of FIG. 3. Each memory block MB has a plurality of conductive layers 110a arranged in the Z direction. The plurality of conductive layers 110a in each memory block MB are insulated and separated from each other in the Y direction by the insulating layer ST extending in the X direction. In this example, each memory block MB has two string units SU in the Y direction. The two string units SU in one memory block MB are separated from each other in the Y direction by an insulating layer SHE. A plurality of memory structures 100 is provided side by side in the X and Y directions in the memory cell region RMC. In the contact connection region RCT, a plurality of contacts CDMas penetrating the memory layer ML down to the circuit layer CL is disposed in the X direction.

The wiring layer WIR is adjacent to the memory cell array MCA in the Y direction. An insulating layer ST is provided between the memory cell array MCA and the wiring layer WIR, whereby the memory cell array MCA and the wiring layer WIR are insulated and separated from each other. The wiring layer WIR has a plurality of conductive layers 110b arranged in the Z direction. The conductive layer 110b has a wiring region WIRa on the side closer to the memory cell array MCA and a connection region WIRb on the side farther from the memory cell array MCA. The wiring region WIRa is continuous in the X direction. The connection region WIRb has a contact insertion portion 200 cut out in a rectangular shape. A contact CCb passes through the contact insertion portion 200 and is connected to the conductive layer 110b in the lower layer. FIG. 5 represents an example in which the width of the wiring layer WIR in the Y direction is larger than the width of the conductive layer 110a in the Y direction between two adjacent insulating layers ST in the memory cell array MCA (i.e., the width of the word line WL in the Y direction). However, the width of the wiring layer WIR in the Y direction may be smaller than the width of the conductive layer 110a in the Y direction between two adjacent insulating layers ST in the Y direction (i.e., the width of the word line WL in the Y direction).

On the side of the wiring layer WIR opposite to the memory cell array MCA, a plurality of contacts CDMbs penetrating the memory layer ML down to the peripheral region of the circuit layer CL in the Z direction is disposed in the X direction. The peripheral wiring region includes the wiring layer WIR and the contact CDMb. In this example, the contacts CDMbs are arranged in the X direction, but the arrangement direction of the contacts CDMbs may be any direction, and may be arranged in, for example, two random directions.

Figure 6:
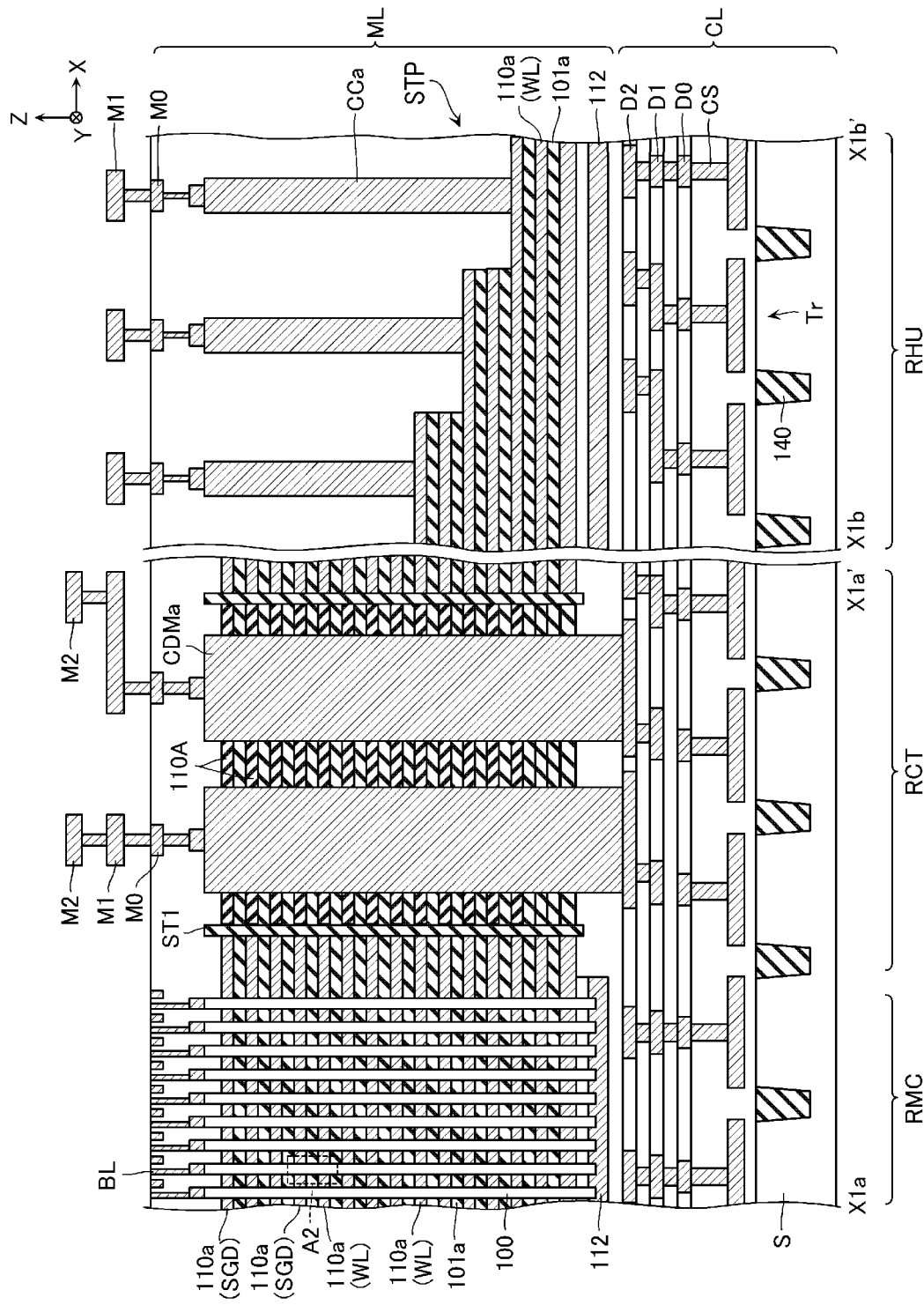
FIG. 6 is a schematic cross-sectional view of a cross-section taken along line X1-X1' in FIG. 5.

FIG. 6 is a schematic cross-section viewed in the Y direction, of the portions cut along line X1a-X1a' and line X1b-X1b' in FIG. 5. Hereinafter, in the present embodiment, an example will be illustrated in which four conductive layers 110a (SGD) functioning as the drain select gate line SGD and ten conductive layers 110a (WL) functioning as the word line WL are stacked. However, the number of stacked conductive layers 110a (SGD) and 110a (WL) is not limited to fourteen (14) layers.

The circuit layer CL is formed on the substrate S. The substrate S is a semiconductor substrate containing, for example, single crystal silicon (Si). The substrate S has, for example, a double-well structure having an N-type impurity layer such as phosphorus (P) on the surface of the semiconductor substrate and further having a P-type impurity layer such as boron (B) in the N-type impurity layer. In the double-well structure, an insulating layer 140 such as SiO2 is provided for separating the transistors Tr. A contact CS such as tungsten (W) and wirings D0, D1, and D2 are sequentially provided on the transistor Tr from the bottom to the top.

The memory layer ML has a plurality of conductive layers 110a extending in the XY direction and arranged in the Z direction in the memory cell region RMC and the hookup region RHU. The plurality of conductive layers 110a include, for example, a stacked film of titanium nitride (TiN) and tungsten (W). An insulating layer 101a such as silicon dioxide (SiO2) is provided between the plurality of conductive layers 110a. In the contact connection region RCT of the memory layer ML, a plurality of insulating layers 110A such as silicon nitride (SiN) is provided on the layers corresponding to the plurality of conductive layers 110a of the memory cell region RMC and the hookup region RHU. An insulating layer 101a is provided between the plurality of insulating layers 110A. Insulating layers ST1 are provided on both sides of the contact connection region RCT in the X direction. The insulating layer ST1 may not be provided in some embodiments. In such embodiments, in the wet etching step of removing the insulating layer 110A, the wet etching time may be adjusted so that the insulating layer 110A remains around the contact CDMa of the contact connection region RCT.

The memory cell region RMC is provided with, for example, a plurality of columnar memory structures 100 that extends in the Z direction through the plurality of conductive layers 110a and the insulating layer 101a. The hookup region RHU has a staircase portion STP formed by the X-direction end of the conductive layers 110a moving away from the memory cell region RMC as it approaches the substrate S. Each conductive layer 110a of the staircase portion STP is connected to a contact CCa extending in the Z direction. In the portion where the insulating layers 110A and 101a of the contact connection region RCT are stacked, a contact CDMa penetrates this portion in the Z direction and extends to the circuit layer CL. A plurality of wirings M0, M1, and M2 made of metal such as tungsten (W), copper (Cu) and aluminum (Al) is connected to the upper end of the memory structure 100 and the upper ends of the contacts CCa and CDMa. An upper wiring layer includes wirings M1 and M2. The upper wiring layer is stacked on the memory layer ML.

The memory structures 100 are arranged in a predetermined pattern in the X direction and the Y direction in the memory cell region RMC. These memory structures 100 function as a memory unit MU. The upper end of the memory structure 100 is connected to the bit line BL, and the lower end thereof is connected to the conductive layer 112.

Figure 7:
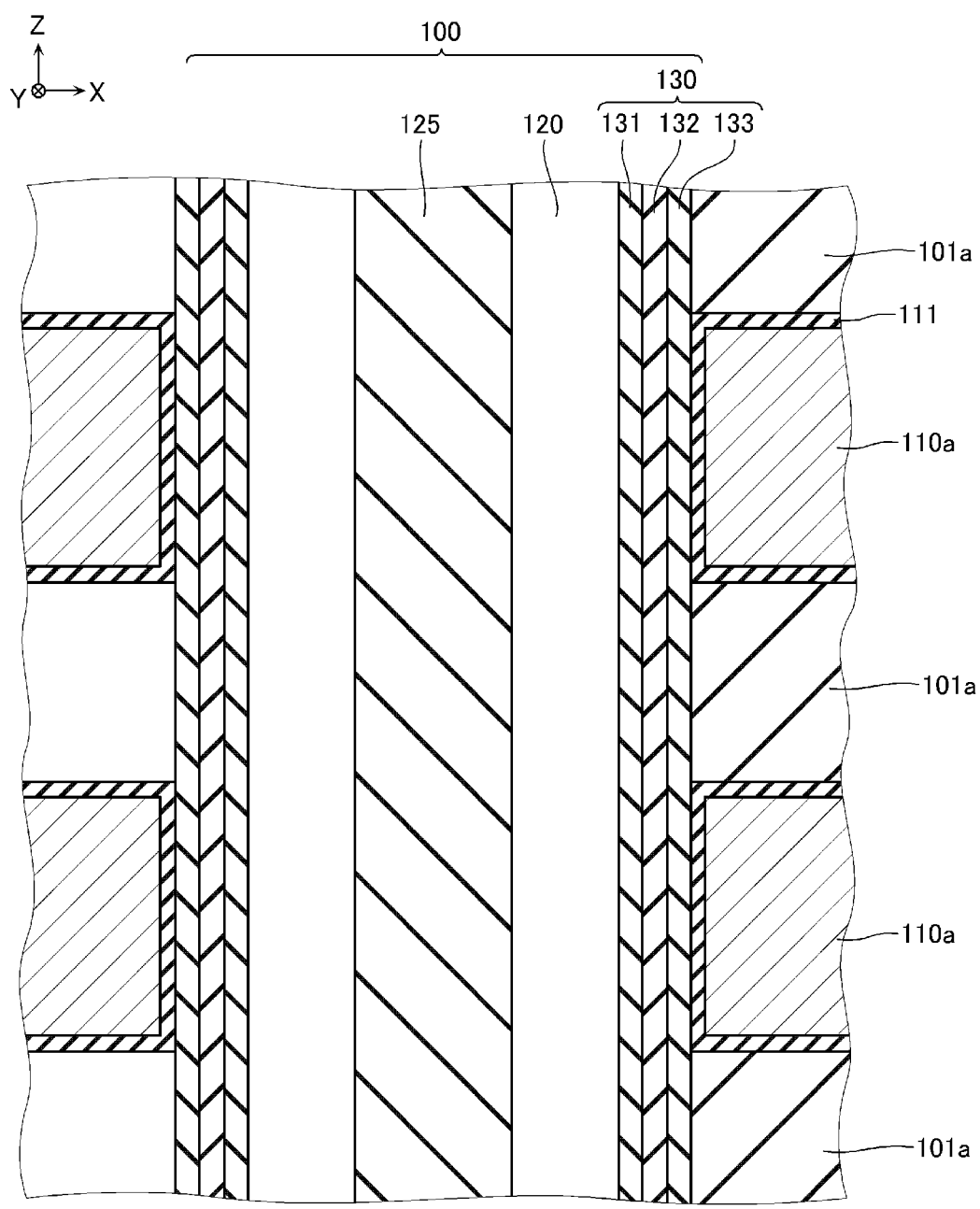
FIG. 7 is a cross-sectional view of an enlarged portion A2 of FIG. 6.

FIG. 7 is a cross-sectional view of an enlarged portion A2 of FIG. 6. As illustrated in FIG. 7, the memory structure 100 includes a semiconductor layer 120 extending in the Z direction and a gate insulating film 130 provided between the semiconductor layer 120 and the conductive layer 110a.

The semiconductor layer 120 functions as, for example, a channel region of a plurality of memory cells MC and drain select transistors STD provided in one memory unit MU (see, for example, FIG. 2). The semiconductor layer 120 has, for example, a substantially cylindrical shape, and an insulating layer 125 such as silicon oxide (SiO2) is embedded in the central portion thereof. The semiconductor layer 120 contains, for example, undoped polycrystalline or single crystal silicon (Si).

The gate insulating film 130 is provided at each intersection of the semiconductor layer 120 and the conductive layer 110a. The gate insulating film 130 includes a tunnel insulating film 131, a charge storage film 132, and a block insulating film 133, which are stacked between the semiconductor layer 120 and the conductive layer 110a. The tunnel insulating film 131 and the block insulating film 133 are, for example, insulating films such as silicon oxide (SiO2). The charge storage film 132 constitutes a memory film and is a film capable of storing electric charges such as silicon nitride (SiN).

The conductive layers 110a are substantially plate-shaped conductive layers that are arranged in the Z direction via an insulating layer 101a such as silicon oxide and extend in the X and Y directions. The plurality of conductive layers 110a span the memory cell region RMC, a part of the contact connection region RCT, and the hookup region RHU. A high-dielectric film 111 such as alumina (Al2O3) is provided on the surface of the conductive layer 110a. However, the high-dielectric film 111 may not be provided.

Figure 8:
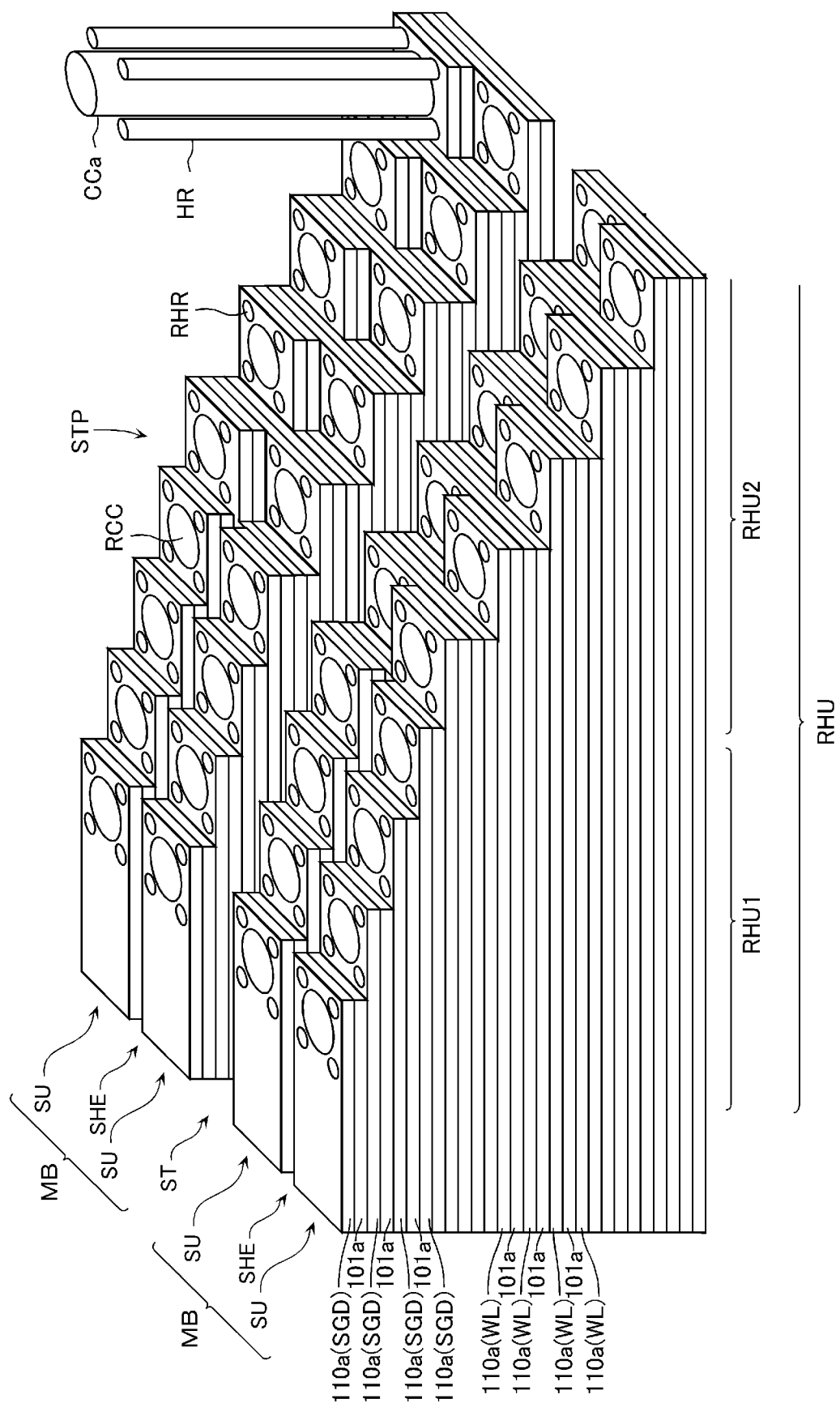
FIG. 8 is a schematic perspective view illustrating a hookup region of the semiconductor storage device.

FIG. 8 is a schematic perspective view illustrating the hookup region RHU. The hookup region RHU has a staircase portion STP in which the ends of the conductive layers 110a move away from the memory cell region RMC the closer they are to the substrate S. The staircase portion STP may be arranged differently, e.g., so that the end of the conductive layers 110a are closer to the memory cell region RMC the closer they are to the substrate S. Further, in this example, the hookup region RHU includes a first hookup region RHU1 for the upper four (4) layers close to the memory cell region RMC, and a second hookup region RHU2 for the lower ten (10) layers farther from the memory cell area RMC than the first hookup region RHU1.

The conductive layer 110a (SGD) of the first hookup region RHU1 functions as a gate electrode of the drain select gate line SGD and a plurality of drain select transistors STD (see, for example, FIG. 2) connected to the drain select gate line SGD. The conductive layer 110a (SGD) is divided into two in the memory block MB in the Y direction by the insulating layer SHE such as silicon oxide. The conductive layer 110a (SGD) is commonly connected to all the memory structures 100 in one string unit SU.

The conductive layer 110a (WL) of the second hookup region RHU2 functions as a gate electrode of the word line WL and a plurality of memory cells MC (see, for example, FIG. 2) connected to the word line WL, respectively. The conductive layer 110a (WL) is commonly connected to all the memory structures 100 in one memory block MB. An insulating layer ST, such as silicon oxide, extending to the substrate S is provided between the conductive layers 110a (WL) of the memory blocks MB adjacent to each other in the Y direction.

The contact CCa extends in the Z direction and is connected to the contact region RCC of the plurality of conductive layers 110a. The contact CCa includes, for example, a stacked film of titanium nitride (TiN) and tungsten (W). In the support structure region RHR around the contact CCa, a cylindrical support structure HR that maintains the stacked structure of the insulating layer 101a during the manufacturing process penetrates the stacked structure. The support structure HR has a structure similar to that of the memory structure 100. However, the upper end of the support structure HR is not connected to the wiring M0 and the support structure HR does not function as a memory unit MU.

Figure 9:
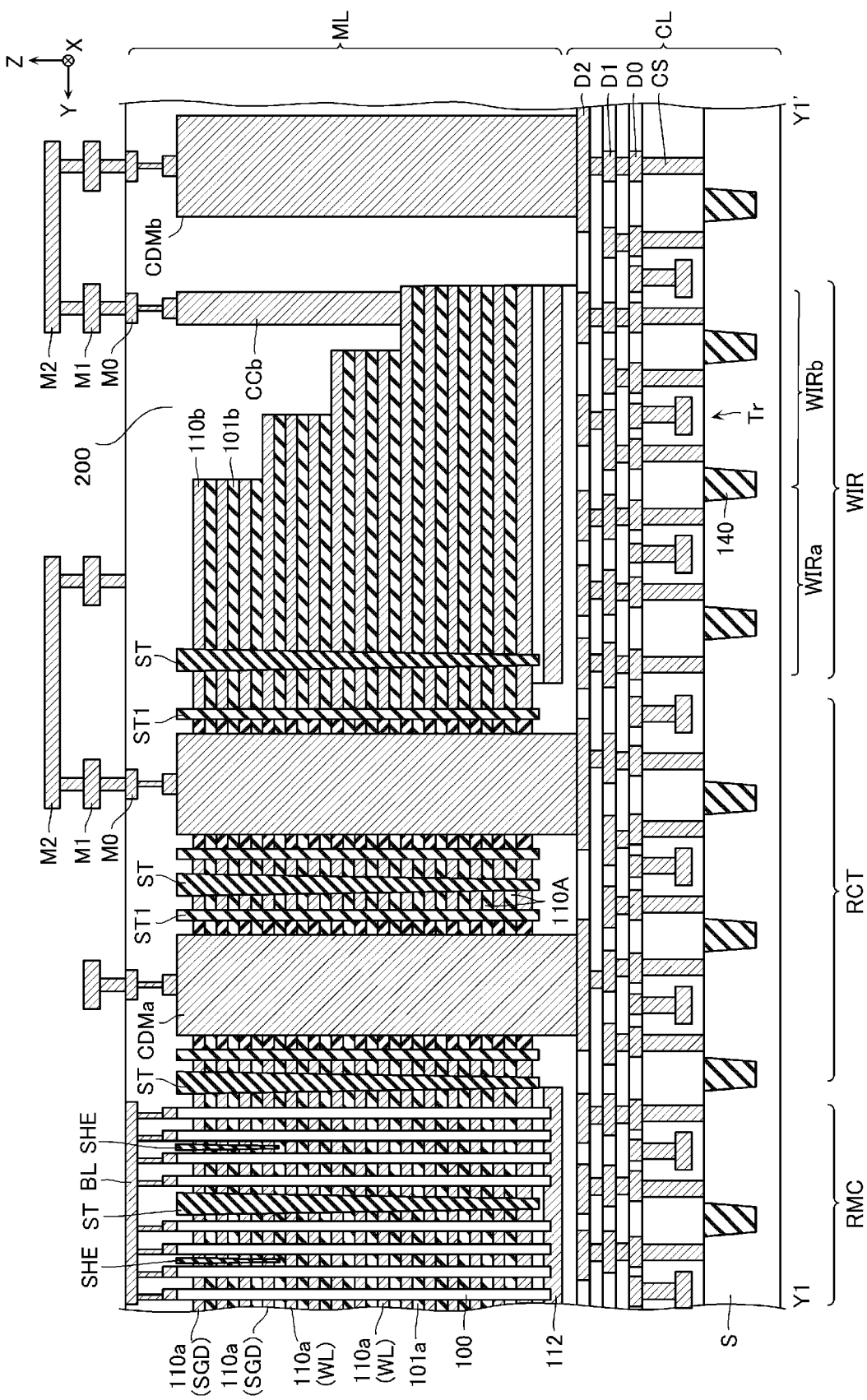
FIG. 9 is a schematic cross-sectional view of a cross-section taken along line Y1-Y1' in FIG. 5.

FIG. 9 is a schematic cross-section viewed in the X direction, of the portion cut along line Y1-Y1' in FIG. 5. As illustrated in FIG. 9, the wiring layers WIR arranged on both sides of the memory cell array MCA in the Y direction have a plurality of conductive layers 110b extending in the X and Y directions and arranged in the Z direction. The plurality of conductive layers 110b include, for example, a stacked film of titanium nitride (TiN) and tungsten (W). An insulating layer 101b such as silicon dioxide (SiO2) is provided between the plurality of conductive layers 110b. The conductive layer 110b is provided on the same layer as the conductive layer 110a of the memory cell region RMC. The insulating layer 101b is provided on the same layer as the insulating layer 101a of the memory cell region RMC. The conductive layer 110b may be formed of substantially the same material, stack, or film thickness as the conductive layer 110a of the memory cell region RMC. The insulating layer 101b may be formed of substantially the same material and film thickness as the insulating layer 101a of the memory cell region RMC.

The wiring layer WIR has a wiring region WIRa disposed on the side closer to the memory cell region RMC and a connection region WIRb disposed on the area farther from the memory cell region RMC. In the connection region WIRb, a stepped contact insertion portion 200 is appropriately provided according to the wiring pattern. The lower end of the contact CCb extending in the Z direction is connected to the conductive layer 110b of the connection region WIRb. The upper end of the contact CCb is connected to the contact CDMb in the peripheral region and/or the contact CDMa in the contact connection region RCT via the wirings M0, M1, and M2. The contacts CCb and CDMb include, for example, a stacked film of titanium nitride (TiN) and tungsten (W).

Figure 10:
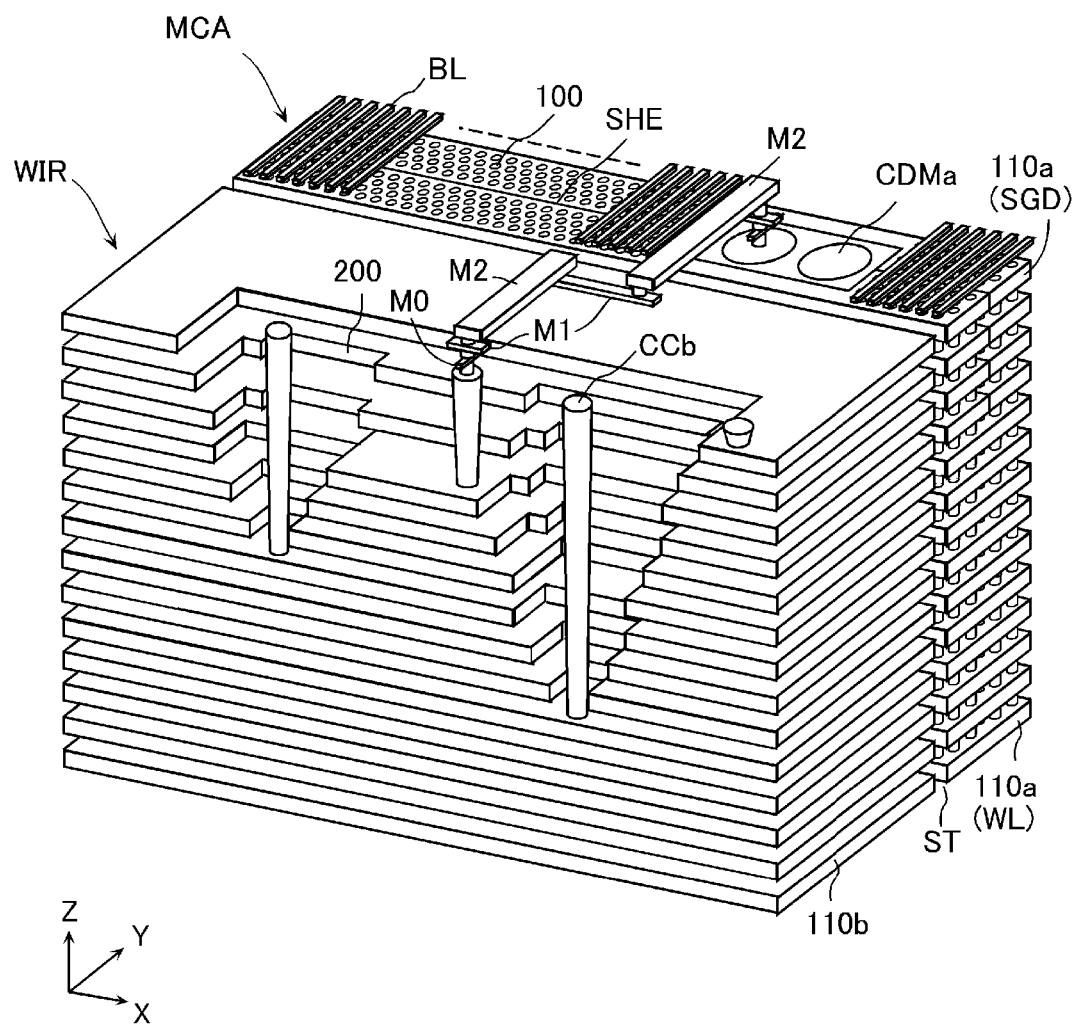
FIG. 10 is a schematic perspective view of a part of a wiring layer of the semiconductor storage device.

FIG. 10 is a schematic perspective view of a part of the wiring layer WIR. The contact CCb is disposed in a region where the bit line BL does not exist, passes through the contact insertion portion 200 formed in the wiring layer WIR, and is connected to the lower conductive layer 110b. The upper end of the contact CCb is connected to the upper end of the contact CDMa via the wirings M0, M1, and M2. In FIG. 10, the end of the bit line BL is located above the Y-direction end region of the memory cell array MCA, but may be located above the wiring region WIRa or above the insulating layer ST at a boundary between the wiring region WIRa and the memory cell array MCA.

Figure 11:
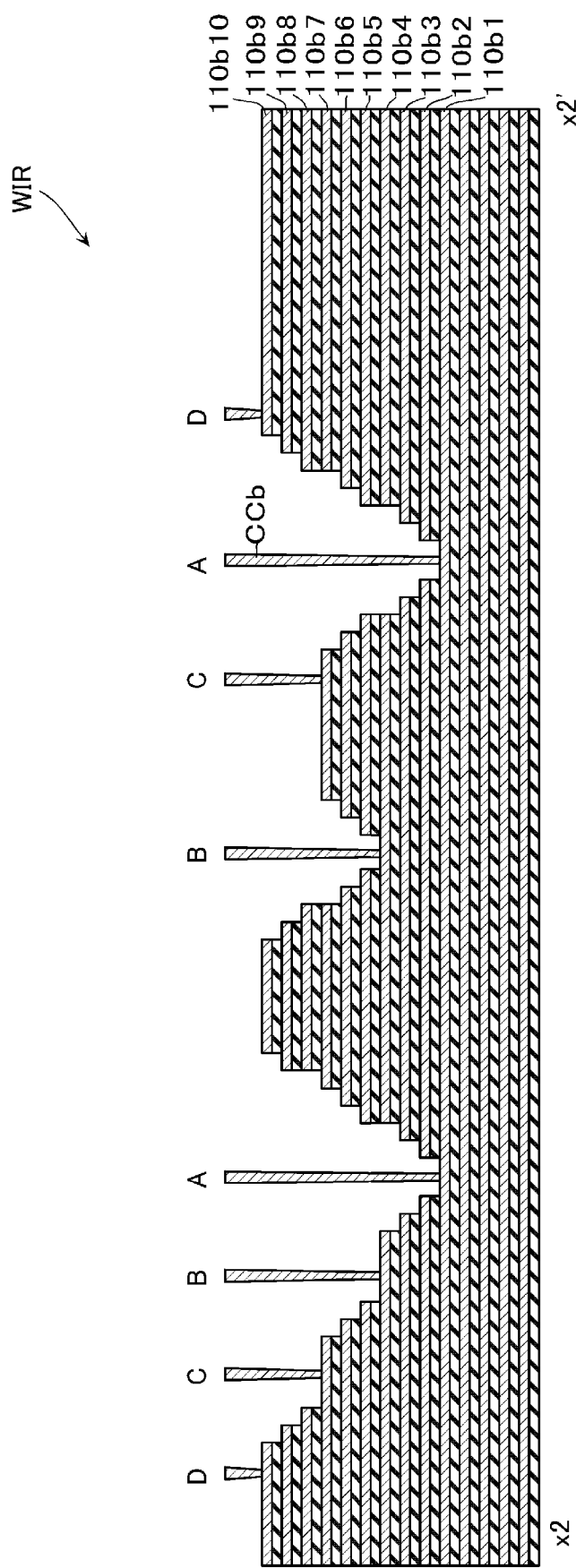
FIG. 11 is a schematic cross-sectional view of a cross-section taken along line X2-X2' in FIG. 5.

FIG. 11 is a schematic cross-section viewed in the Y direction, of the portion cut along line X2-X2' in FIG. 5. Here, among the wiring layers WIR, the conductive layers 110b of the upper ten (10) layers are indicated as the conductive layers 110b1 to 110b10 in order from the bottom. Hereinafter, the contact CCb represented by reference numeral "A" may be referred to as contact A, and the contact CCb represented by reference numeral "B" may be referred to as contact B. The contact A is connected to the conductive layer 110b1. The contact B is connected to the conductive layer 110b4. The contact C is connected to the conductive layer 110b7. The contact D is connected to the conductive layer 110b10. The other conductive layers 110b2, 110b3, 110b5, 110b6, 110b8, and 110b9 are in an electrically floating state.

Figure 12:
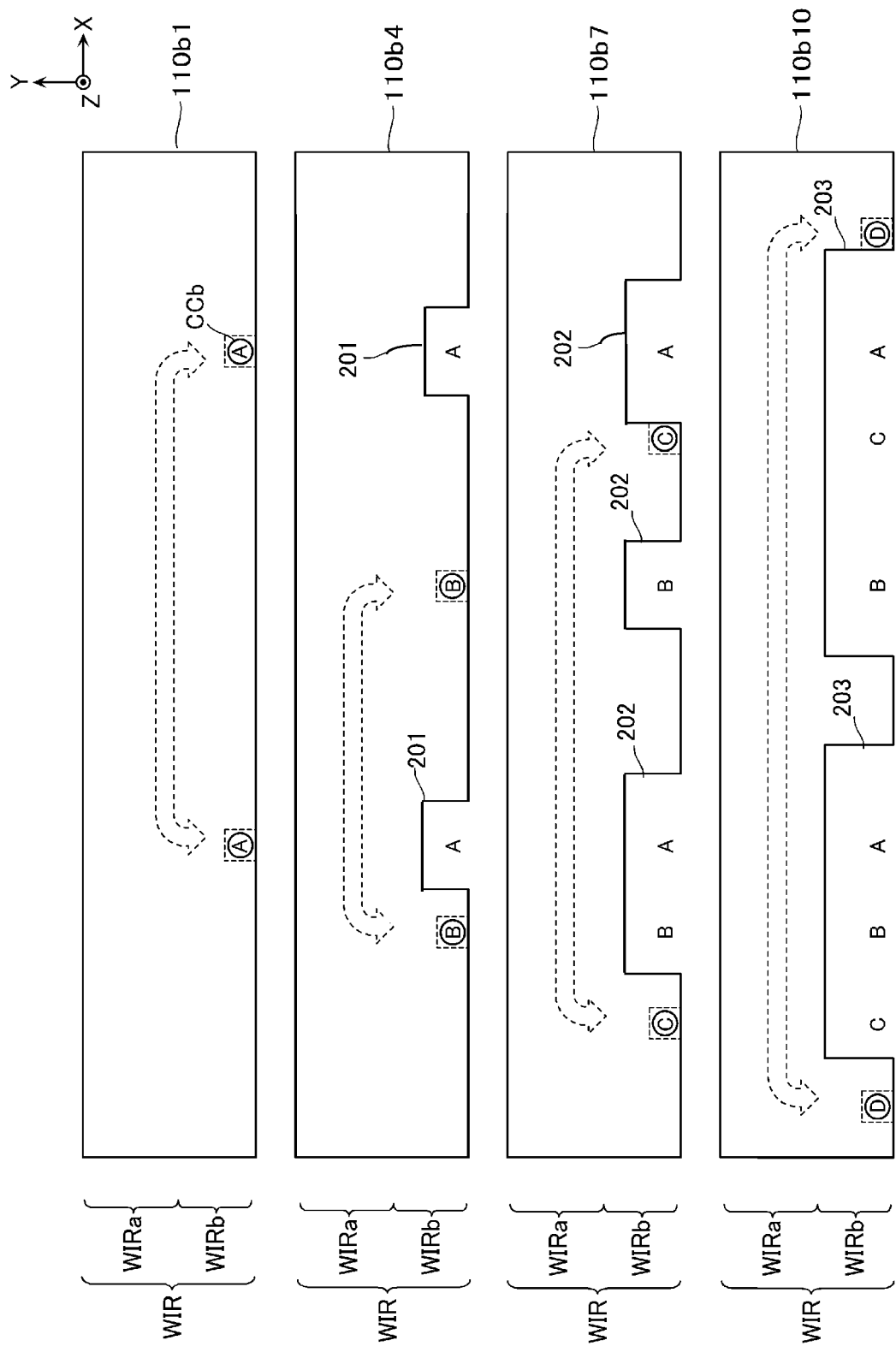
FIG. 12 is a plan view illustrating a conductive layer in the wiring layer of the semiconductor storage device.

FIG. 12 is a plan view illustrating four conductive layers 110b1, 110b4, 110b7, and 110b10. A contact insertion portion 201 is formed in the conductive layer 110b4, a contact insertion portion 202 is formed in the conductive layer 110b7, and a contact insertion portion 203 is formed in the conductive layer 110b10. The contact insertion portions of the upper layers have a larger width in the X direction and a larger width in the Y direction. The contact A passes through the contact insertion portions 201, 202, and 203 and is connected to the connection region WIRb of the conductive layer 110b1. The contact B passes through the contact insertion portions 202 and 203 and is connected to the connection region WIRb of the conductive layer 110b4. The contact C passes through the contact insertion portion 203 and is connected to the connection region WIRb of the conductive layer 110b7. The contact D is connected to the connection region WIRb of the conductive layer 110b10. A current flows between the contacts A and A via the wiring region WIRa and the connection region WIRb of the conductive layer 110b1, as indicated by the dotted arrow. A current flows between the contacts B and B, between the contacts C and C, and between the contacts D and D via the wiring regions WIRa of 110b4, 110b7, and 110b10, as indicated by the dotted arrows.

In the present embodiment, since two layers of the conductive layers 110b in an electrically floating state are interposed between the conductive layers 110b used as the wiring, the capacitance between the wirings may be reduced and the influence of the capacitive coupling may be reduced.

Figure 13:
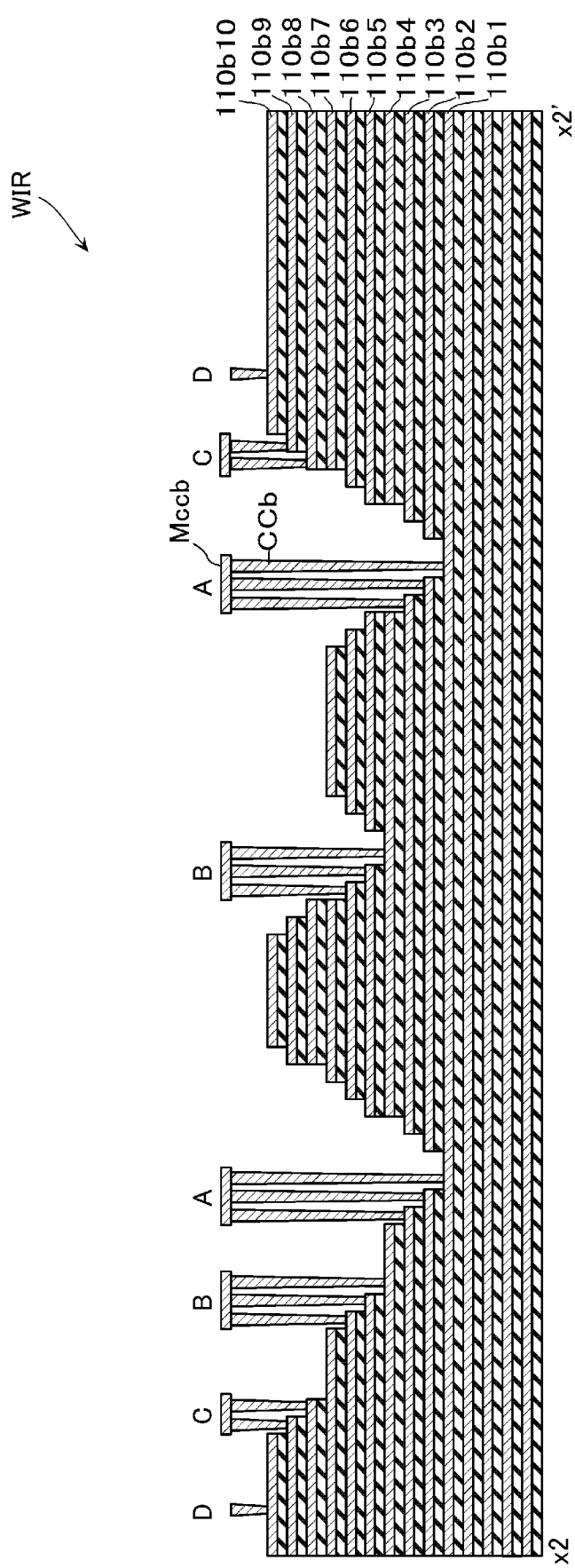
FIG. 13 is a view illustrating another wiring pattern in the wiring layer of the semiconductor storage device.

FIG. 13 is a view illustrating another form of wiring form in the wiring layer WIR. In this example, the conductive layers 110b1, 110b2, and 110b3 adjacent to each other in the Z direction are commonly connected to the contact A via a common wiring Mccb, the conductive layers 110b4, 110b5, and 110b6 adjacent to the Z direction are commonly connected to the contact B via a common wiring Mccb, and the conductive layers 110b7 and 110b8 adjacent to each other in the Z direction are commonly connected to the contact C via a common wiring Mccb.

According to this form of wiring, as the current value to be passed becomes larger, the wiring resistance may be reduced by increasing the number of the conductive layers 110b that are commonly connected.

Figure 14:
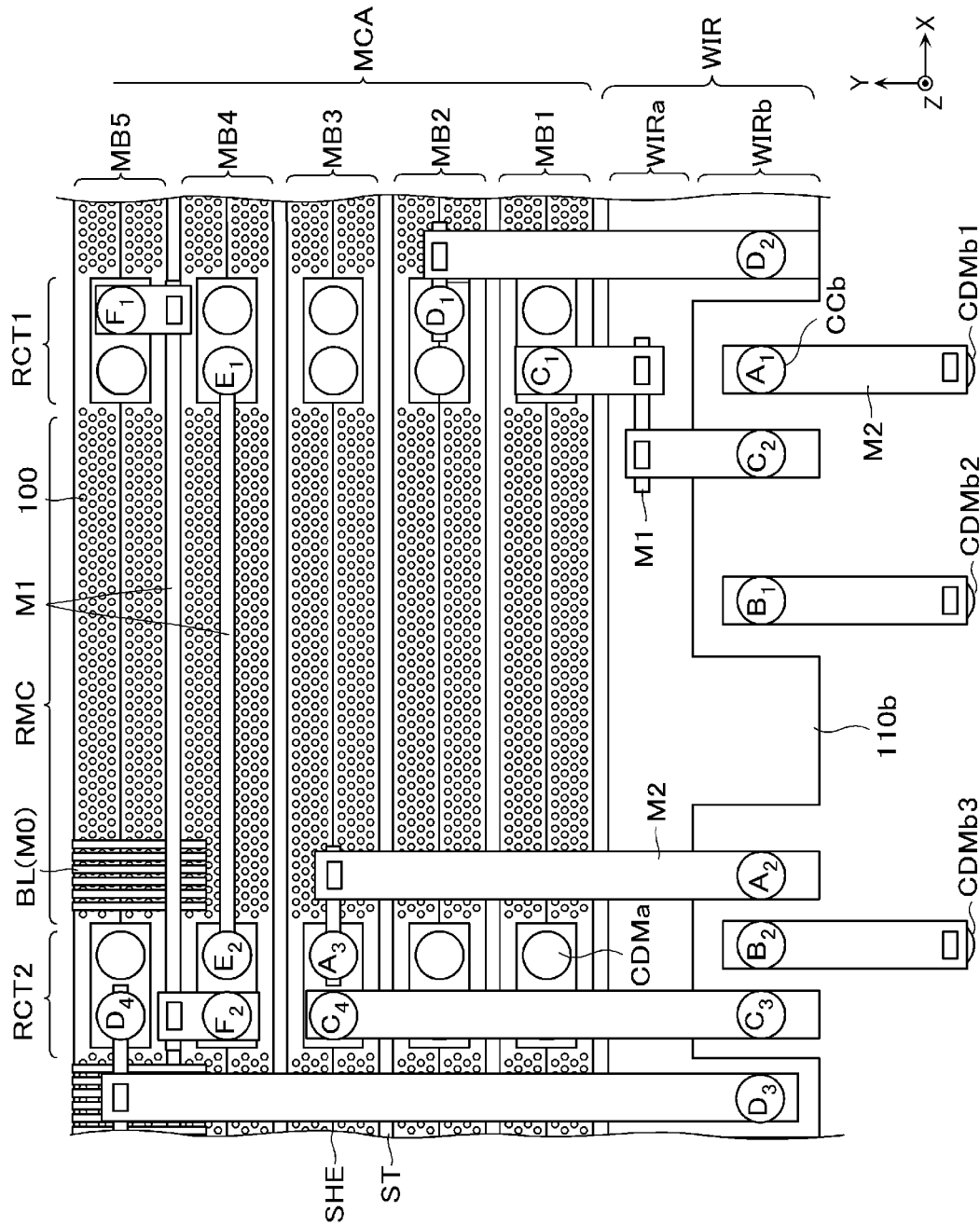
FIG. 14 is a plan view illustrating an example of a wiring pattern used in the wiring layer of the semiconductor storage device.
Figure 22A:
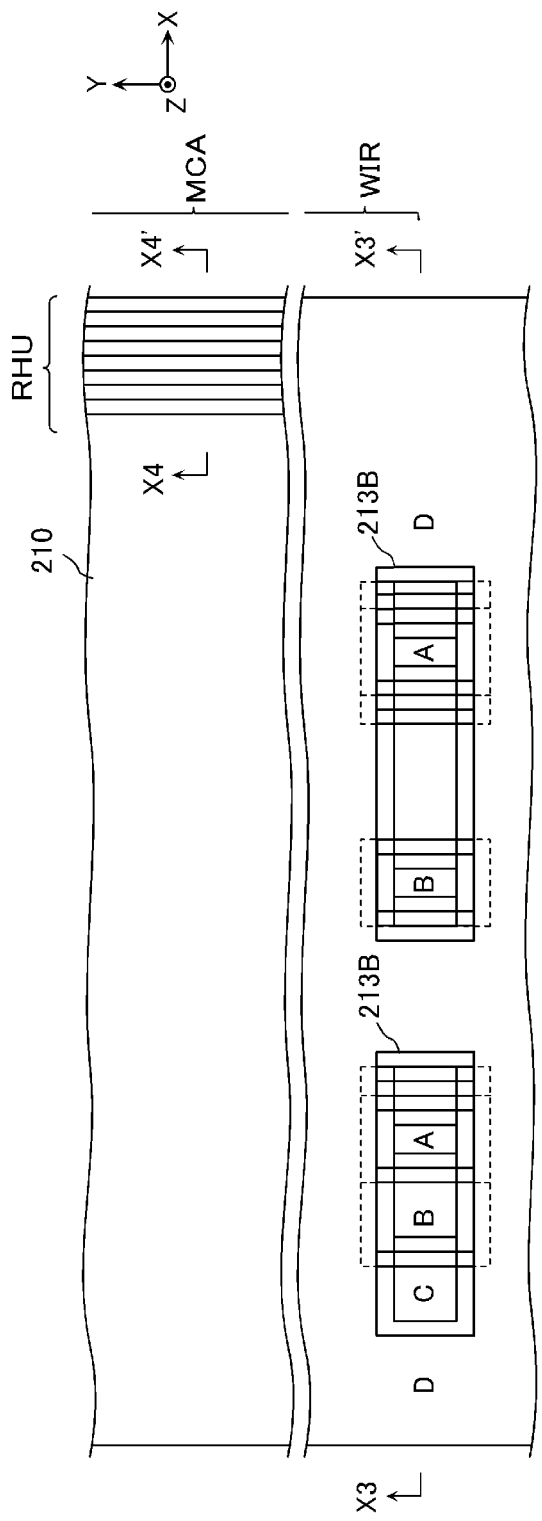
FIGS. 22A to 22C are a schematic plan view and cross-sectional views illustrating a manufacturing process of the semiconductor storage device.
Figure 22B:
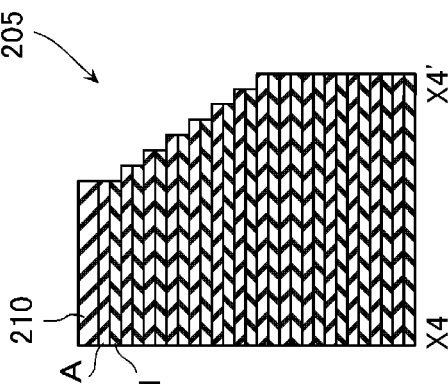
Figure 22C:
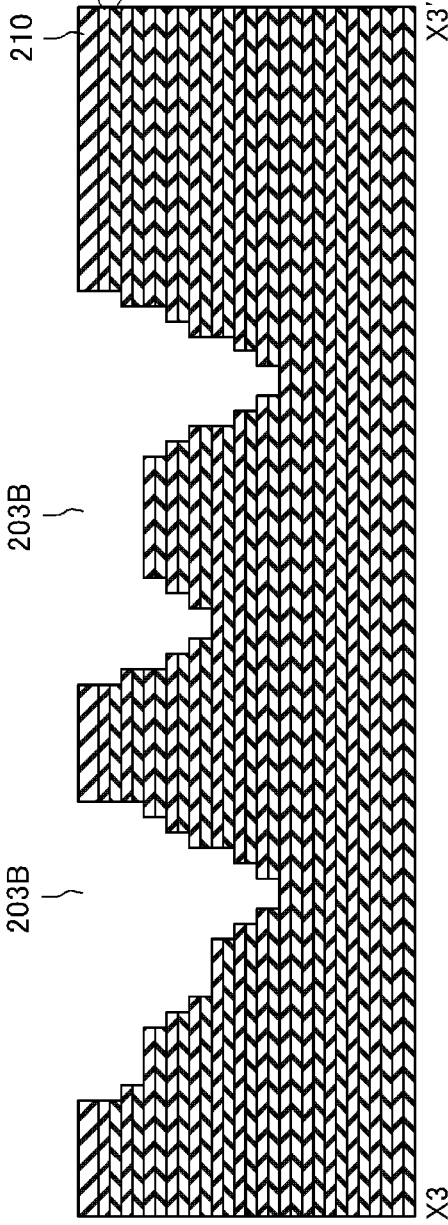

FIG. 14 illustrates an example of a wiring pattern used in the wiring layer WIR. The bit line BL is formed on the memory cell region RMC, and is not formed on the contact connection regions RCT1 and RCT2 and the wiring layer WIR. The wiring M0 and the bit line BL are formed in the same layer and extend in the Y direction. The wiring M1 is formed in a layer above the wiring M0 and extends in the X direction. The wiring M2 is formed in a layer above the wiring M1 and extends in the Y direction. The wiring layer WIR may also be used as wiring for connecting the circuit blocks of the circuit layer CL illustrated in FIG. 4.

Wiring Example 1

Peripheral circuit blocks, for example, the input/output I/O buffer I/OB is connected to a circuit block below the contact $A_3$, for example, the address register AR, via the contact CDMb1, wiring M2, contact $A_1$, conductive layer 110b1, contact $A_2$, wiring M2, wiring M1, and contact $A_3$ of connection region RCT2 of the memory block MB3.

Wiring Example 2

Peripheral circuit blocks, for example, the input/output I/O buffer I/OB is connected to a peripheral circuit block below the contact CDMb3, for example, the input/output I/O buffer I/OB, via the contact CDMb2, wiring M2, contact $B_1$, conductive layer 110b4, contact $B_2$, wiring M2, and contact CDMb3.

Wiring Example 3

The circuit block below the memory cell array MCA, for example, the voltage generation circuit VG is connected to a circuit block below the contact $C_4$, for example, the row decoder RD, via the contact $C_1$ of the contact connection region RCT1 of the memory block MB1, wiring M2, wiring M1, wiring M2, contact $C_2$, conductive layer 110b7, contact $C_3$, wiring M2, and contact $C_4$ of the contact connection region RCT2 of the memory block MB3.

Wiring Example 4

The circuit block below the memory cell array MCA, for example, the voltage generation circuit VG is connected to a circuit block below the contact $D_4$, for example, the sense amplifier SA, via the contact $D_1$ of the contact connection region RCT1 of the memory block MB2, wiring M1, wiring M2, contact $D_2$, conductive layer 110b10, contact $D_3$, wiring M2, wiring M1, and contact $D_4$ of the contact connection region RCT2 of the memory block MB5.

Wiring Example 5

The circuit block below the memory cell array MCA, for example, the column decoder CD is connected to a circuit block below the contact $E_2$, for example, the column decoder CD, via the contact $E_1$ of the contact connection region RCT1 of the memory block MB4, wiring M1, and contact $E_2$.

Wiring Example 6

The circuit block below the memory cell array MCA, for example, the data cache DC is connected to a circuit block below the contact $F_2$, for example, the column decoder CD, via the contact $F_1$ of the contact connection region RCT1 of the memory block MB5, wiring M2, wiring M1, wiring M2, and contact $F_2$.

Effect of First Embodiment

In the present embodiment, for the wirings D0, D1, and D2 formed on the circuit layer CL, a heat-resistant metal such as tungsten (W) is used in consideration of the influence of heat during the manufacturing process of the memory layer ML formed thereafter. The heat-resistant metal has a higher resistance value than copper (Cu) and aluminum (Al). Meanwhile, the wirings M0, M1, and M2 of metals such as copper and aluminum having low resistance have low heat resistance, and are therefore arranged on the upper layer of the memory layer ML manufactured last in the manufacturing process. Therefore, there is a problem that the wiring in the upper layer of the memory layer ML is too close together.

According to the present embodiment, since the wiring layer WIR having the same number of conductive layers 110b as the conductive layers 110a in the memory cell array MCA may be used as wiring, the wiring path may be greatly increased, and the wiring space in the memory layer ML may be significantly expanded.

According to the wiring examples 1 and 2, when the connection points of the circuit blocks of the circuit layer CL are displaced in the X direction, since the wiring resistance is smaller when passing through the conductive layer 110b than when passing through the wirings D0, D1, and D2 in the circuit layer CL, a beneficial effect of causing a large current to flow can be achieved.

According to the wiring example 3, since the wiring does not pass over the bit line BL, there is an effect that even when a high voltage is applied to the wiring, the influence on the bit line BL is small.

According to the wiring example 4, even when the wiring M1 on the memory cell array MCA is congested by the wiring of the wiring examples 5 and 6, the wiring space may be provided by passing through the conductive layer 110b of the wiring layer WIR.

Manufacturing Method

Next, a method of manufacturing the semiconductor storage device according to the present embodiment will be described. FIGS. 15A to 23C are views illustrating a method of manufacturing the wiring layer WIR. FIGS. 15A, 16A, 17A, 18A, 19A, 20A, 21A, 22A, and 23A are plan views. FIGS. 15B, 16B, 17B, 18B, 19B, 20B, 21B, 22B, and 23B are schematic cross-sections viewed in the Y direction, of the portion cut along line X3-X3' in FIGS. 15A, 16A, 17A, 18A, 19A, 20A, 21A, 22A, and 23A, respectively. FIGS. 15C, 16C, 17C, 18C, 19C, 20C, 21C, 22C, and 23C are schematic cross-sections viewed in the Y direction, of the portion cut along line X4-X4' in FIGS. 15A, 16A, 17A, 18A, 19A, 20A, 21A, 22A, and 23A, respectively.

As illustrated in FIGS. 15A to 15C, a plurality of insulating layers 101 and a plurality of insulating layers 110A are alternately stacked in the Z direction on the circuit layer CL. The insulating layer 101 contains, for example, silicon oxide ($SiO_2$). The insulating layer 110A functions as a sacrificial layer and contains, for example, silicon nitride (SiN). This step is performed by, for example, a method such as a chemical vapor deposition (CVD).

Next, a resist 210 is formed on the stack including the insulating layers 101 and 110A. The resist 210 has a pattern in which the insulating layer 110A of the portion forming the staircase portion STP (see, for example, FIG. 6) of the hookup region RHU is exposed. Further, the resist has an opening 211A that exposes the insulating layer 110A of the portion forming the contact insertion portion 200 (see, for example, FIG. 5) of the wiring layer WIR. Each portion of the insulating layers 110A and 101 not covered by the resist 210 has only one layer removed by anisotropic etching. Anisotropic etching is performed by, for example, a method such as reactive ion etching (RIE). As a result, a step 205 is formed in the hookup region RHU, and a hole 201A is formed in the portion of the wiring layer WIR corresponding to the opening 211A.

Subsequently, as illustrated in FIGS. 16A to 16C, the resist 210 is partially removed by a method such as wet etching. Thus, the portion of the resist 210 that forms the step 205 of the hookup region RHU is retracted by one stage in the X direction, and the opening 211B that is larger than that of the previous step is formed. Then, each portion of the insulating layers 110A and 101 not covered by the resist 210 has one additional layer removed by anisotropic etching. As a result, a two-stage step 205 and a hole 201B with an increased depth and width are formed.

Subsequently, as illustrated in FIGS. 17A to 17C, the resist 210 is partially removed again. Thus, the portion of the resist 210 that forms the step 205 of the hookup region RHU is further retracted by one stage in the X direction, and the opening 211C that is further enlarged as compared with the previous step is formed. Then, each portion of the insulating layers 110A and 101 not covered by the resist 210 has one additional layer removed by anisotropic etching. As a result, a three-stage step 205 and a hole 201C having an increased depth and width are formed.

Subsequently, the resist 210 is first removed, and as illustrated in FIGS. 18A to 18C, a new resist 210 having a different pattern is formed on the stack of the insulating layers 110A and 101. The portion of the resist 210 that forms the step 205 of the hookup region RHU is further retracted by one stage in the X direction. Three new openings 212A are formed in the resist 210. The width of the openings 212A in the Y direction is set to be substantially the same as the width of the first opening 211A. Then, each portion of the insulating layers 110A and 101 not covered by the resist 210 has one layer removed by anisotropic etching. As a result, a four-stage step 205 having an increased depth and width and a hole 202A are formed.

Subsequently, as illustrated in FIGS. 19A to 20C, similar to the previous step, the partial removal of the resist 210 and the anisotropic etching of the insulating layers 110A and 101 are repeated to form the step 205, and portions of the insulating layers 110A and 101 exposed by the openings 212B and 212C are sequentially removed. As a result, steps 205 of 5 steps and 6 steps, and holes 202B and 202C having increased depth and width are sequentially formed.

In the same manner as in the above step, the resist 210 is first removed, and as illustrated in FIGS. 21A to 21C, a resist 210 having a different pattern is formed on the stack of the insulating layers 110A and 101. The portion of the resist 210 that forms the step 205 of the hookup region RHU is further retracted by one stage in the X direction. Two new openings 213A are formed in the resist 210. The width of the opening 213A in the Y direction is set to be substantially the same as the width of the first opening 211A. Then, each portion of the insulating layers 110A and 101 not covered by the resist 210 has one layer removed by anisotropic etching. As a result, a seven-stage step 205 having an increased depth and width and a hole 203A are formed.

Subsequently, as illustrated in FIGS. 22A to 23C, similar to the previous step, the partial removal of the resist 210 and the anisotropic etching of the insulating layers 110A and 101 are repeated to form the step 205, and portions of the insulating layers 110A and 101 exposed by the openings 213B and 213C are sequentially removed. As a result, steps 205 of 8 stages and 9 stages, and holes 203B and 203C having increased depth and width are sequentially formed.

Through the above steps, the step 205 forming the staircase portion STP (see, for example, FIG. 6) of the hookup region RHU and the contact insertion portion 200 (see, for example, FIG. 5) of the wiring layer WIR may be formed. According to this method, when partial removal of the resist 210 is performed m times with n types of resist 210 patterns, a step of n×(m+1)+1 layers may be formed. In the present embodiment, the widths of the openings 211A, 212A, and 213A formed in each pattern of the resist 210 before the partial removal of the resist 210, are substantially the same in the Y direction. Therefore, the step formation in the Y direction at the contact insertion portion 200 accompanying the step forming process may be reduced to m+1 steps. As a result, the wiring region WIRa having a sufficient width can be provided in the wiring layer WIR.

FIGS. 24 to 32 are cross-sectional views illustrating a method of manufacturing the semiconductor storage device according to the present embodiment, and are schematic cross-sections viewed in the X direction, of the portion cut along line Y1-Y1' in FIG. 5.

Figure 24:
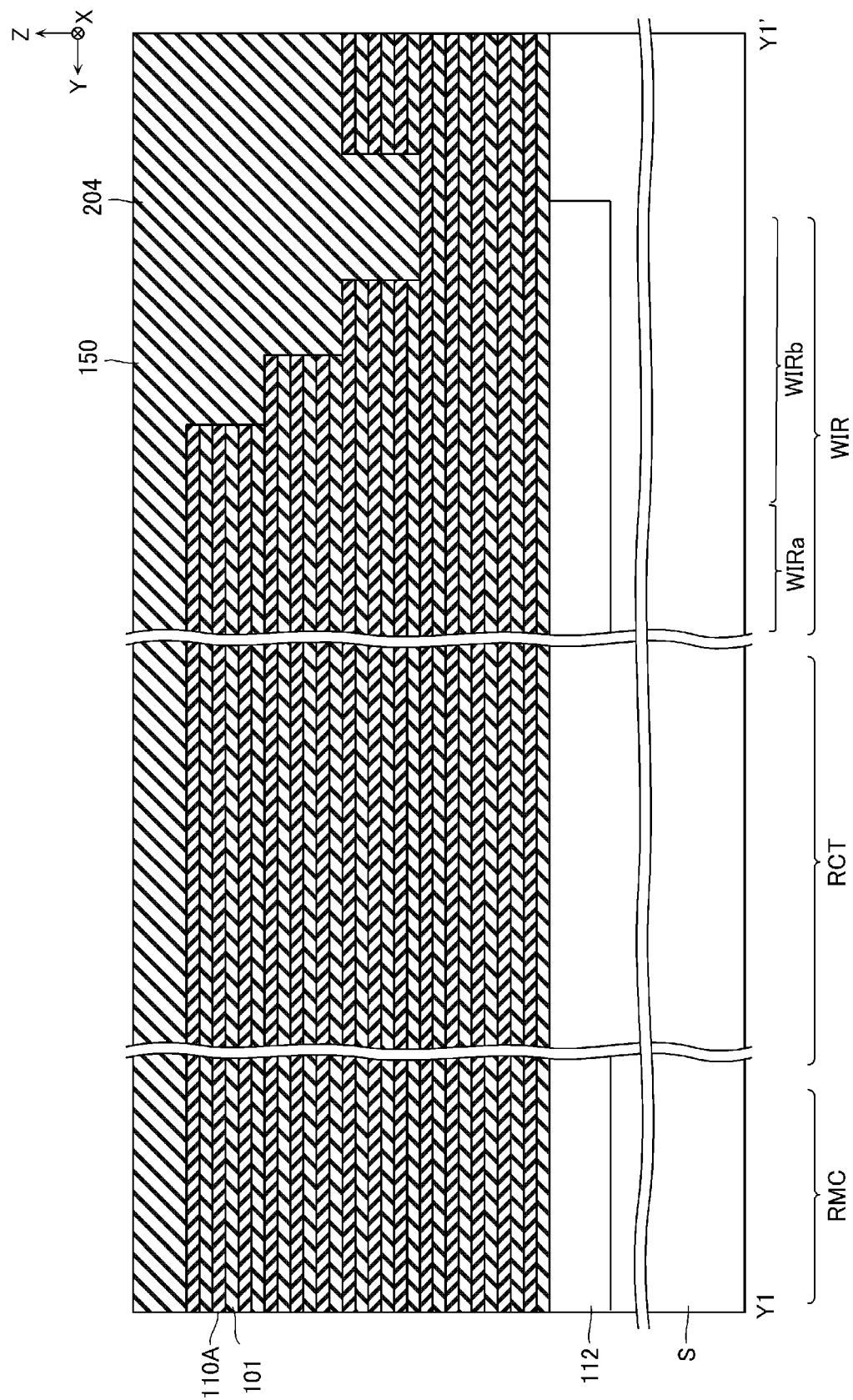
FIG. 24 is a schematic cross-sectional view illustrating a manufacturing process of the semiconductor storage device.

First, as illustrated in FIG. 24, the insulating layer 150 is formed on the stack of the insulating layers 110A and 101 so as to fill the insides of the holes 204 manufactured in the above-described steps. The insulating layer 150 includes, for example, tetraethyl orthosilicate (TEOS). This step is performed by, for example, a method such as CVD.

Figure 25:
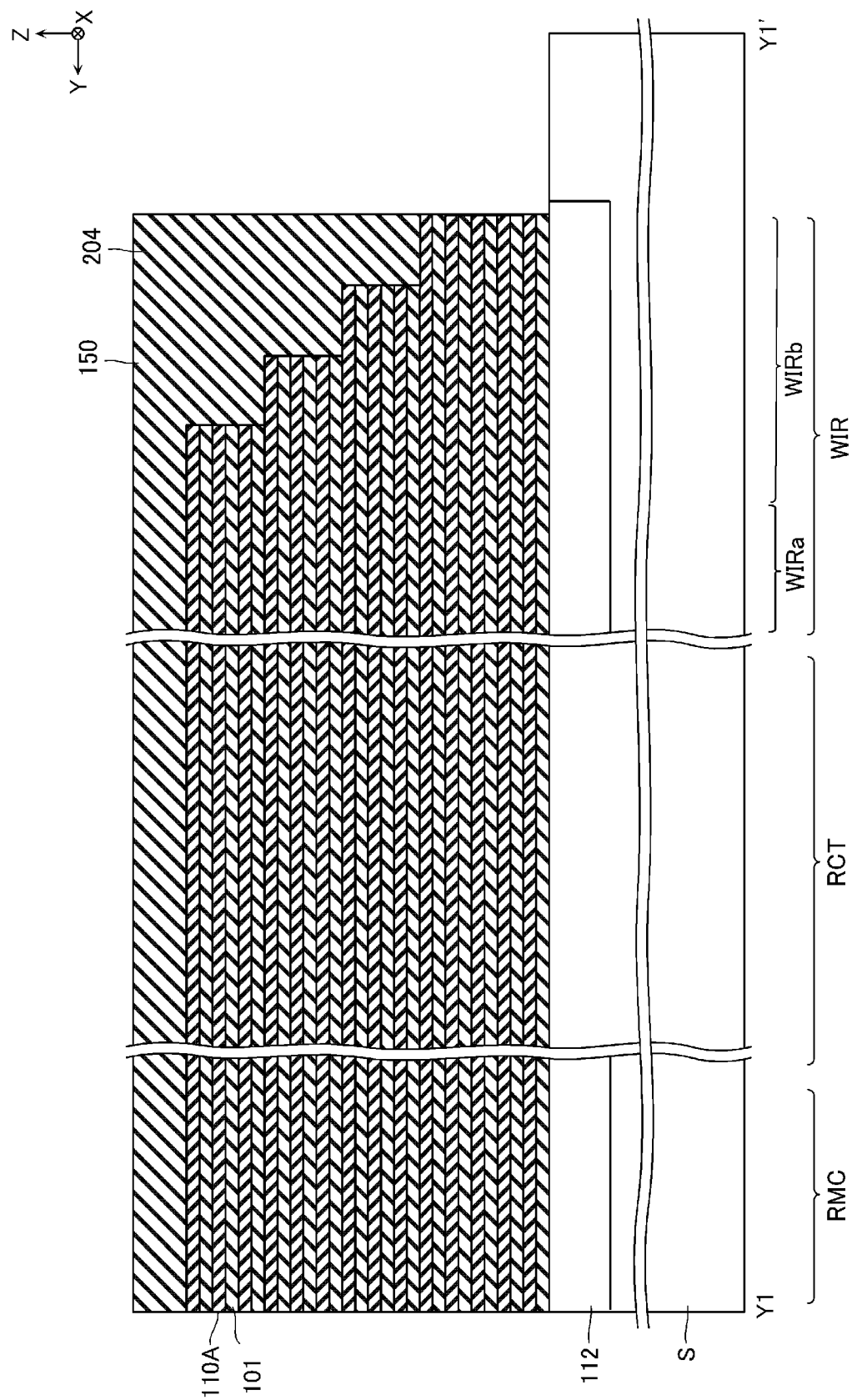
FIG. 25 is a schematic cross-sectional view illustrating a manufacturing process of the semiconductor storage device.

Next, as illustrated in FIG. 25, the insulating layers 110A and 101 on the end are removed from the central portion of the hole 204 in the Y direction. This step is performed by a method such as RIE.

Figure 26:
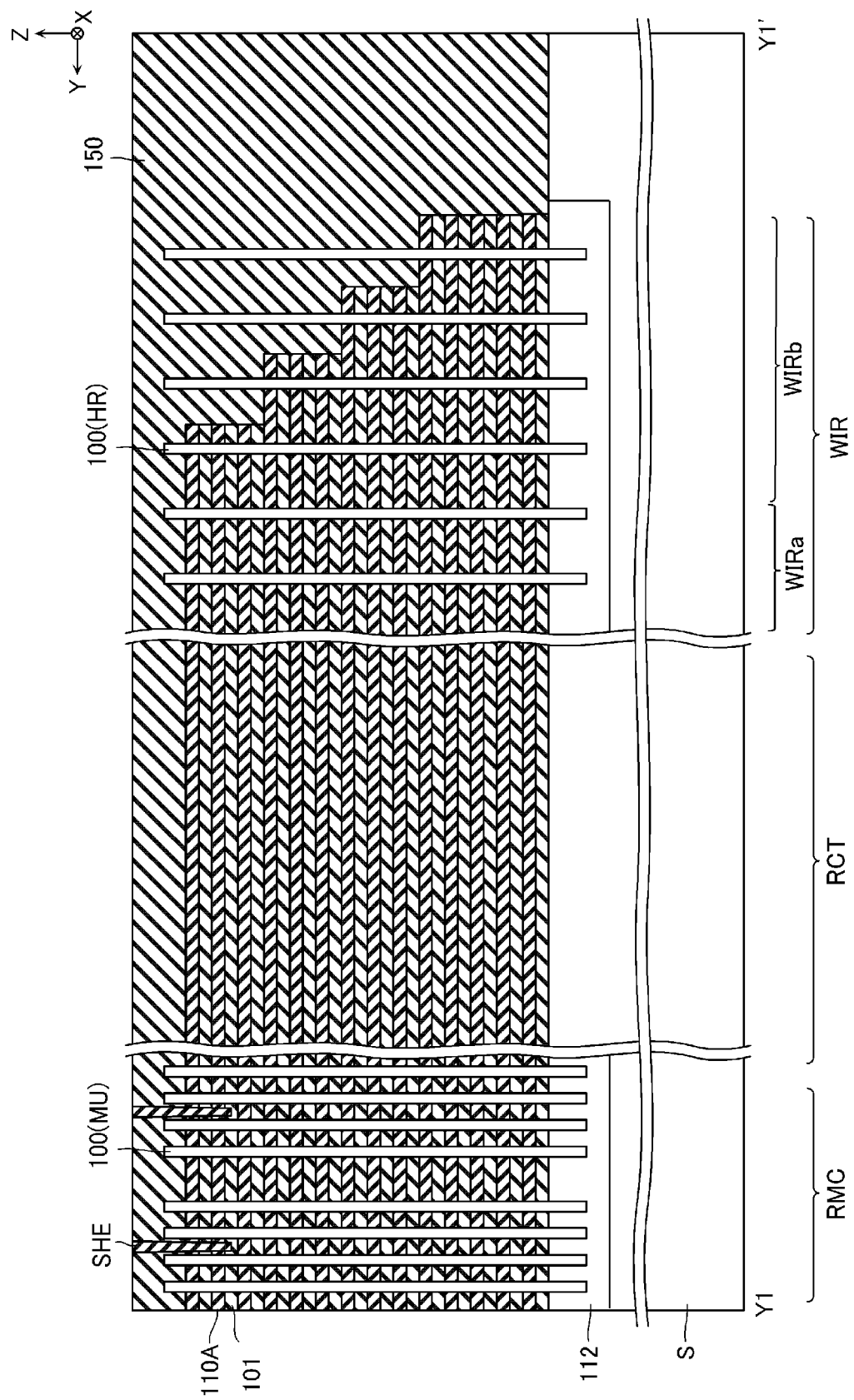
FIG. 26 is a schematic cross-sectional view illustrating a manufacturing process of the semiconductor storage device.

Next, as illustrated in FIG. 26, a plurality of memory structures 100 is formed in the X and Y directions so as to penetrate the stack of the insulating layers 110A and 101 in the Z direction. In the figure, the memory structure 100 is not formed (or may be partially formed) in the contact connection region RCT. Further, the spacing in the X and Y directions of the memory structure 100 may be uniform as a whole, or may be arranged so that the spacing in the wiring layer WIR is coarser than the spacing in the memory cell region RMC. The memory structure 100 functions as a memory unit MU in the memory cell region RMC, and functions as a support structure HR in the wiring layer WIR. Hereinafter, the memory structure 100 that functions as the memory unit MU may be referred to as the memory structure 100 (MU), and the memory structure 100 that functions as the support structure HR may be referred to as the support structure 100 (HR).

Next, the insulating layer SHE extending in the X direction and the Z direction is formed. The insulating layer SHE divides only the upper layer of the stack of the insulating layers 110A and 101 in the Y direction between the portions in the memory block MB of the memory cell region RMC where the two memory strings MSs are formed.

Figure 27:
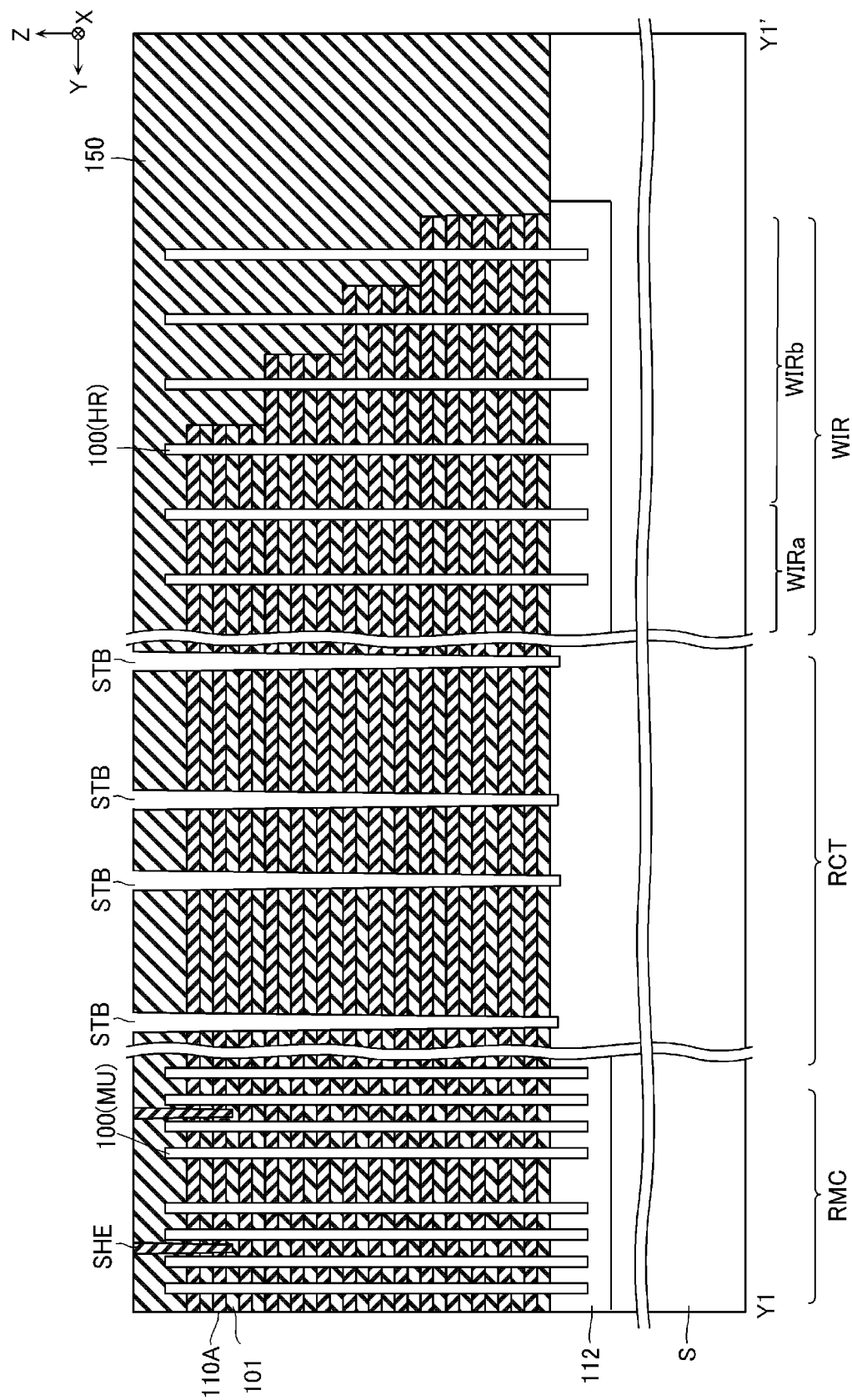
FIG. 27 is a schematic cross-sectional view illustrating a manufacturing process of the semiconductor storage device.
Figure 28:
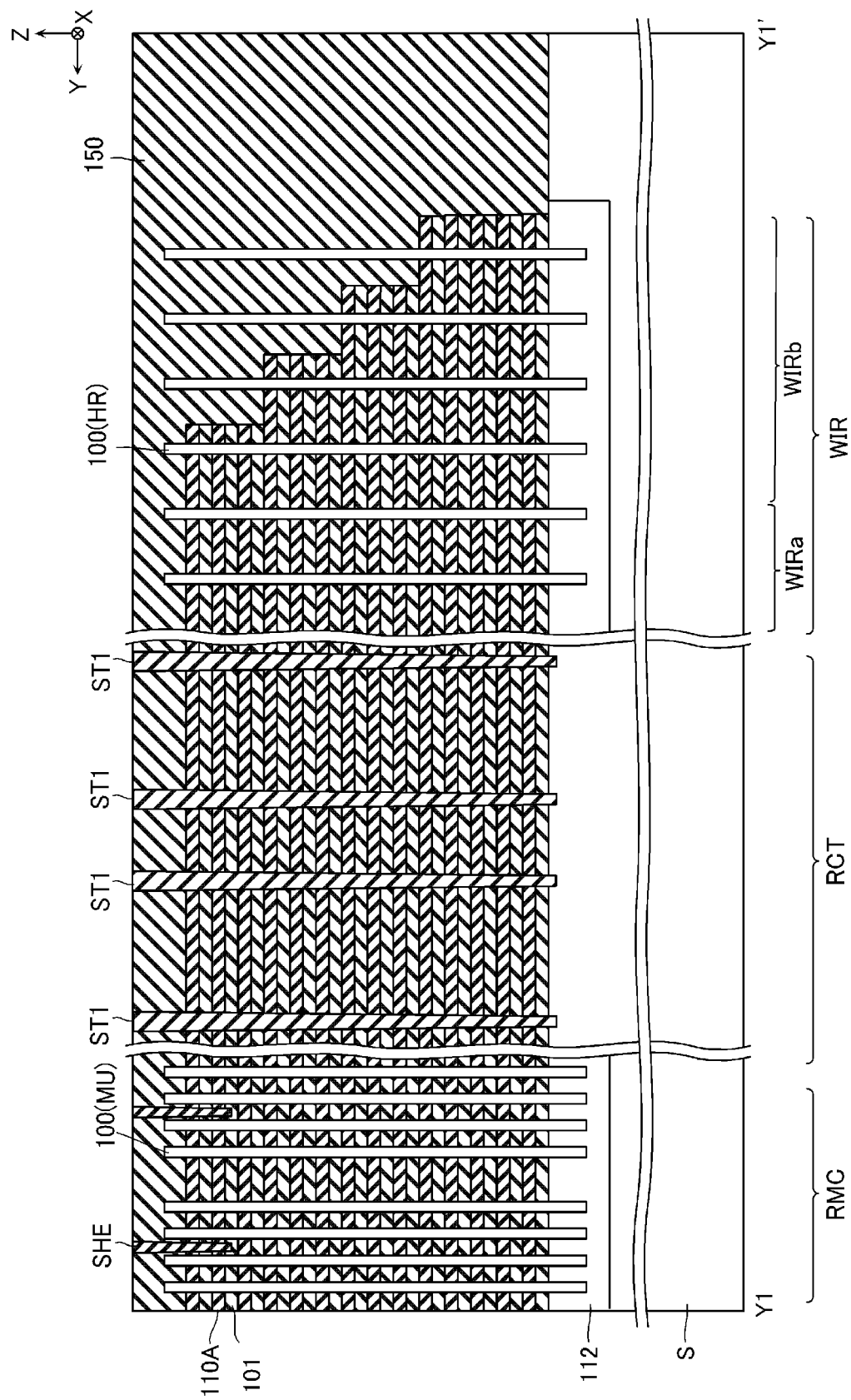
FIG. 28 is a schematic cross-sectional view illustrating a manufacturing process of the semiconductor storage device.

Next, as illustrated in FIG. 27, grooves STBs extending in the X and Z directions and in the Y and Z directions are formed so as to divide the entire plurality of insulating layers 110A and 101 in the Y and X directions on both sides of the Y direction and both sides of the X direction of the region where the contact CDMa of the contact connection region RCT is formed. Subsequently, as illustrated in FIG. 28, the insulating layer ST1 is formed inside the groove STB. The insulating layers ST1 on both sides in the Y direction and the insulating layers ST1 on both sides in the X direction of the region where the contact CDMa is formed may be formed by separate manufacturing processes.

Figure 29:
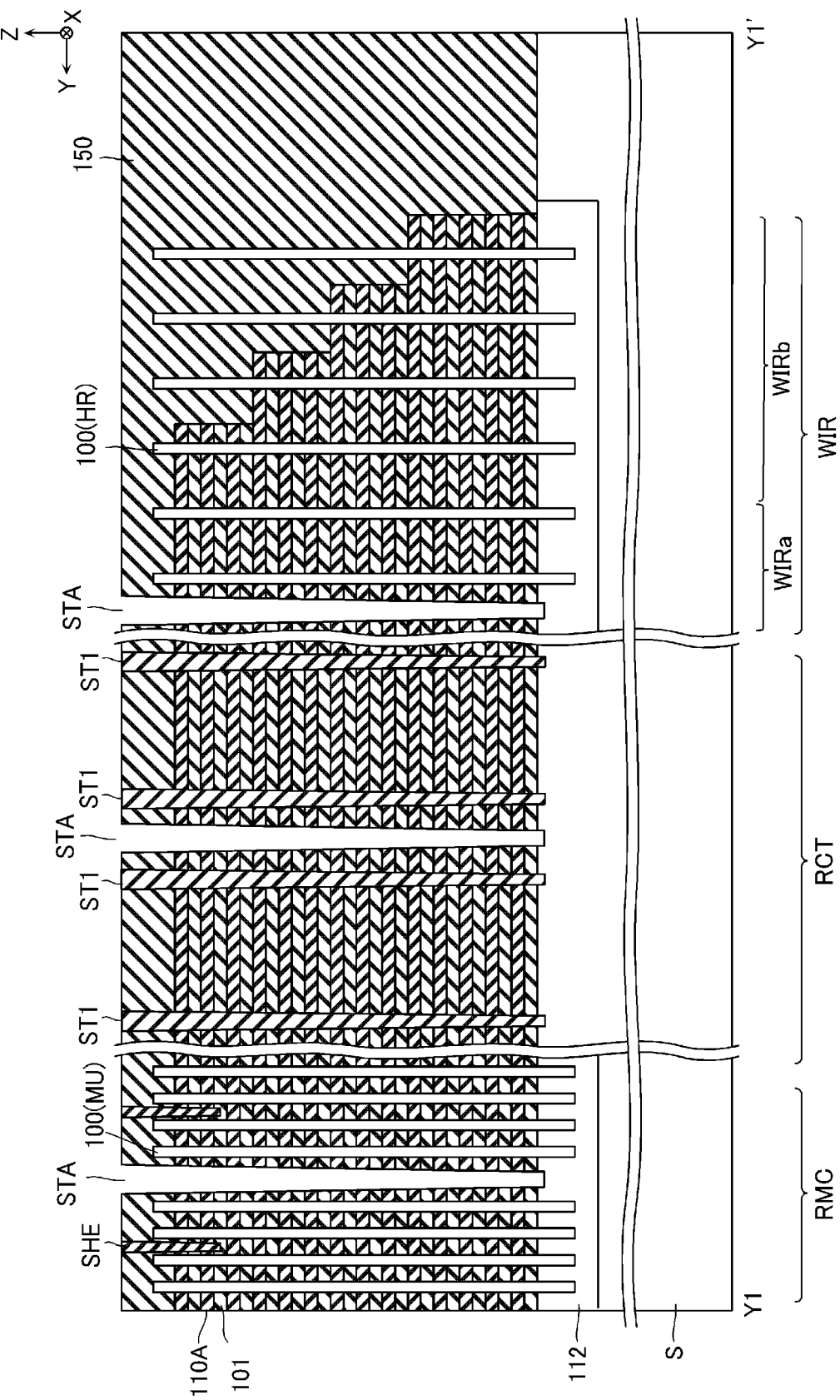
FIG. 29 is a schematic cross-sectional view illustrating a manufacturing process of the semiconductor storage device.

Next, as illustrated in FIG. 29, the entire plurality of insulating layers 110A and 101 of the memory cell region RMC are divided in the Y direction to form grooves STAs extending in the X and Z directions for forming each memory block MB. Further, on both sides of the region between the insulating layers ST1 of the contact connection region RCT in the Y direction, the entire plurality of insulating layers 110A and 101 are divided in the Y direction to form grooves STAs extending in the X and Z directions. Also, between the memory cell array MCA and the wiring layer WIR, the entire plurality of insulating layers 110A and 101 are divided in the Y direction to form grooves STAs extending in the X and Z directions.

Figure 30:
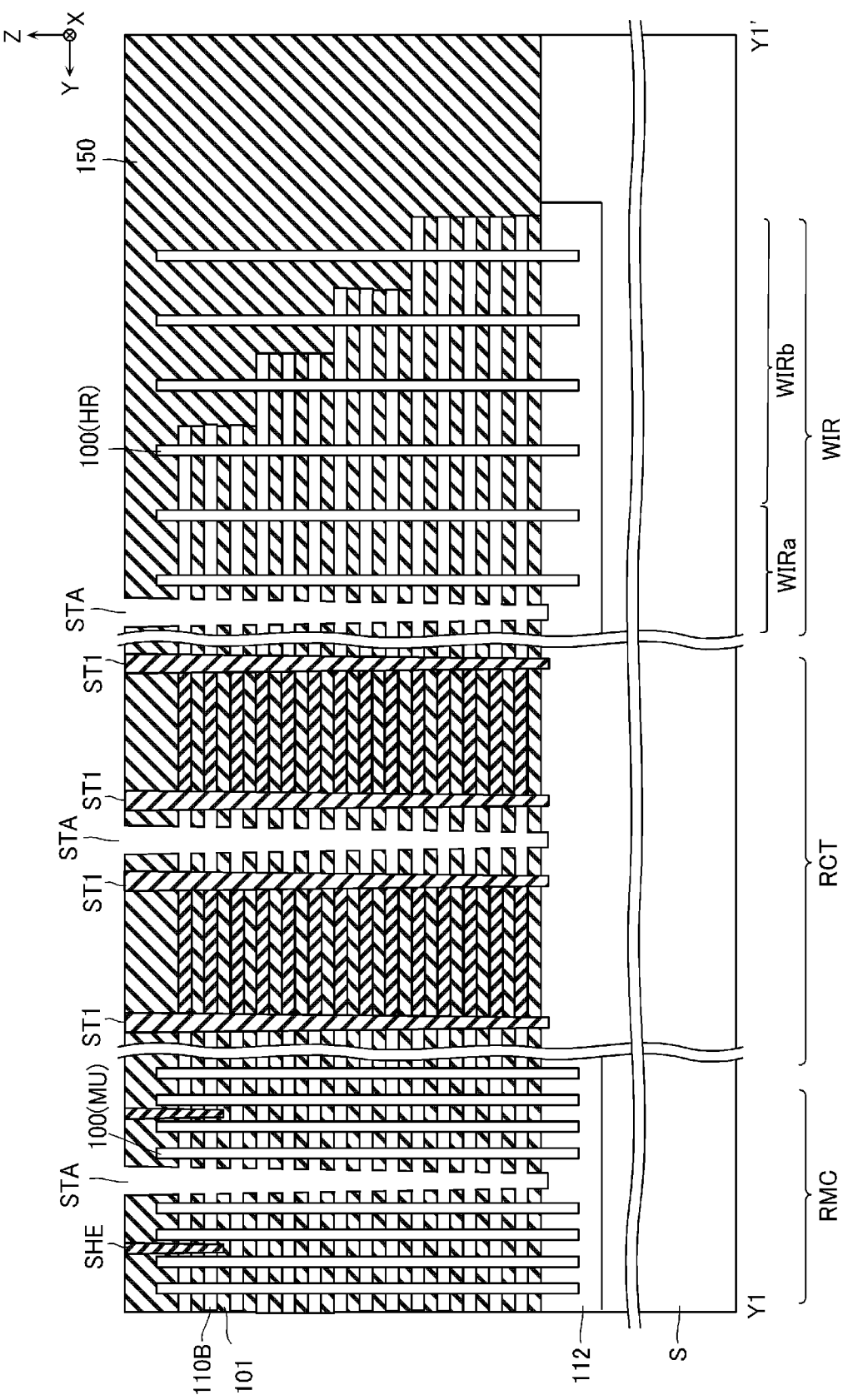
FIG. 30 is a schematic cross-sectional view illustrating a manufacturing process of the semiconductor storage device.

Next, as illustrated in FIG. 30, the plurality of insulating layers 110A are removed through the groove STA to form a cavity 110B. This step is performed, for example, by wet etching. At this time, the memory structure 100 (MU) and the support structure 100 (HR) support a plurality of insulating layers 101 arranged in the Z direction.

Figure 31:
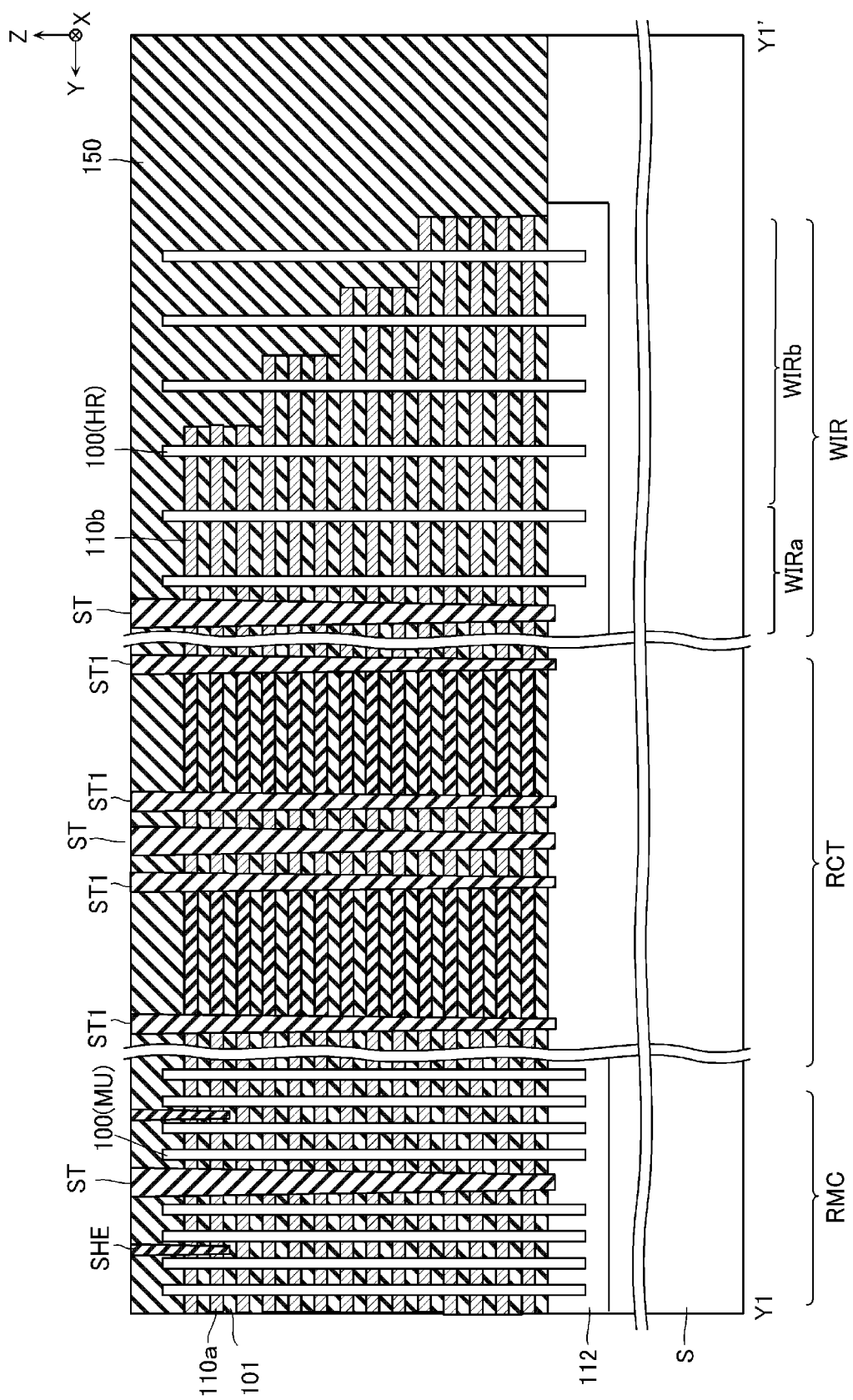
FIG. 31 is a schematic cross-sectional view illustrating a manufacturing process of the semiconductor storage device.

Next, as illustrated in FIG. 31, the conductive layers 110a and 110b are embedded in the cavity 110B via the groove STA. The conductive layers 110a and 110b are formed by, for example, a method such as CVD. At this time, the insulating layer ST1 functions as a wall that prevents the conductive layer 110a from entering the region where the contact CDMa is formed.

Figure 32:
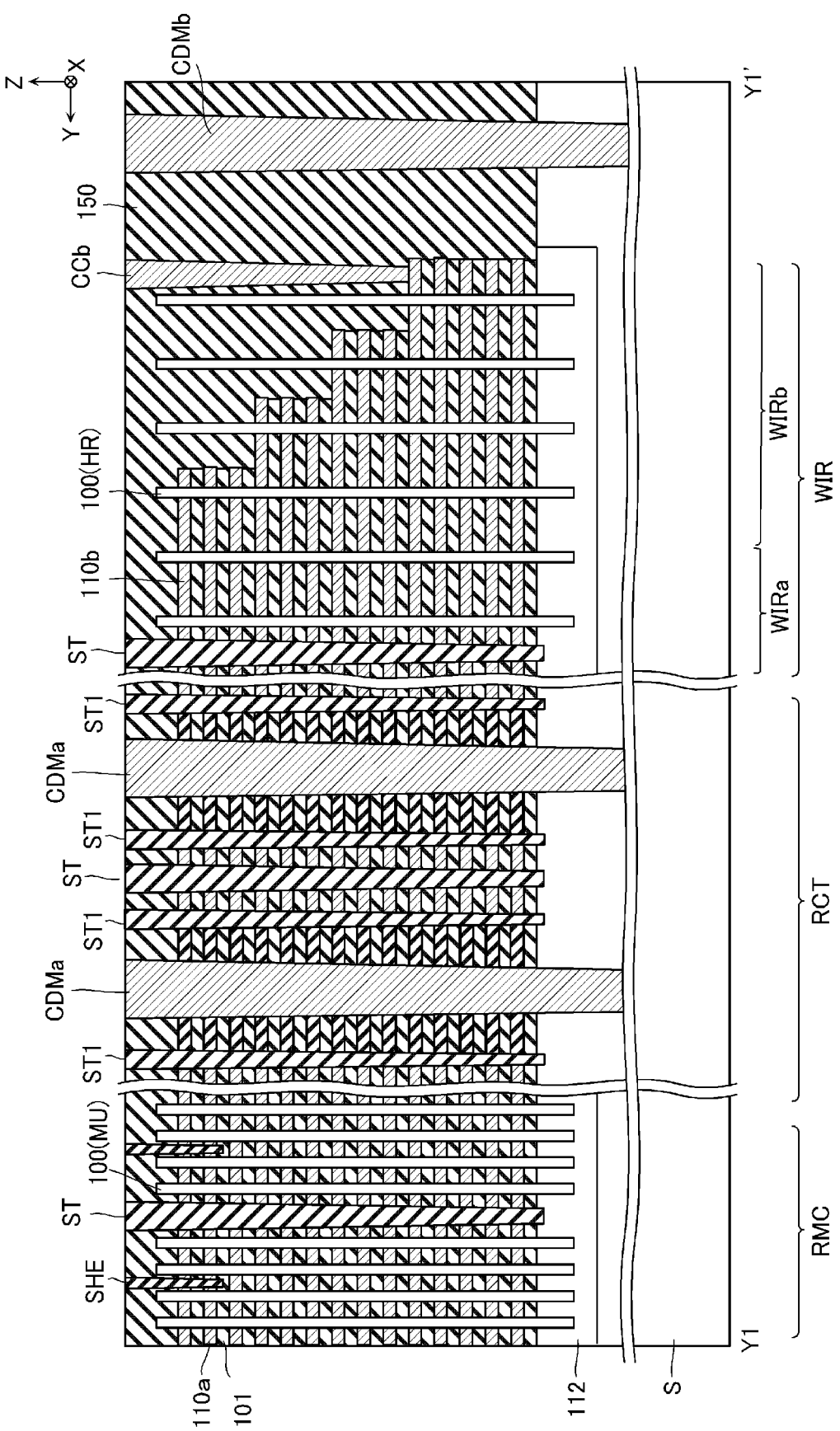
FIG. 32 is a schematic cross-sectional view illustrating a manufacturing process of the semiconductor storage device.

Next, as illustrated in FIG. 32, the semiconductor storage device according to the present embodiment may be manufactured by forming contacts CDMa, CCb, and CDMb in the connection region WIRb of the wiring layer WIR and the peripheral region between the insulating layers ST1 of the contact connection region RCT, respectively.

Further, to form the structure illustrated in FIG. 7, where the high-dielectric film 111 such as alumina ($Al_2O_3$) is on the surfaces of the conductive layers 110a and 110b, the high-dielectric film is formed on the surface of the cavity 110B prior to the formation of the conductive layers 110a and 110b. In this case, by making the step of forming the conductive layer 110a in the memory cell region RMC different from the step of forming the conductive layer 110b in the wiring layer WIR, the high-dielectric film 111 may not be formed in the wiring layer WIR.

Effect

According to the present embodiment, the conductive layer 110b and the insulating layer 101b in the wiring layer WIR may be formed at the same time as the steps of forming the conductive layer 110a and the insulating layer 101a in the memory cell region RMC and the hookup region RHU of the related art.

Second Embodiment

Figure 33:
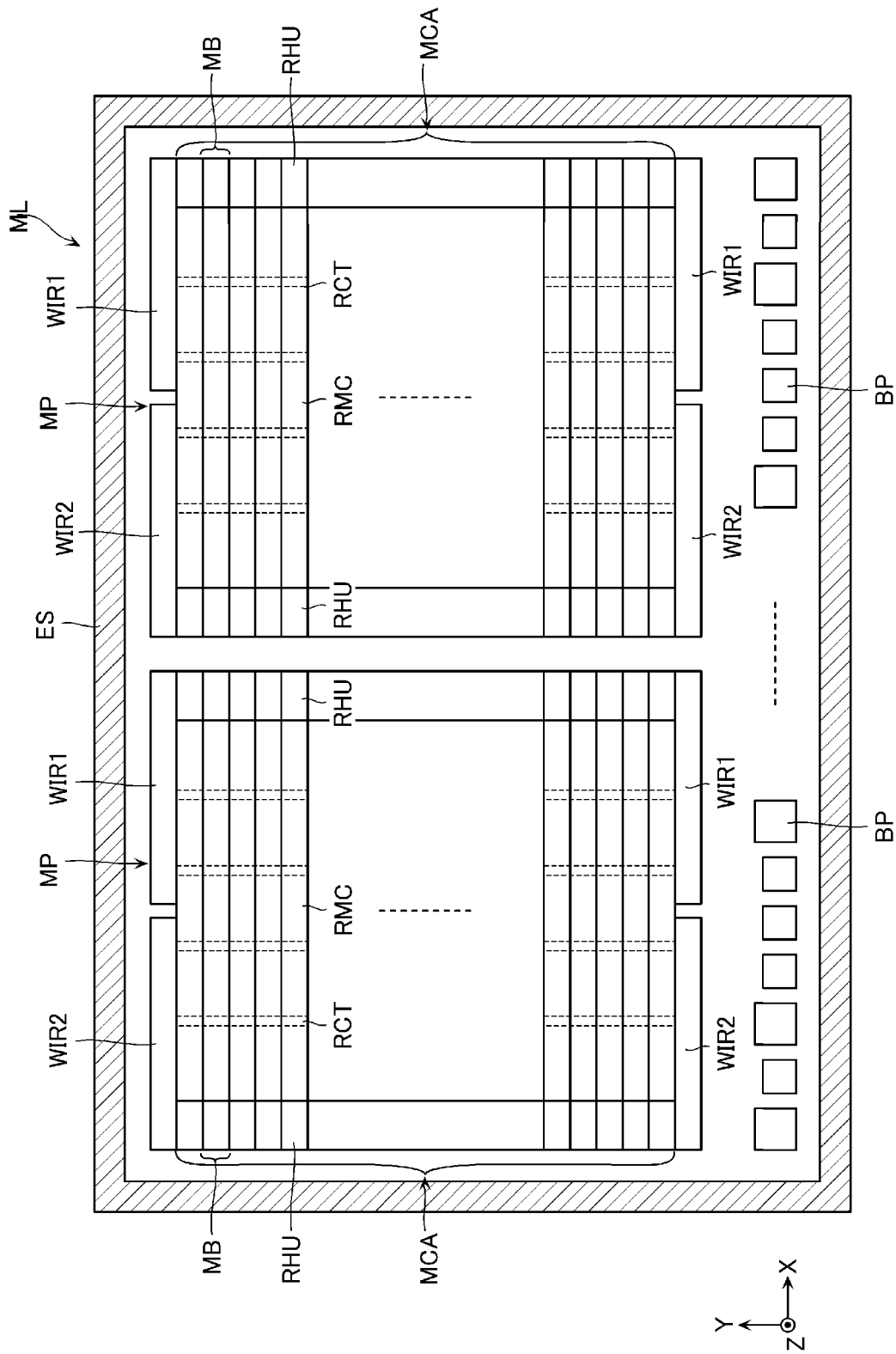
FIG. 33 is a schematic plan view of a semiconductor storage device according to a second embodiment.

FIG. 33 is a plan view of the semiconductor storage device according to a second embodiment. In FIG. 33, the same parts as those in FIG. 3 are designated by the same reference numerals, and the description of the overlapping parts will be omitted.

In the present embodiment, two wiring layers WIR1 and WIR2 arranged in the X direction are provided on both sides of one memory plane MP in the Y direction.

According to the present embodiment, since a plurality of wiring layers WIR1 and WIR2 is provided in the X direction, the number of wiring paths may be further increased. In the present embodiment, two wiring layers WIR1 and WIR2 are provided in the X direction, but in other embodiments, three or more wiring layers WIR may be provided.

Third Embodiment

Figure 34:
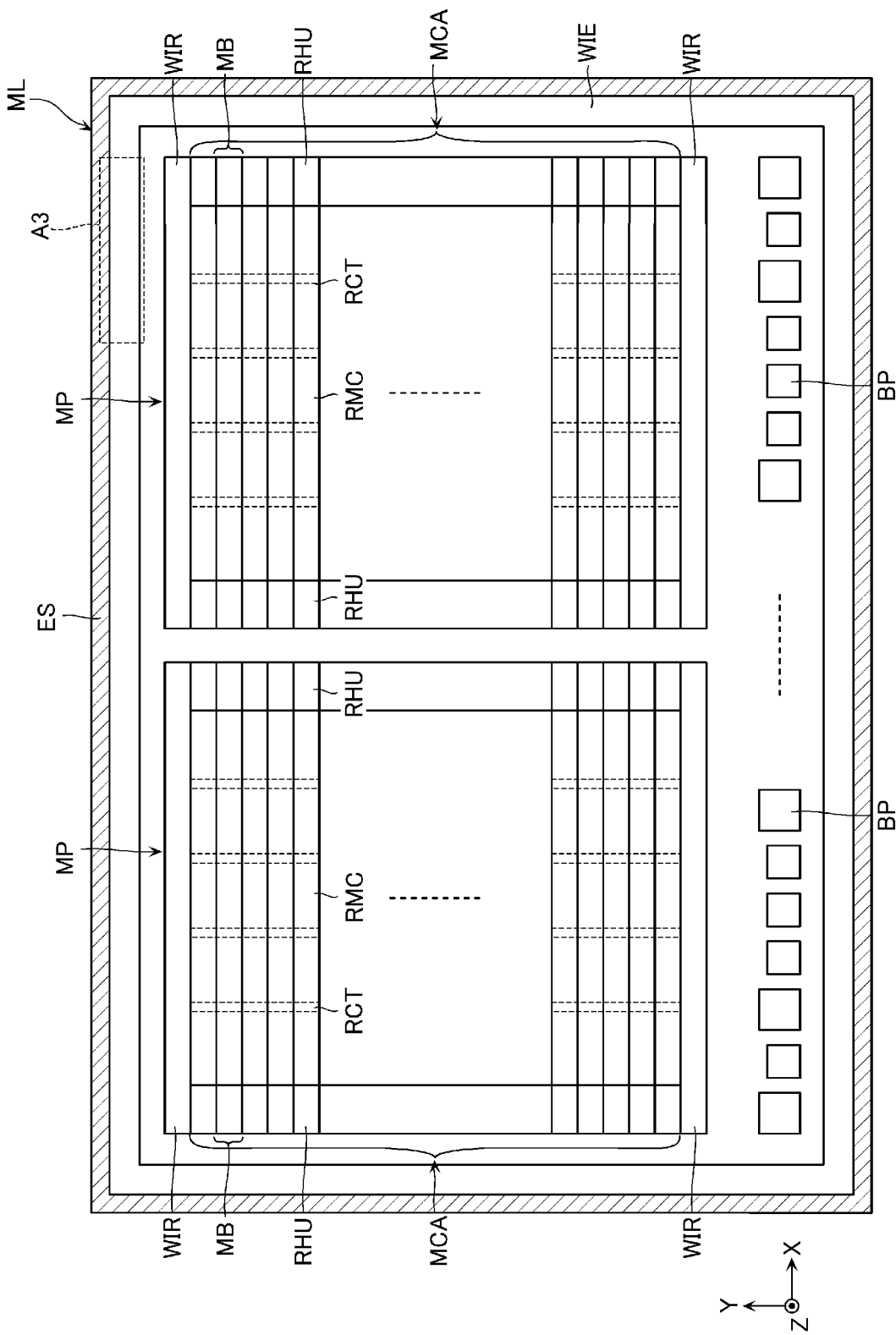
FIG. 34 is a schematic plan view of a semiconductor storage device according to a third embodiment.

FIG. 34 is a plan view of the semiconductor storage device according to a third embodiment. In FIG. 34, the same parts as those in FIG. 3 are designated by the same reference numerals, and the description of the overlapping parts will be omitted.

In the present embodiment, in addition to the wiring layer WIR of the first embodiment, or instead of the wiring layer WIR, the inner region of the edge seal ES is used as the wiring layer WIE.

Figure 35:
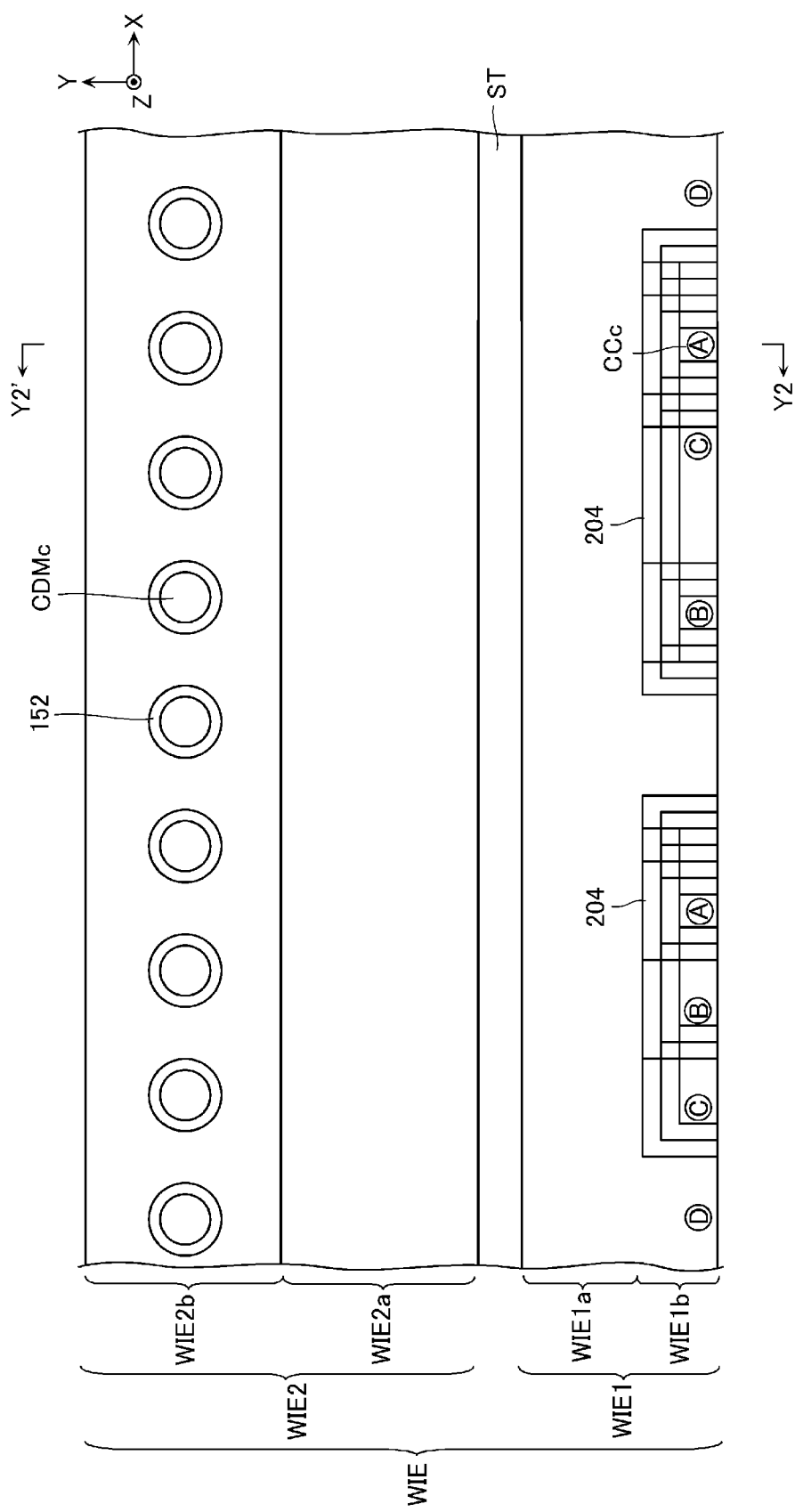
FIG. 35 is a plan view schematically illustrating an enlarged portion A3 of FIG. 34.
Figure 36:
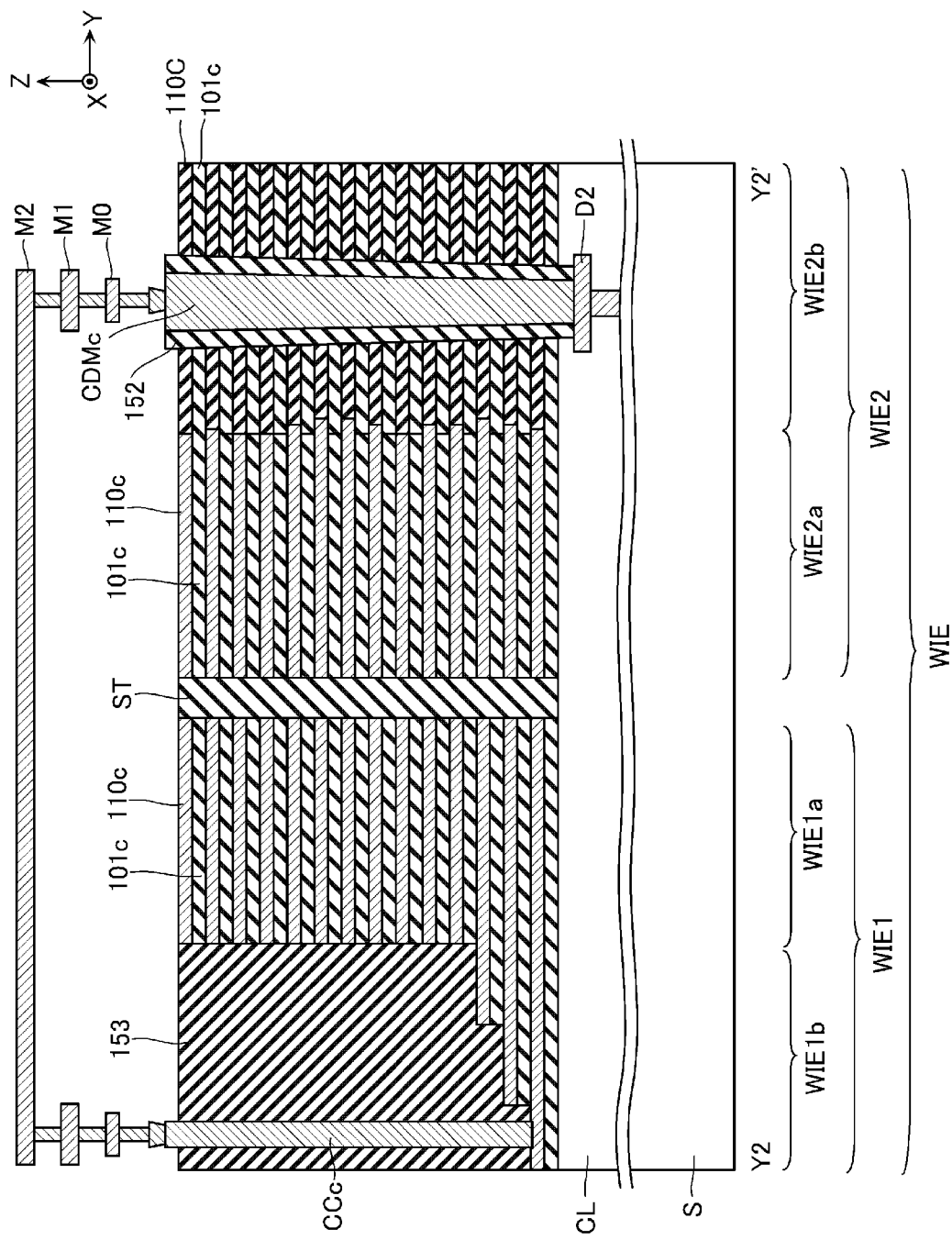
FIG. 36 is a schematic cross-sectional view of a cross-section taken along line Y2-Y2' in FIG. 35.

FIG. 35 is a plan view illustrating an enlarged portion A3 of FIG. 34. FIG. 36 is a schematic cross-section viewed in the −X direction, of the portion cut along line Y2-Y2' in FIG. 35.

In the present embodiment, as illustrated in FIG. 36, the wiring layer WIE arranged inside the edge seal ES has a stacked structure including a plurality of conductive layers 110c and insulating layers 101c alternately stacked on the circuit layer CL, or an insulating layer 110C as sacrificial layer not replaced with the conductive layer 110c and an insulating layer 101c. The conductive layer 110c contains, for example, tungsten (W). The insulating layer 101c contains, for example, silicon oxide ($SiO_2$). The insulating layer 110C contains, for example, silicon nitride (SiN).

As illustrated in FIGS. 35 and 36, the wiring layer WIE arranged inside the edge seal ES has a wiring layer region WIE1 inside the insulating layer ST formed along the edge seal ES and a contact connection region WIE2 outside. The wiring layer region WIE1 has an outer wiring region WIE1a and an inner connection region WIE1b. The contact connection region WIE2 has an inner first region WIE2a and an outer second region WIE2b.

As illustrated in FIG. 36, the wiring layer region WIE1 has a plurality of conductive layers 110c stacked in the Z direction. Further, the contact connection region WIE2 has a plurality of conductive layers 110c in the first region WIE2a and a plurality of insulating layers 110C in the second region WIE2b.

The lower end of a contact CCc extending in the Z direction in the insulating layer 153 is connected to the conductive layer 110c of the connection region WIE1b of the wiring layer region WIE1. Further, the second region WIE2b of the contact connection region WIE2 is provided with a contact CDMc that penetrates a plurality of insulating layers 110C and 101c in the Z direction and has a lower end connected to the circuit layer CL. The contact CDMc is surrounded by the insulating layer 152 so that a problem such as a short circuit does not occur even when a part of the insulating layer 110C is replaced with the conductive layer 110c. The upper end of the contact CCc and the upper end of the contact CDMc are connected to each other via the wirings M0, M1, and M2.

The stack containing the contact CDMc is usually located on the innermost side of the edge seal ES. That is, the second region WIE2b is also the inner region of the edge seal ES. FIG. 36 illustrates an example in which the contact CCc and the contact CDMc are connected, but they need not be connected. For example, the circuit layer CL and the stack containing the contact CDMc may be connected. A voltage such as a power supply voltage VSS is applied to the stack containing the contact CDMc.

According to the present embodiment, since the wiring layer WIE formed inside the edge seal ES surrounds the two memory planes MPs, the wiring layer WIE may provide wiring at a longer distance from one side to the other side of the memory cell array MCA than in the first and second embodiments. For example, it becomes easy to connect circuit blocks arranged at both ends of the memory plane MP.

Fourth Embodiment

Figure 37:
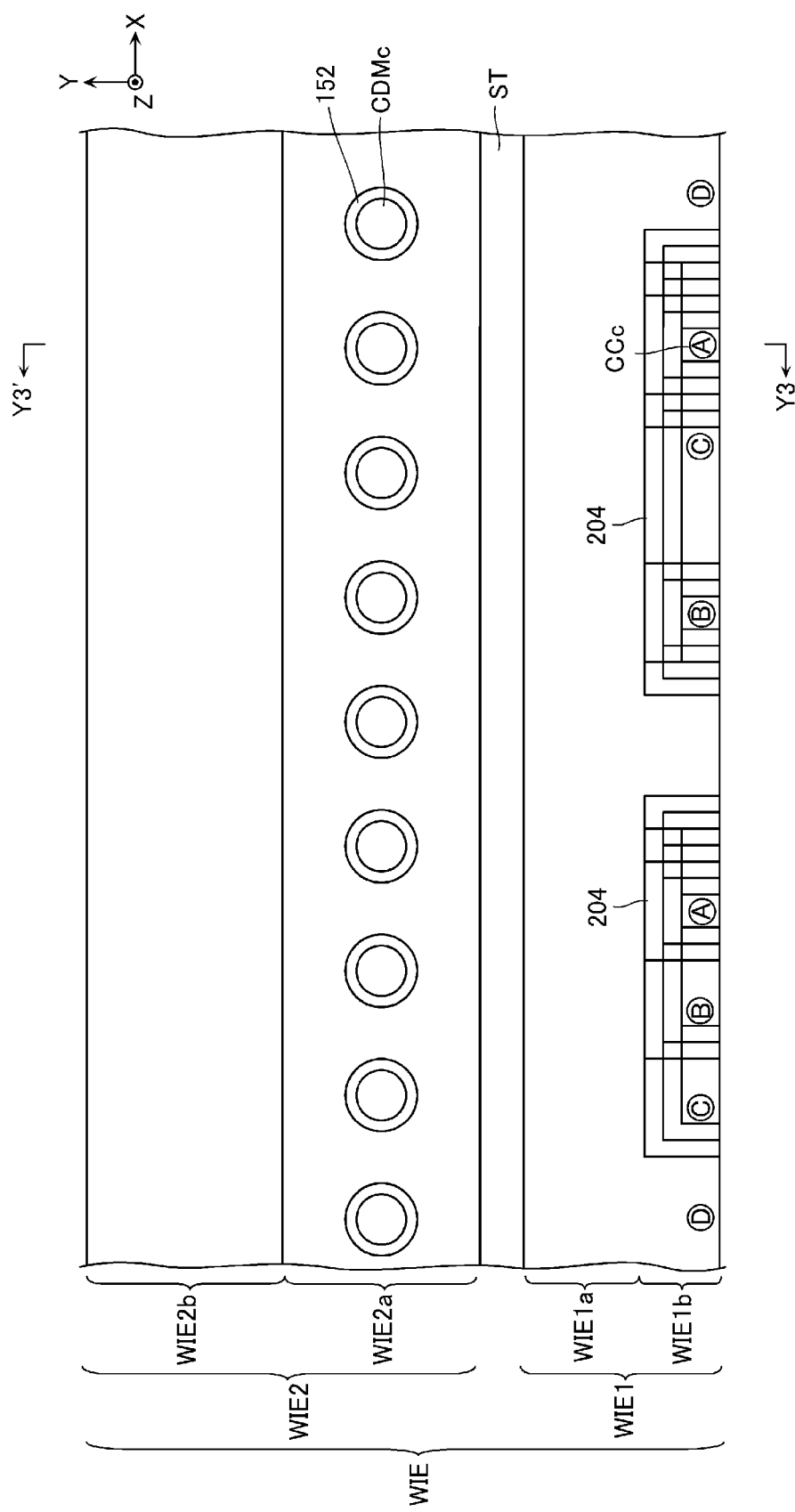
FIG. 37 is a schematic plan view of a semiconductor storage device according to a fourth embodiment.
Figure 38:
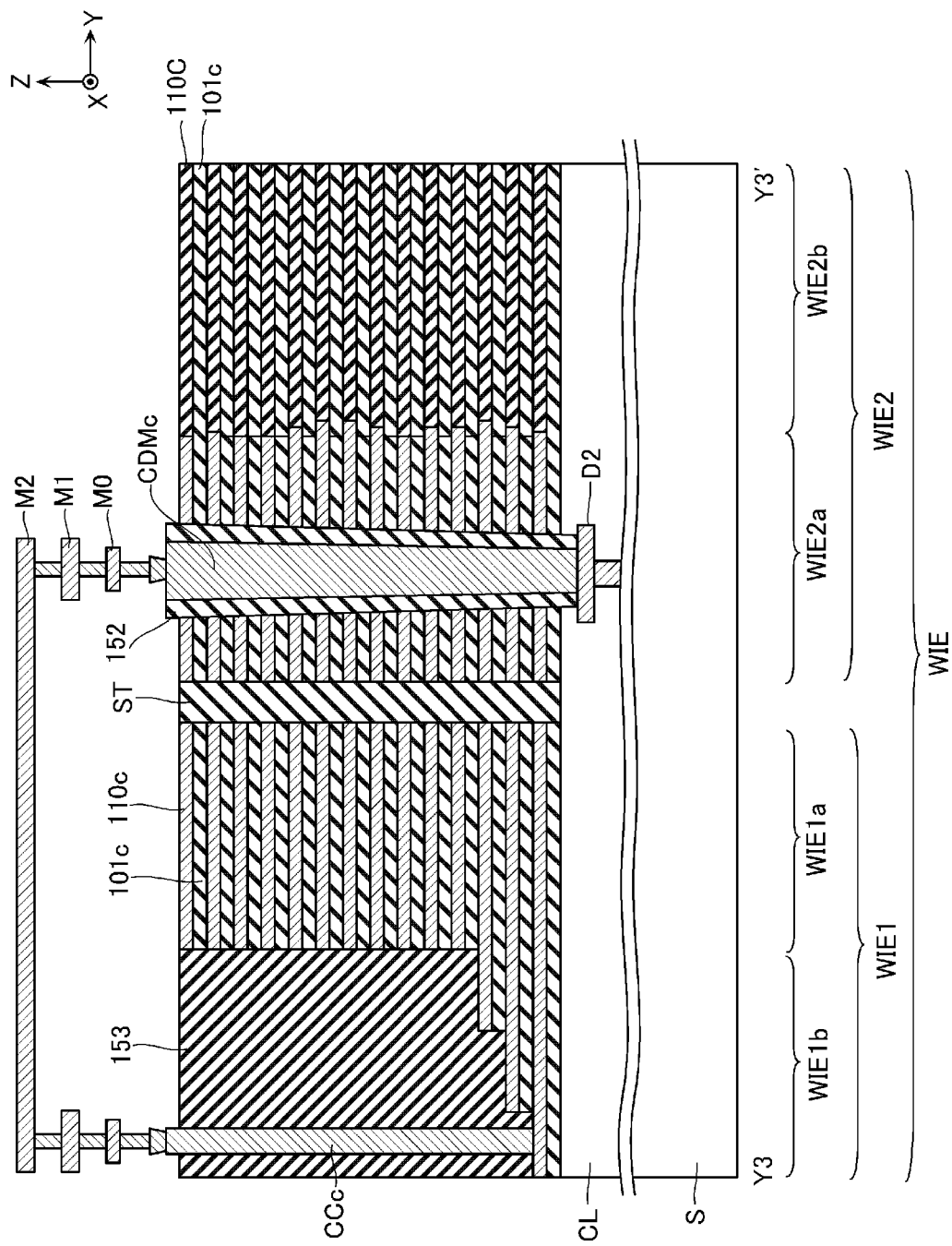
FIG. 38 is a schematic cross-sectional view of a cross-section taken along line Y3-Y3' in FIG. 37.

FIG. 37 is a view illustrating a fourth embodiment, and is a schematic plan view of an enlarged portion A3 of FIG. 34. FIG. 38 is a schematic cross-section viewed in the −X direction of the portion cut along line Y3-Y3' in FIG. 37. In FIGS. 37 and 38, the same parts as those in FIGS. 35 and 36 are designated by the same reference numerals, and the description of the overlapping parts will be omitted.

In the third embodiment, the contact CDMc is provided in the second region WIE2b of the contact connection region WIE2, but in the present embodiment, the contact CDMc is provided in the first region WIE2a of the contact connection region WIE2. In this case, since the insulating layer 152 is interposed between the contact CDMc and the conductive layer 110c, the two are not short-circuited. However, the insulating layer 152 does not have to be interposed between the contact CDMc and the conductive layer 110c if a short-circuit between the two is intended.

Fifth Embodiment

Figure 39:
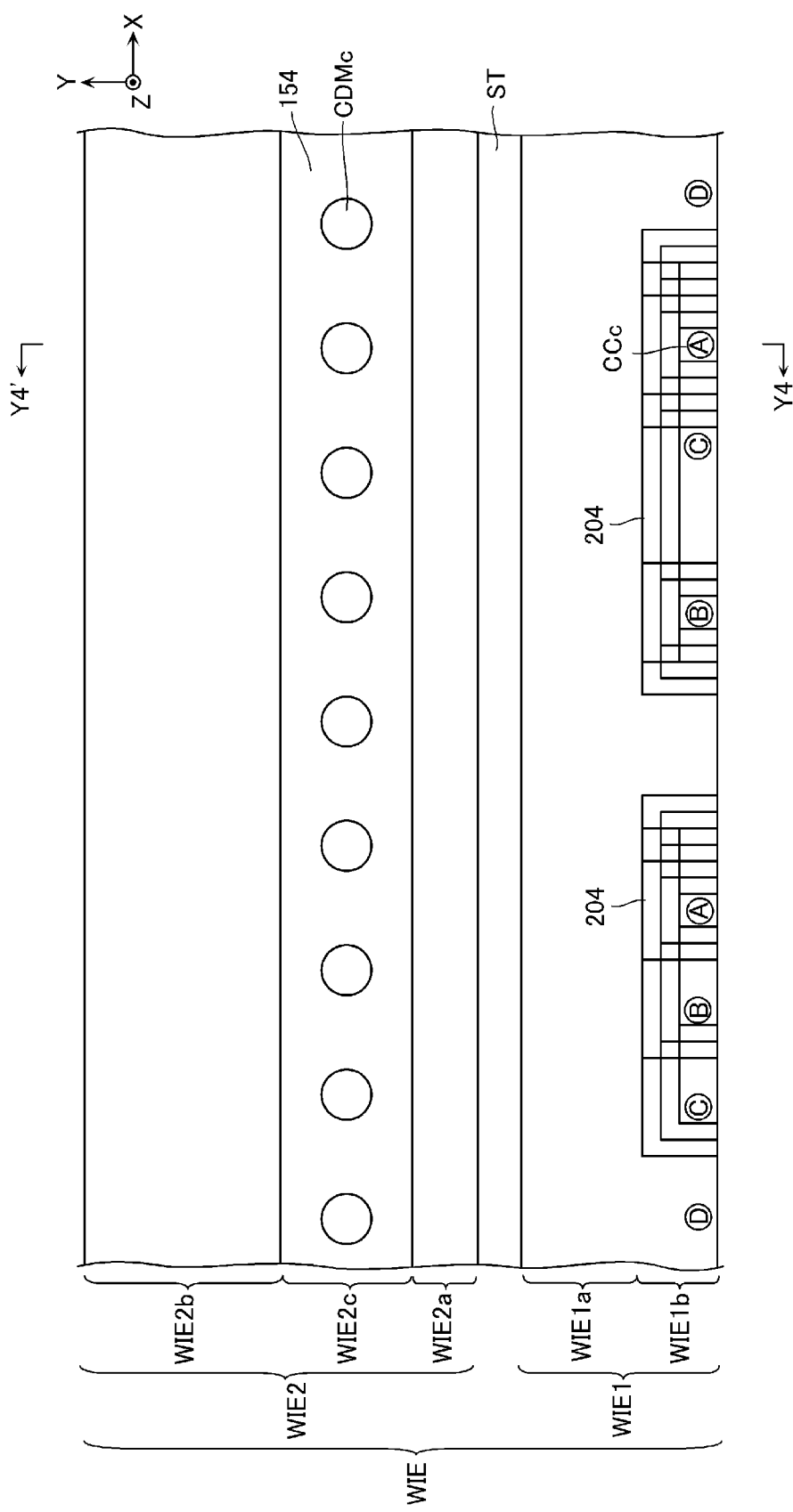
FIG. 39 is a schematic plan view of a semiconductor storage device according to a fifth embodiment.
Figure 40:
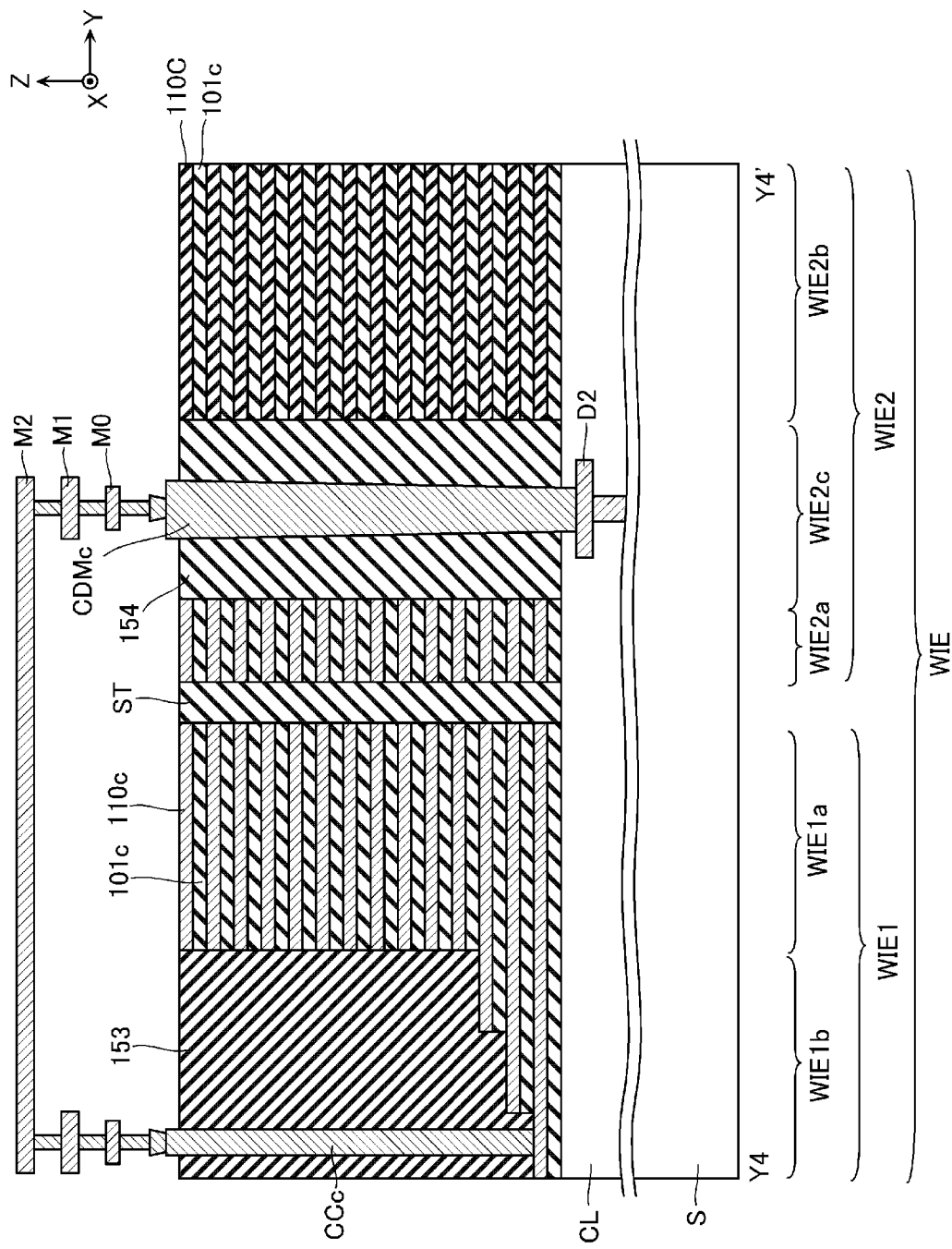
FIG. 40 is a schematic cross-sectional view of a cross-section taken along line Y3-Y3' in FIG. 39.

FIG. 39 is a view illustrating a fifth embodiment, and is a schematic plan view of an enlarged portion A3 of FIG. 34. FIG. 40 is a schematic cross-section viewed in the −X direction of the portion cut along line Y4-Y4' in FIG. 39. In FIGS. 39 and 40, the same parts as those in FIGS. 35 and 36 are designated by the same reference numerals, and the description of the overlapping parts will be omitted.

In the present embodiment, a third region WIE2c is provided between the first region WIE2a and the second region WIE2b of the contact connection region WIE2. The third region WIE2c is formed by the insulating layer 154. The contact CDMc extends in the Z direction to penetrate the insulating layer 154.

According to the present embodiment, the insulating layer 152 around the contact CDMc used in the third and fourth embodiments is unnecessary.

Sixth Embodiment

Figure 41:
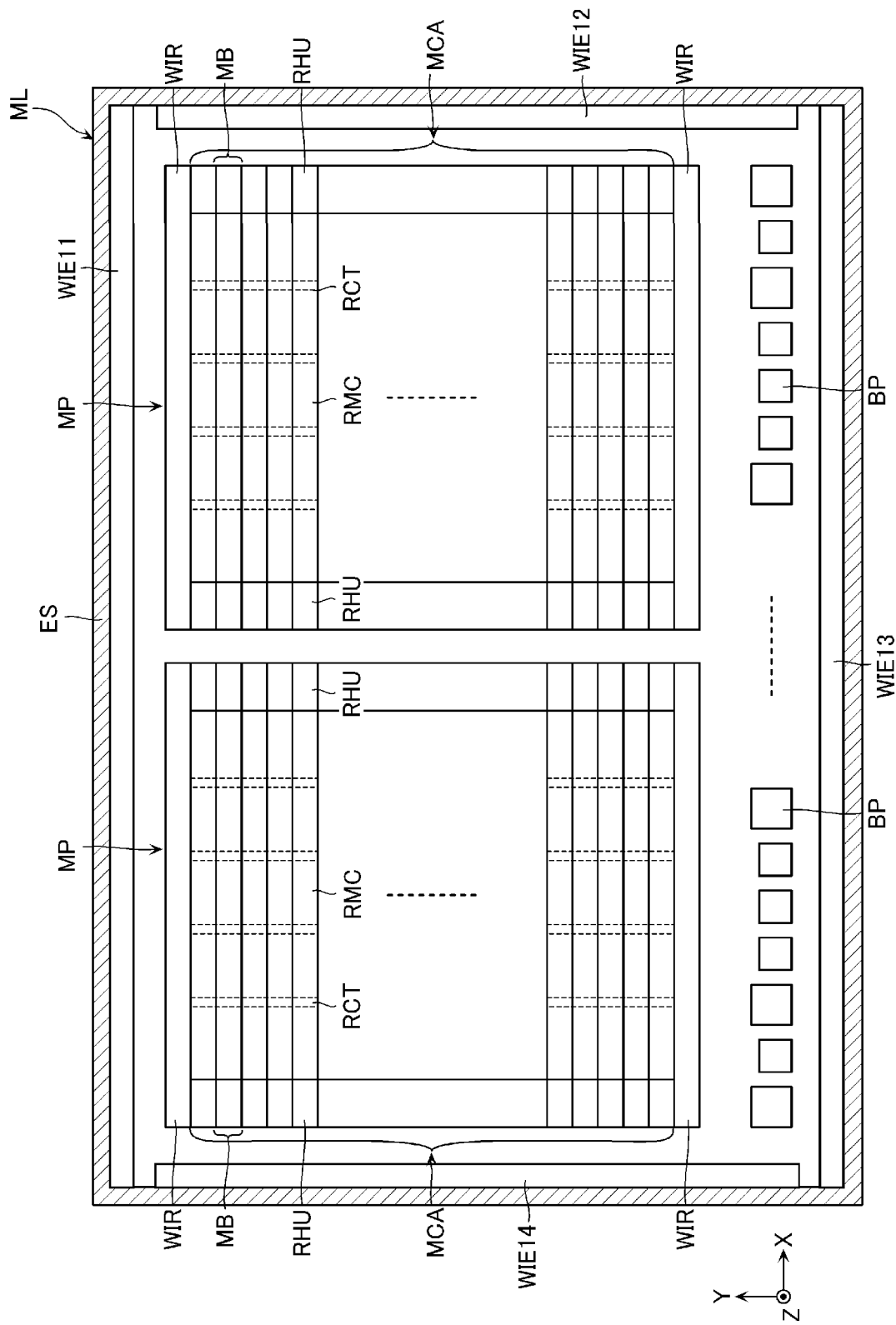
FIG. 41 is a schematic plan view illustrating a semiconductor storage device according to a sixth embodiment.

FIG. 41 is a schematic plan view of the semiconductor storage device according to a sixth embodiment.

According to this embodiment, four wiring layers WIE11, WIE12, WIE13, and WIE14 isolated from each other are provided inside the edge seal ES. The wiring layers WIE11 and WIE13 are arranged at both ends of the memory layer ML in the Y direction. The wiring layers WIE12 and WIE14 are arranged at both ends of the memory layer ML in the X direction.

According to the present embodiment, since the wiring layer WIE inside the edge seal ES is divided into four, the wiring path may be further increased. Further, in this embodiment, four wiring layers WIR11, WIR12, WIE13, and WIE14 are provided, but the wiring layer WIR may be divided into five or more.

Seventh Embodiment

Figure 42:
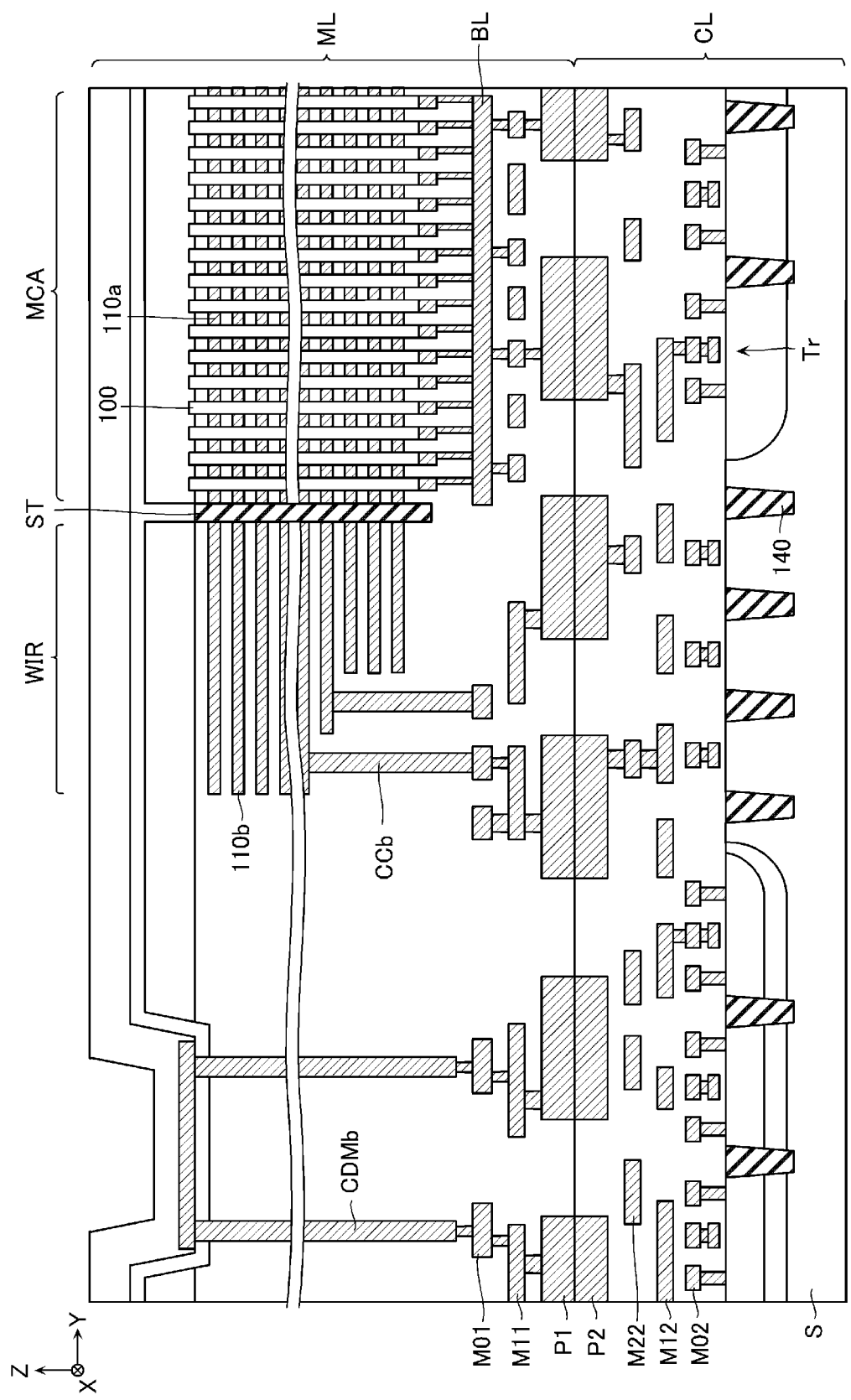
FIG. 42 is a schematic cross-sectional view illustrating a semiconductor storage device according to a seventh embodiment.

FIG. 42 is a schematic cross-sectional view of the semiconductor storage device according to a seventh embodiment.

This embodiment is an example of a semiconductor storage device in which the memory layer ML and the circuit layer CL are manufactured as separate chips, and finally manufactured by bonding them via pads P1 and P2.

In this case, the contact CCb that is separated from the memory cell array MCA, and is connected to the conductive layer 110b of the wiring layer WIR including the plurality of conductive layers 110b formed in the same layer as the plurality of conductive layers 110a is connected to the circuit layer CL via the pads P1 and P2. In the present embodiment, since the wirings M01 and M11 of the memory layer ML, the pad P1, the wirings M02, M12, and M22 of the circuit layer CL, and the pad P2 may all be formed of a low resistance metal such as aluminum or copper, the wiring resistance may be further increased. Further, the contact CMDa is unnecessary.

Eighth Embodiment

In the above-described embodiments, descriptions have been made on an example of a NAND-type semiconductor storage device having a three-dimensional structure in which memory cells MCs are NAND-connected.

However, the present disclosure is not limited to the NAND-type semiconductor storage device.

Figure 43:
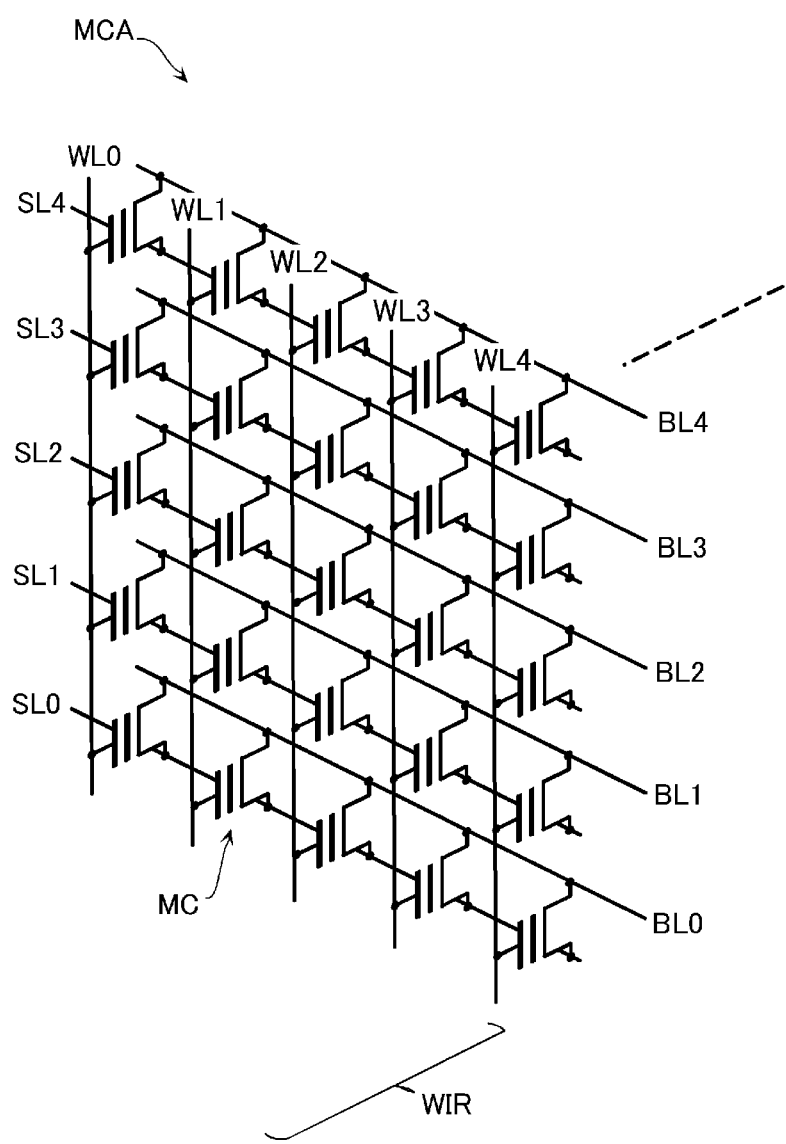
FIG. 43 is a schematic equivalent circuit diagram illustrating a semiconductor storage device according to an eighth embodiment.

FIG. 43 is an equivalent circuit diagram schematically illustrating a NOR-type semiconductor storage device having a three-dimensional structure according to the eighth embodiment. In this embodiment, a plurality of memory cells MCs is connected in parallel between the horizontally extending bit lines BL0 to BL4 and the source lines SL0 to SL4, and a plurality of memory cells MCs arranged in the vertical direction is commonly driven by word lines WL0 to WL4 extending vertically.

Ninth And Tenth Embodiments

Figure 44:
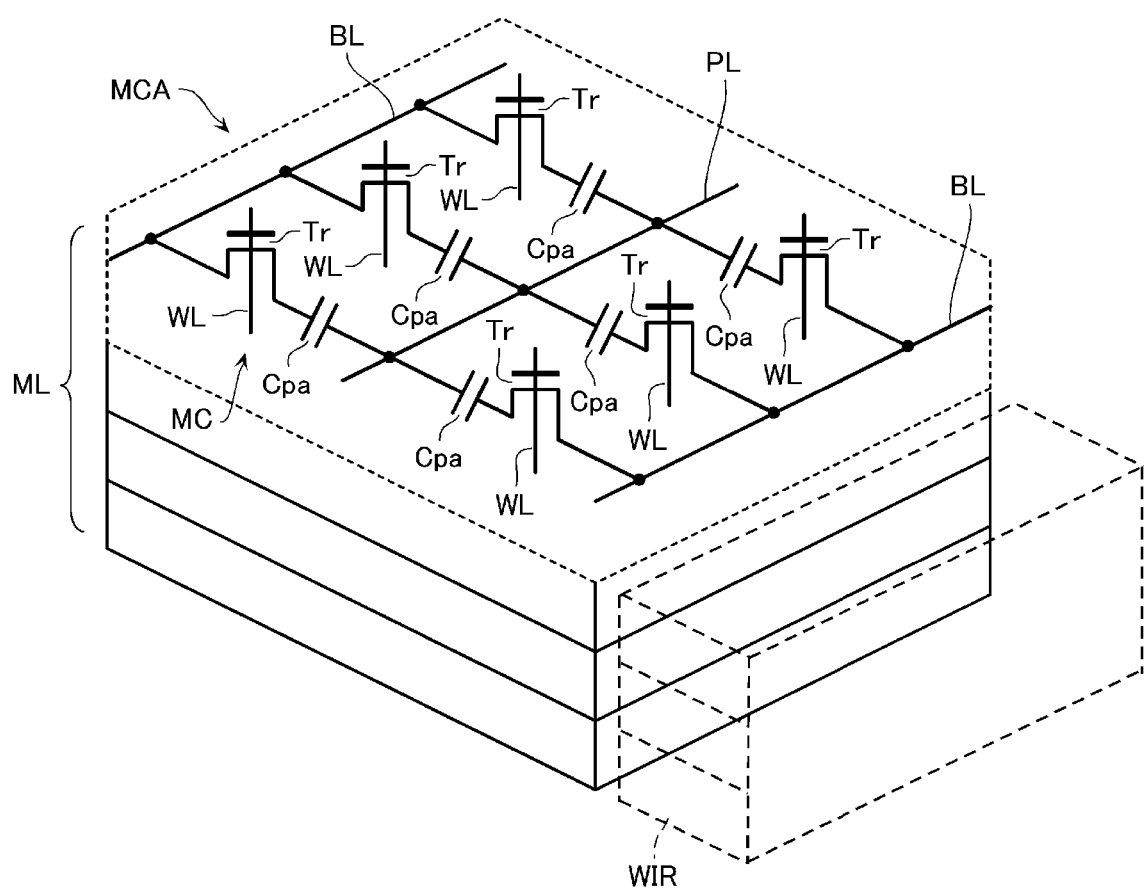
FIG. 44 is a schematic equivalent circuit diagram illustrating a semiconductor storage device according to a ninth embodiment.
Figure 45:
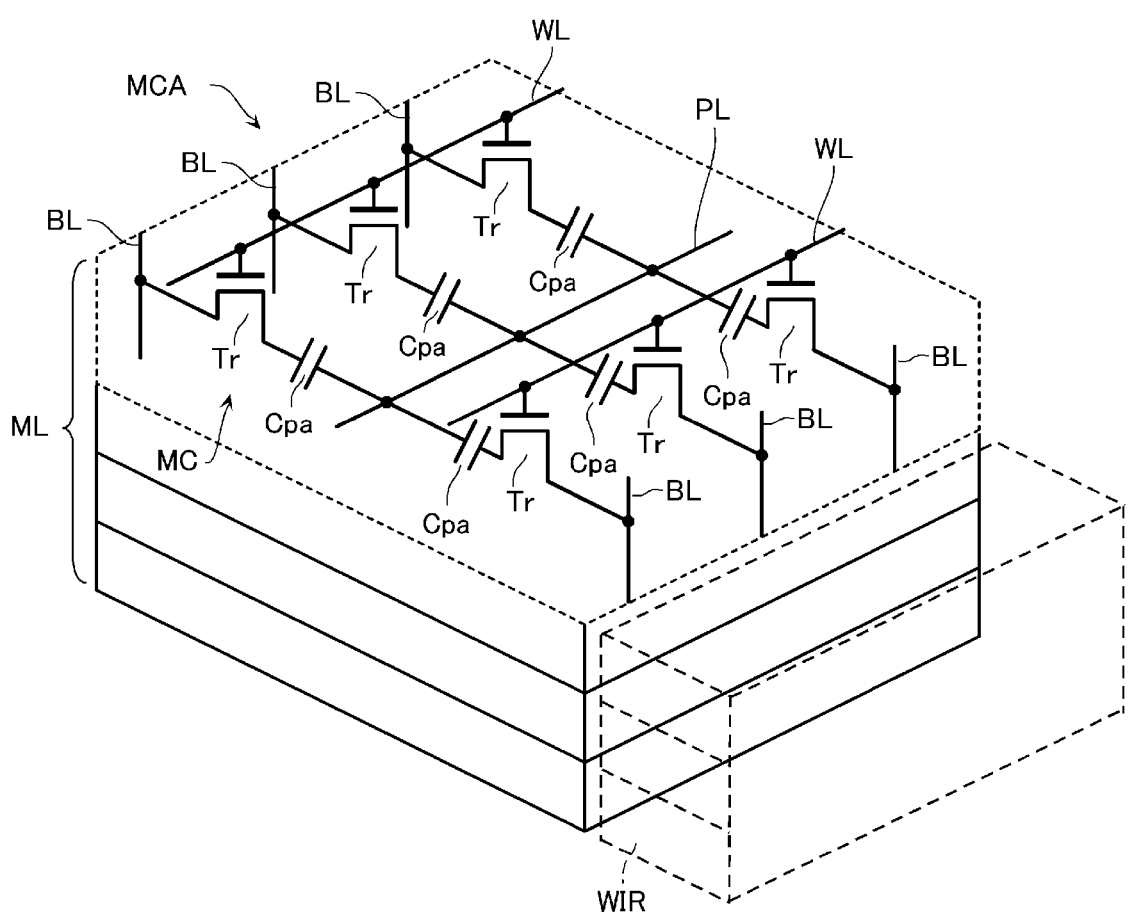
FIG. 45 is a schematic equivalent circuit diagram illustrating a semiconductor storage device according to a tenth embodiment.

FIGS. 44 and 45 are equivalent circuit diagrams schematically illustrating a DRAM having a three-dimensional structure according to ninth and tenth embodiments, respectively.

In FIGS. 44 and 45, a transistor Tr and a capacitor Cpa are inserted between the bit line BL and the plate line PL.

The DRAM of FIG. 44 has a bit line BL extending horizontally and a word line WL extending vertically. The DRAM of FIG. 45 has a bit line BL extending vertically and a word line WL extending horizontally.

Also, in the eighth to tenth embodiments, a stacked structure that is formed in the same layer as any of the wiring layers of the bit line BL, the word line WL, the source line SL, and the plate line PL and provided in a form separated from the memory cell array MCA is used as the wiring layer WIR. As a result, the various effects described above may be achieved.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A semiconductor storage device comprising:
   a memory cell array having a plurality of first conductive layers stacked in a first direction and a plurality of memory cells connected to the plurality of first conductive layers;
   an insulating layer extending in the first direction and disposed adjacent to the memory cell array in a second direction intersecting the first direction;
   a wiring layer structure disposed adjacent to the insulating layer in the second direction and having a plurality of second conductive layers that are stacked in the first direction and respectively correspond to the first conductive layers, the second conductive layers being insulated from the corresponding first conductive layers by the insulating layer; and
   a first wiring layer extending above the memory cell array, the insulating layer, and the wiring layer structure and by which the memory cell array and the wiring layer structure are electrically connected, wherein
   the wiring layer structure further includes a first contact connected to at least a part of the plurality of second conductive layers and extending in the first direction,
   the memory cell array includes a first wiring above the first conductive layers in the first direction, and a second contact that penetrates the first conductive layers to a position below the first conductive layers,
   the first wiring layer includes a second wiring above the first wiring in the first direction and a third wiring above the second wiring in the first direction, and
   the first contact is connected to the second contact via the first wiring, the second wiring, and the third wiring.

2. The semiconductor storage device according to claim 1, wherein the plurality of second conductive layers are adjacent to the insulating layer and the plurality of first conductive layers are adjacent to the insulating layer.

3. The semiconductor storage device according to claim 2, wherein the insulating layer extends in a third direction intersecting the first and second directions, and has a thickness in the second direction.

4. The semiconductor storage device according to claim 1, further comprising:
   an edge seal that surrounds at least a part of the memory cell array,
   wherein the plurality of second conductive layers are provided in an inner region of the edge seal.

5. The semiconductor storage device according to claim 1, wherein
   the plurality of first conductive layers extend in the second direction and a third direction intersecting the first and second directions, and
   the plurality of second conductive layers have a length in the third direction longer than a length in the second direction.

6. The semiconductor storage device according to claim 5, wherein
   at least a part of the plurality of second conductive layers has a wiring region on a first side in the second direction and a connection region on a second side in the second direction,
   the wiring region extends in the third direction, and
   the connection region has a contact insertion portion through which the first contact is inserted.

7. The semiconductor storage device according to claim 6, wherein
   the plurality of second conductive layers include:
      a third conductive layer to which the first contact is connected;
      a fourth conductive layer having a first contact insertion portion through which the first contact is inserted; and
      a fifth conductive layer having a second contact insertion portion through which the first contact is inserted and arranged between the third conductive layer and the fourth conductive layer, and
   a length of the first contact insertion portion in the third direction is longer than a length of the second contact insertion portion in the third direction.

8. The semiconductor storage device according to claim 6, wherein
   the plurality of second conductive layers include:
      a third conductive layer to which the first contact is connected;
      a fourth conductive layer having a first contact insertion portion through which the first contact is inserted; and
      a fifth conductive layer having a second contact insertion portion through which the first contact is inserted and arranged between the third conductive layer and the fourth conductive layer, and
   a length of the first contact insertion portion in the second direction is longer than a length of the second contact insertion portion in the second direction.

9. The semiconductor storage device according to claim 1, wherein at least one of the plurality of second conductive layers is in an electrically floating state.

10. The semiconductor storage device according to claim 1, wherein at least two of the plurality of second conductive layers are electrically shorted to each other.

11. The semiconductor storage device according to claim 1, wherein the wiring layer structure is divided in the first direction and in a third direction intersecting the first and second directions.

12. A semiconductor storage device comprising:
    a substrate;
    a circuit layer above the substrate in a first direction;
    a memory layer above the circuit layer in the first direction, the memory layer including a plurality of conductive layers stacked in the first direction above the substrate and an insulating layer that extends in the first direction and separates a memory region of the memory layer from a wiring region of the memory layer in a second direction intersecting the first direction, wherein
    the plurality of conductive layers are separated into a first plurality of conductive layers that are in the memory region and a second plurality of conductive layers that are in the wiring region and electrically isolated from the first plurality of conductive layers, by the insulating layer, and the memory region includes a plurality of memory cells connected to the plurality of first conductive layers; and a first wiring layer extending above the memory region, the insulating layer, and the wiring region of the memory layer and by which the memory region and the wiring region are electrically connected, wherein the wiring region includes a contact connected to one of the plurality of second conductive layers and extending in the first direction, the memory layer includes a first wiring above the first conductive layers in the first direction, the first wiring layer includes a second wiring above the first wiring in the first direction and a third wiring above the second wiring in the first direction, and the contact extends in the first direction from a first end that is connected to the circuit layer via said one of the plurality of second conductive layers and a second end that is connected to the circuit layer via the first wiring, the second wiring, and the third wiring.

13. The semiconductor storage device according to claim 12, wherein the insulating layer extends in a third direction intersecting the first and second directions, and has a thickness in the second direction.

14. The semiconductor storage device according to claim 13, further comprising:

an edge seal that surrounds the memory layer, wherein the plurality of second conductive layers are provided in an inner region of the edge seal.

15. The semiconductor storage device according to claim 13, wherein the plurality of second conductive layers have a length in the third direction longer than a length in the second direction.

16. The semiconductor storage device according to claim 13, wherein the plurality of second conductive layers include:

a third conductive layer to which the contact is connected;

a fourth conductive layer having a first contact insertion portion through which the contact is inserted; and a fifth conductive layer having a second contact insertion portion through which the contact is inserted and arranged between the third conductive layer and the fourth conductive layer, and a length of the first contact insertion portion in the third direction is longer than a length of the second contact insertion portion in the third direction.

17. The semiconductor storage device according to claim 12, wherein at least one of the plurality of second conductive layers is in an electrically floating state.

18. The semiconductor storage device according to claim 12, wherein at least two of the plurality of second conductive layers are electrically shorted to each other.

* * * * *